United States Patent
Zagaynov et al.

(10) Patent No.: US 10,410,087 B2
(45) Date of Patent: Sep. 10, 2019

(54) AUTOMATED METHODS AND SYSTEMS FOR LOCATING DOCUMENT SUBIMAGES IN IMAGES TO FACILITATE EXTRACTION OF INFORMATION FROM THE LOCATED DOCUMENT SUBIMAGES

(71) Applicant: ABBYY Development LLC, Moscow (RU)

(72) Inventors: Ivan Germanovich Zagaynov, Moscow oblast (RU); Pavel Valerievich Borin, Tomsk oblast (RU)

(73) Assignee: ABBYY PRODUCTION LLC, Moscow (RU)

( * ) Notice: Subject to any disclaimer, the term of this patent is extended or adjusted under 35 U.S.C. 154(b) by 128 days.

(21) Appl. No.: 15/279,903

(22) Filed: Sep. 29, 2016

(65) Prior Publication Data
US 2018/0089533 A1    Mar. 29, 2018

(30) Foreign Application Priority Data
Sep. 27, 2016 (RU) .................. 2016138329

(51) Int. Cl.
*G06K 9/62* (2006.01)
*G06K 9/00* (2006.01)
*G06K 9/46* (2006.01)

(52) U.S. Cl.
CPC ....... *G06K 9/6232* (2013.01); *G06K 9/00483* (2013.01); *G06K 9/4633* (2013.01)

(58) Field of Classification Search
CPC .... G06K 9/4671; G06K 9/4642; G06K 9/468; G06K 9/4685; G06K 9/469;
(Continued)

(56) References Cited

U.S. PATENT DOCUMENTS 5,487,115 A * 1/1996 Surka .................. G06K 7/1452
235/462.09
8,861,864 B2   10/2014 Hong et al.
(Continued)

OTHER PUBLICATIONS

Augereau, Olivier, et al., "Document Image Recognition and Classification", ResearchGate, Oct. 11, 2014, 4 pages.
(Continued)

*Primary Examiner* — Dwayne D Bost
*Assistant Examiner* — Stephen M Brinich
(74) *Attorney, Agent, or Firm* — Lowenstein Sandler LLP

(57) ABSTRACT

The present document is directed to methods and subsystems that identify and characterize document-containing subimages in a document-containing image. In one implementation, each type of document is modeled as a set of features that are extracted from a set of images known to contain the document. To locate and characterize a document subimage in an image, the currently described methods and subsystems extract features from the image and then match model features of each model in a set of models to the extracted features to select the model that best corresponds to the extracted features. Additional information contained in the selected model is then used to identify the location of the subimage corresponding to the document and to process the document subimage to correct for a variety of distortions and deficiencies in order to facilitate subsequent data extraction from the corrected document subimage.

12 Claims, 71 Drawing Sheets

(58) Field of Classification Search
CPC ........... G06K 9/00456; G06K 9/00442; G06K 9/00449; G06K 9/00463; G06K 9/00469; G06K 9/00409; G06K 9/00483; G06K 9/6232; G06K 9/6217; G06K 9/6219; G06K 2009/6213; G06K 9/6214; G06K 9/6227; G06K 9/6228; G06K 9/6234; G06K 19/08; G06K 19/086
USPC ....... 382/201, 203, 216, 209–210, 219, 181, 382/195, 206
See application file for complete search history.

(56) References Cited

U.S. PATENT DOCUMENTS

| | | | |
|---|---|---|---|
| 9,208,395 B2* | 12/2015 | Fujiki | G01B 11/002 |
| 2010/0283813 A1* | 11/2010 | Warnes | B41J 11/008 |
| | | | 347/19 |
| 2018/0188027 A1* | 7/2018 | Zhang | G06T 7/11 |

OTHER PUBLICATIONS

Augereau, Olivier, et al., "Semi-structured document image matching and recognition", SPIE-IS&T/vol. 8658, Feb. 5, 2013, 12 pages.
Rusinol, Marcal, et al., "A Comparative Study of Local Detectors and Descriptors for Mobile Document Classification", 13th International Conference on Document Analysis and Recognition (ICDAR), Aug. 23-26, 2015, 5 pages.

* cited by examiner

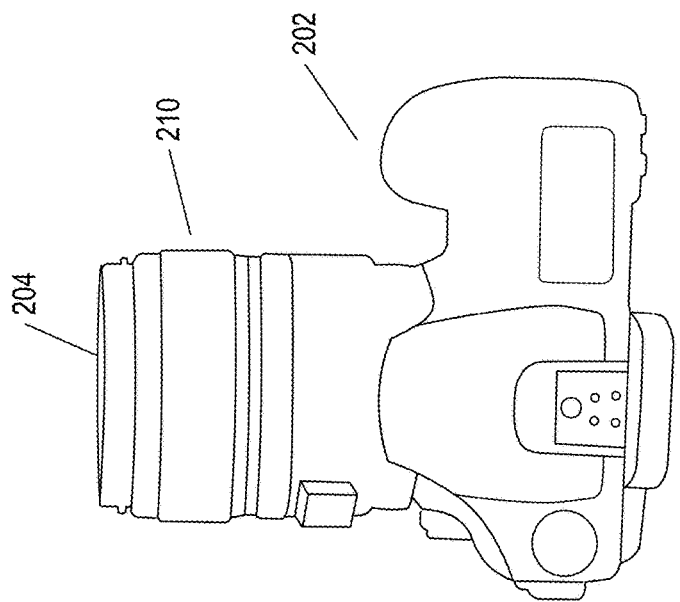
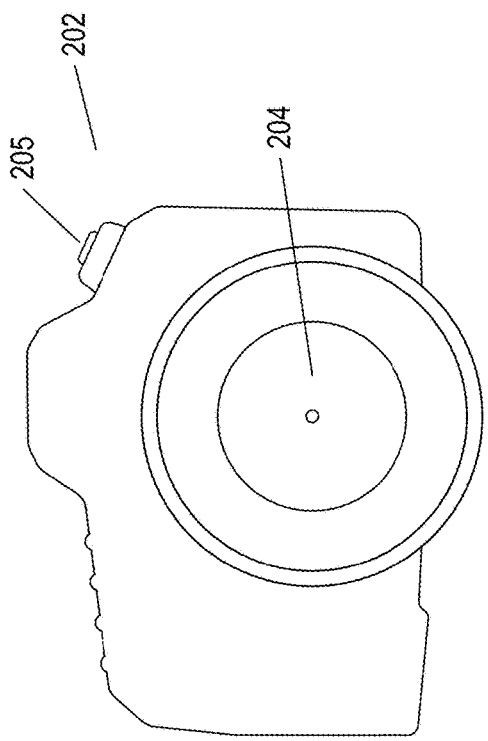
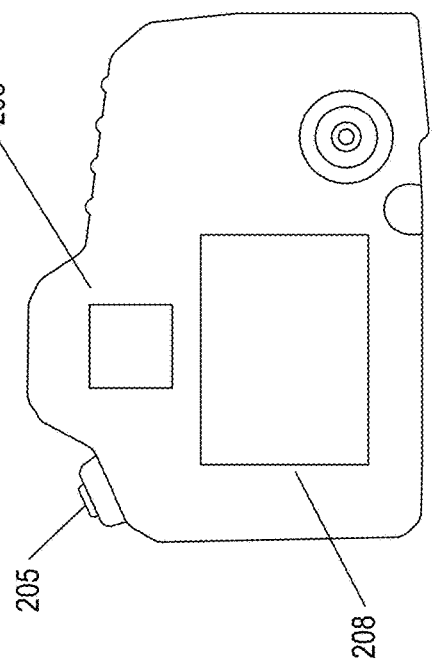
FIG. 2B
FIG. 2A
FIG. 2C

| model_description / 845 | forward_transformation / 846 | reverse_transformation / 847 | parameter 1 / 848 | parameter N / 849 |
|---|---|---|---|---|
| 842 — downward vertical translation by $n$ pixels | $x' = x; y' = y + n$ | $x = x'; y = y' - n$ | $n = \frac{1}{100}$ pixels in image | $minRatio = 0.6$ |
| 843 — leftward horizontal translation by $n$ pixels | $x' = x - n; y' = y$ | $x = x' + n; y = y'$ | $n = \frac{1}{100}$ pixels in image | $minRatio = 0.6$ |
| 844 — counter-clockwise rotation by $\theta$ around center of image | $x_r = x - x_c; y_r = y - y_c$ $\begin{bmatrix} x'_r \\ y'_r \end{bmatrix} = \begin{bmatrix} \cos\theta & -\sin\theta \\ \sin\theta & \cos\theta \end{bmatrix} \begin{bmatrix} x_r \\ y_r \end{bmatrix}$ $x' = x'_r + x_c; y' = y'_r + y_c$ | $x'_r = x' - x_c; y'_r = y' - y_c$ $\begin{bmatrix} x_r \\ y_r \end{bmatrix} = \begin{bmatrix} \cos\theta & \sin\theta \\ -\sin\theta & \cos\theta \end{bmatrix} \begin{bmatrix} x'_r \\ y'_r \end{bmatrix}$ $x = x_r + x_c; y = y_r + y_c$ | $n = \frac{1}{50}$ pixels in image | $minRatio = 0.8$ |

Models [ ]

FIG. 8E

Program "find model" — 850 input:　*image1*, a first image; — 851
　　　　*image2*, a second, generally transformed image; — 852
　　　　*Models*[ ], an array of possible models for transformation; and
　　　　*numModels*, the number of models in *Models*[ ]; — 853 output:
　if acceptable model identified, the index *bestModel* for the best model identified in *Models*[ ] and the best value for the model parameter *p*;
　else failure. — 854

Routine "find parameter"

input:　*image1*;
　　　　*image2*; and — 855
　　　　*model*, a particular model in *Models*[ ];

output: *ratio*, the ratio of pixels in *image1* correctly transformed by model to a transformed location; — 856
　　*p*, the best model parameter value; and — 857
　　*error*, a cumulative error for the transformation. — 858

FIG. 8F

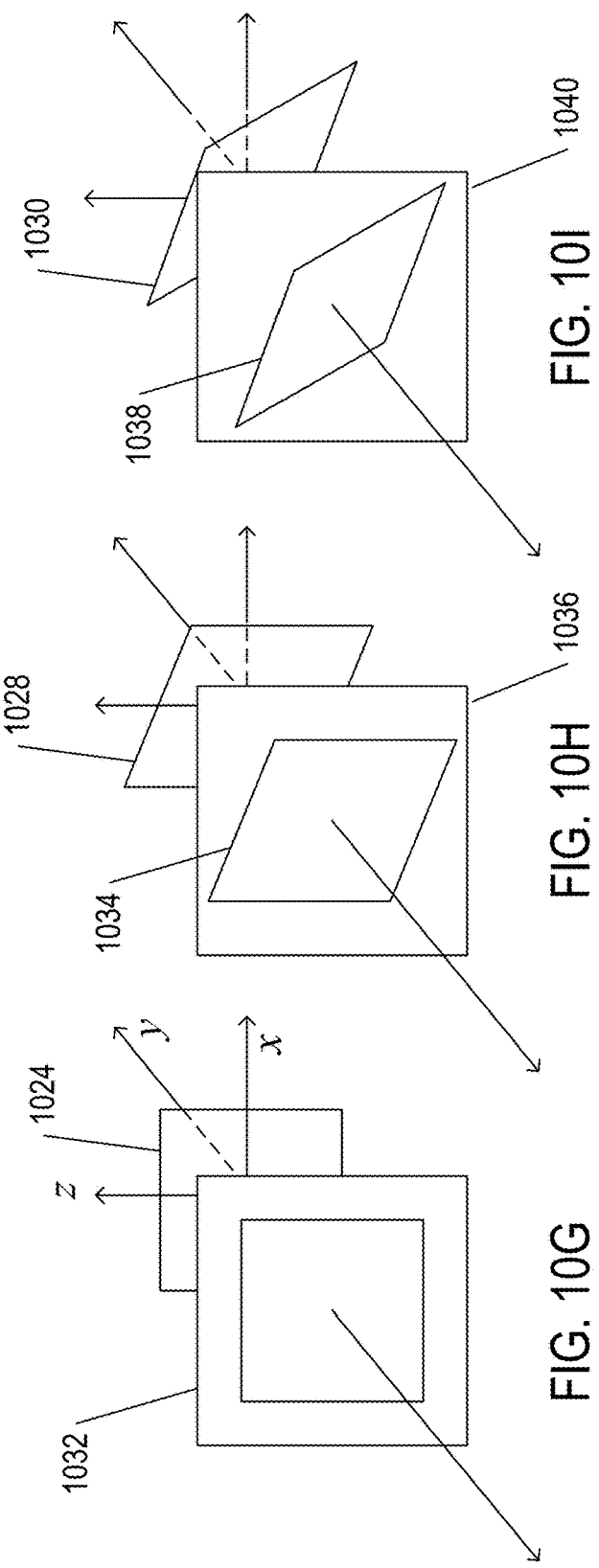

$$\mathbf{T}_{w_0} = \begin{bmatrix} 1 & 0 & 0 & -X_0 \\ 0 & 1 & 0 & -Y_0 \\ 0 & 0 & 1 & -Z_0 \\ 0 & 0 & 0 & 1 \end{bmatrix} \text{—1170}$$

$$\mathbf{R} = \mathbf{R}_\alpha \mathbf{R}_\theta = \begin{bmatrix} \cos\gamma & \sin\gamma & 0 & 0 \\ -\sin\gamma\sin\alpha & \cos\gamma\cos\alpha & \sin\alpha & 0 \\ \sin\gamma\sin\alpha & -\cos\gamma\sin\alpha & \cos\alpha & 0 \\ 0 & 0 & 0 & 1 \end{bmatrix} \text{—1172}$$

$$\mathbf{C} = \begin{bmatrix} 1 & 0 & 0 & -r_1 \\ 0 & 1 & 0 & -r_2 \\ 0 & 0 & 1 & -r_3 \\ 0 & 0 & 0 & 1 \end{bmatrix} \text{—1174}$$

$\mathbf{c}_h = \mathbf{P}\,\mathbf{C}\,\mathbf{R}\,\mathbf{T}_{w_0}\,\mathbf{w}_h$ —1176

$\mathbf{w}_h = \mathbf{T}_{w_0}^{-1}\,\mathbf{R}^{-1}\,\mathbf{C}^{-1}\,\mathbf{P}^{-1}\,\mathbf{c}_h$ —1178

$(x,z) = f(X,Y,Z,\text{camera\_parameters})$ —1180

$(X,Y,Z) = f^{-1}(x,z,\text{camera\_parameters})$ —1181

FIG. 11E $\mathbf{c}_h = \mathbf{M}\mathbf{w}_h$ —— 1190

$\mathbf{c}'_h = \mathbf{M}\mathbf{T}\mathbf{R}\mathbf{S}\mathbf{w}_h$ —— 1191

$\mathbf{M}^{-1}\mathbf{c}_h = \mathbf{w}_h$ —— 1192

$\mathbf{c}'_h = \mathbf{M}\mathbf{T}\mathbf{R}\mathbf{S}\mathbf{M}^{-1}\mathbf{c}_h$ —— 1194

$\mathbf{c}'_h = \mathbf{M}*\mathbf{c}_h$ —— 1195

$$\begin{bmatrix} k'x' \\ k'y' \\ k'z' \\ k' \end{bmatrix} = \mathbf{M} * \begin{bmatrix} kx \\ ky \\ kz \\ k \end{bmatrix}$$ —— 1196

$$\begin{bmatrix} k'x' \\ k'y' \\ 0 \\ k' \end{bmatrix} = \mathbf{M} * \begin{bmatrix} kx \\ ky \\ 0 \\ k \end{bmatrix}$$ —— 1197

$$\mathbf{M} * \begin{bmatrix} a & b & c & d \\ e & f & g & h \\ i & j & k & l \\ m & n & o & p \end{bmatrix}$$ —— 1198

$$\mathbf{M}  \begin{bmatrix} a & b & d \\ e & f & h \\ m & n & p \end{bmatrix}$$ —— 1199a $$\begin{bmatrix} k'x' \\ k'y' \\ k' \end{bmatrix} = \mathbf{M}  \begin{bmatrix} kx \\ ky \\ k \end{bmatrix}$$ —— 1199b $$\begin{bmatrix} k'x'_1 & k'x'_2 & k'x'_3 & k'x'_4 \\ k'y'_1 & k'y'_2 & k'y'_3 & k'y'_4 \\ k' & k' & k' & k' \end{bmatrix} = \mathbf{M} ** \begin{bmatrix} kx_1 & kx_2 & kx_3 & kx_4 \\ ky_1 & ky_2 & ky_3 & ky_4 \\ k & k & k & k \end{bmatrix}$$ —— 1199c

FIG. 11F

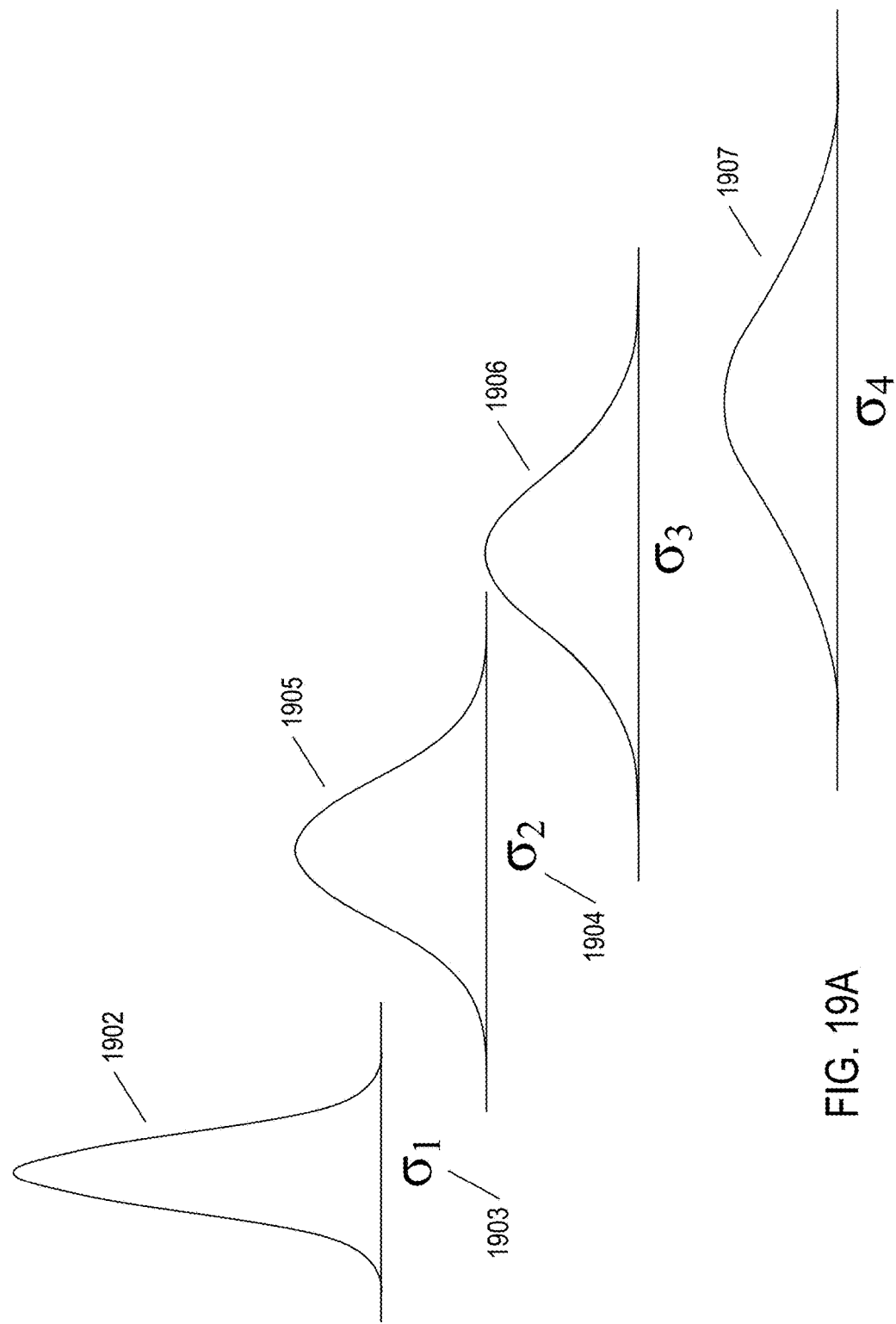

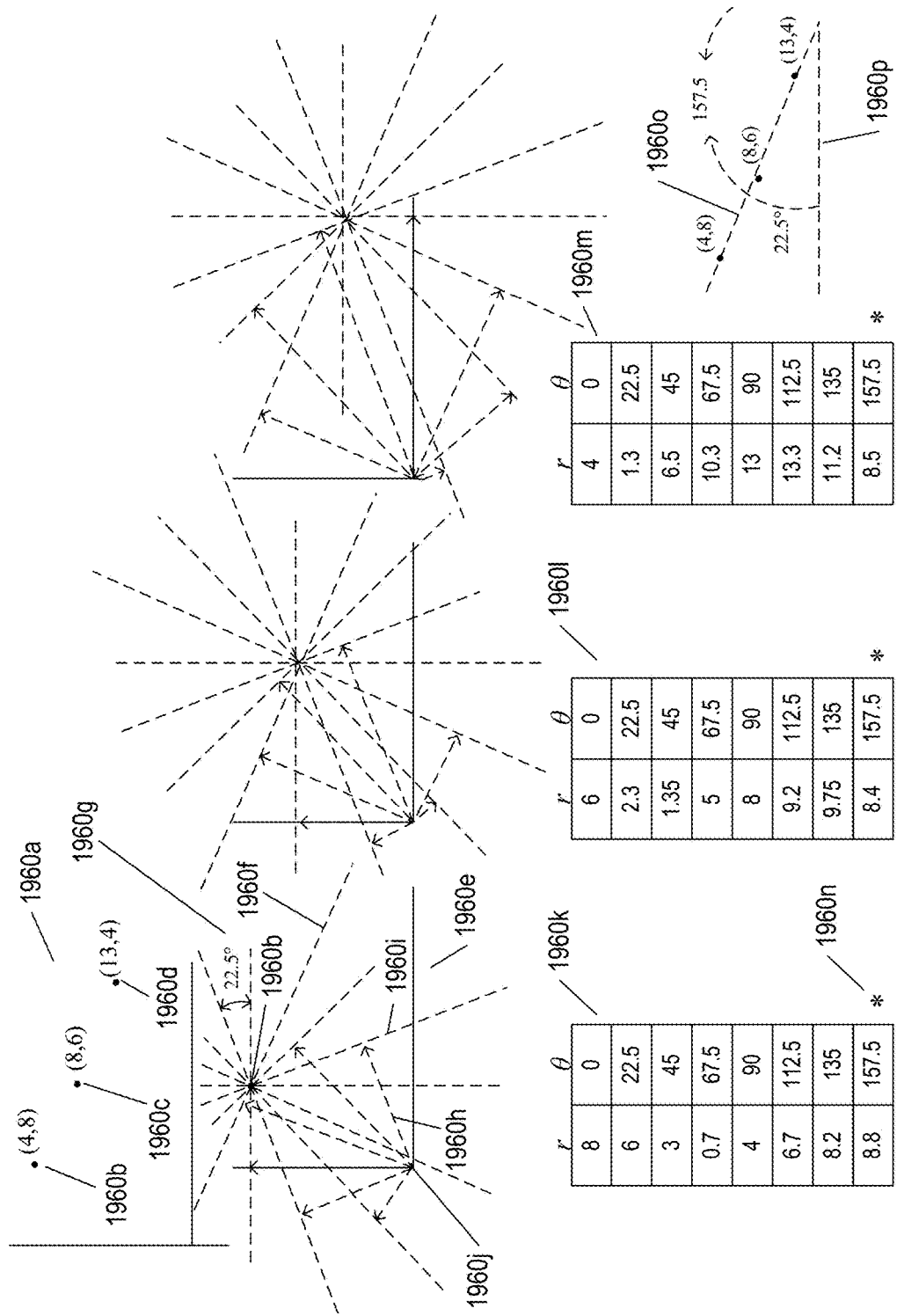

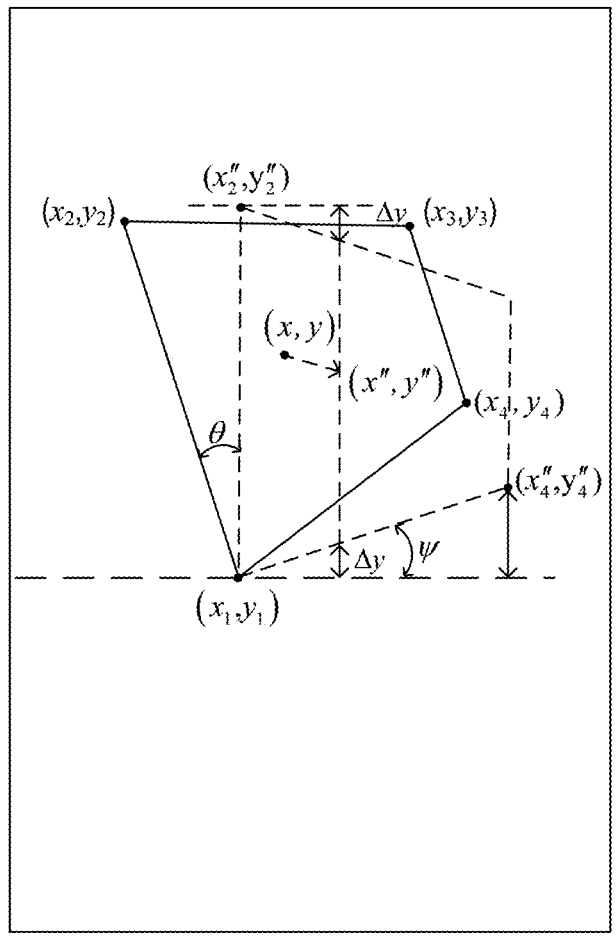

$$x' = x - x_1$$
$$y' = y - y_1$$
$$x'_4 = x_4 - x_1$$
$$y'_4 = y_4 - y_1$$
$$x'_2 = x_2 - x_1$$
$$y'_2 = y_2 - y_1$$

$$\begin{bmatrix} x'' \\ y'' \end{bmatrix} = \begin{bmatrix} \cos\theta & \sin\theta \\ -\sin\theta & \cos\theta \end{bmatrix} \begin{bmatrix} x' \\ y' \end{bmatrix}$$

$$\begin{bmatrix} x''_4 \\ y''_4 \end{bmatrix} = \begin{bmatrix} \cos\theta & \sin\theta \\ -\sin\theta & \cos\theta \end{bmatrix} \begin{bmatrix} x'_4 \\ y'_4 \end{bmatrix}$$

$$\begin{bmatrix} x''_2 \\ y''_2 \end{bmatrix} = \begin{bmatrix} \cos\theta & \sin\theta \\ -\sin\theta & \cos\theta \end{bmatrix} \begin{bmatrix} x'_2 \\ y'_2 \end{bmatrix}$$

$$x_r = x'' / x''_4$$

$$\Delta y = \frac{y''_4 x''}{x''_4}$$

$$y_r = (y'' - \Delta y) / (y''_2 - \alpha \Delta y)$$

FIG. 20G

AUTOMATED METHODS AND SYSTEMS FOR LOCATING DOCUMENT SUBIMAGES IN IMAGES TO FACILITATE EXTRACTION OF INFORMATION FROM THE LOCATED DOCUMENT SUBIMAGES

CROSS REFERENCE TO RELATED APPLICATIONS

The present application claims the benefit of priority under 35 USC 119 to Russian Patent Application No. 2016138329, filed Sep. 27, 2016; disclosure of which is herein incorporated by reference in its entirety for all purposes.

TECHNICAL FIELD

The present document is related to image processing and optical character recognition and, in particular, to methods and systems that identify and characterize document subimages in images so that optical-character-recognition methods can be applied to the document subimages to extract information from the imaged documents.

BACKGROUND

Printed natural-language documents continue to represent a widely used communications medium among individuals, within organizations, for distribution of information among information consumers, and for various types of information-exchange transactions. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

In the past, electronic scanners were large-size desktop, table top, and free-standing electronic appliances. However, with the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops. Digital images of text-containing documents produced by these hand-held devices and appliances can then be processed, by computational optical-character-recognition systems, including optical-character-recognition applications in smart phones, to produce corresponding electronic documents.

Unfortunately, hand-held document imaging is associated with increased noise, optical blur, non-standard position and orientation of the imaging device with respect to a document being imaged, interfering lighting and contrast effects generated by irregular backgrounds, and other defects and deficiencies in the text-containing digital images produced by the hand-held devices and appliances in comparison with dedicated document-scanning appliances. These defects and deficiencies can seriously degrade the performance of computational optical-character recognition, greatly increasing the frequency of erroneous character recognition and failure of optical-character-recognition methods and systems to produce text encoding of all or large regions of digital text-containing images. Thus, while hand-held document-imaging devices and appliances have great advantages in cost and user accessibility, they are associated with disadvantages and drawbacks that can frustrate and prevent generation of electronic documents from digital text-containing images captured by hand-held devices and appliances. Even text-containing digital images obtained by stationary imaging systems may be associated with defects and deficiencies that can render the results of subsequently applied image-processing methods unsatisfactory. For this reason, designers and developers of imaging devices and appliances and optical-character-recognition methods and systems, as well as users of the devices, appliances, and optical-character-recognition systems, continue to seek methods and systems to ameliorate the defects and deficiencies inherent in many text-containing digital images, including mobile-device-captured digital text-containing digital images, that frustrate subsequent computational image processing of the text-containing digital images.

SUMMARY

The present document is directed to methods and subsystems that identify and characterize document-containing subimages in a document-containing image. In one implementation, each type of document is modeled as a set of features that are extracted from a set of images known to contain the document. To locate and characterize a document subimage in an image, the currently described methods and subsystems extract features from the image and then match model features of each model in a set of models to the extracted features to select the model that best corresponds to the extracted features. Additional information contained in the selected model is then used to identify the location of the subimage corresponding to the document and to process the document subimage to correct for a variety of distortions and deficiencies in order to facilitate subsequent data extraction from the corrected document subimage.

BRIEF DESCRIPTION OF THE DRAWINGS

FIG. 2A illustrates two different types of hand-held imaging devices.

FIG. 2B illustrates two different types of hand-held imaging devices.

FIG. 2C illustrates two different types of hand-held imaging devices.

FIG. 8E illustrates models that express transformations of a first document image to a second document image and a method for selecting a particular model from among a set of candidate models to describe a particular transformation for two corresponding document images.

FIG. 8F illustrates models that express transformations of a first document image to a second document image and a method for selecting a particular model from among a set of candidate models to describe a particular transformation for two corresponding document images.

FIG. 10G illustrates certain of the many problems and challenges associated with identifying document subimages within a digital image, particularly a digital image captured by a hand-held smart phone or other mobile processor-controlled device.

FIG. 10H illustrates certain of the many problems and challenges associated with identifying document subimages within a digital image, particularly a digital image captured by a hand-held smart phone or other mobile processor-controlled device.

FIG. 10I illustrates certain of the many problems and challenges associated with identifying document subimages within a digital image, particularly a digital image captured by a hand-held smart phone or other mobile processor-controlled device.

FIG. 11E illustrates one approach to mapping points in a world coordinate system to corresponding points on an image plane of a camera.

FIG. 11F illustrates one approach to mapping points in a world coordinate system to corresponding points on an image plane of a camera.

FIG. 19A illustrates the selection of candidate feature points from an image.

FIG. 19I illustrates a simple, one-parameter application of the Hough transform.

FIG. 20G provides an overview of the methods and systems to which the current document is directed as well as a detailed description of document-model creation according to the currently disclosed methods and systems.

DETAILED DESCRIPTION

The present document is directed to methods and subsystems that identify and characterize document-containing subimages in a document-containing image. The following discussion is subdivided into a number of subsections, including: (1) An Overview of Computer Architecture and Digital Images; (2) An Example RANSAC-Like Model Selection Method; (3) The Current Problem Domain and Several Document-Type Examples; (4) Perspective Transformations; (5) Feature Detectors; and (6) a final subsection in which the methods and subsystems to which the current document is directed are discussed.

Overview of Computer Architecture and Digital Images

Figure 1:
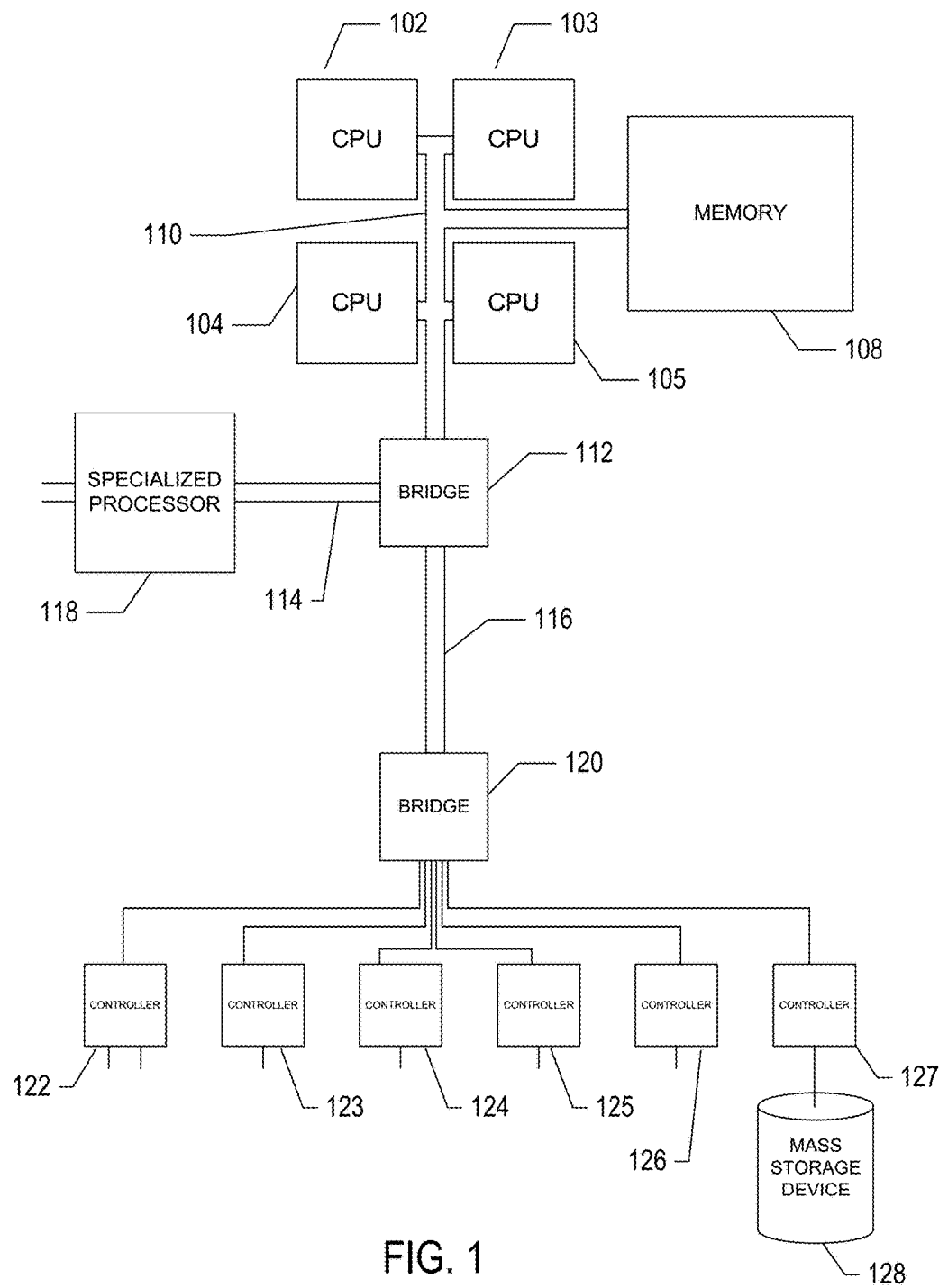
FIG. 1 provides a high-level architectural diagram of a computer system, such as a computer system in which the currently disclosed document-subimage-recognition subsystem is implemented.

FIG. 1 provides a high-level architectural diagram of a computer system, such as a computer system in which the currently disclosed document-subimage-recognition subsystem is implemented. Mobile imaging devices, including smart phones and digital cameras, can be similarly diagramed and also include processors, memory, and internal busses. Those familiar with modern technology and science well appreciate that a control program or control routine comprising computer instructions stored in a physical memory within a processor-controlled device constitute the control component for the device and are as physical, tangible, and important as any other component of an electromechanical device, including image-capturing devices. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2D:
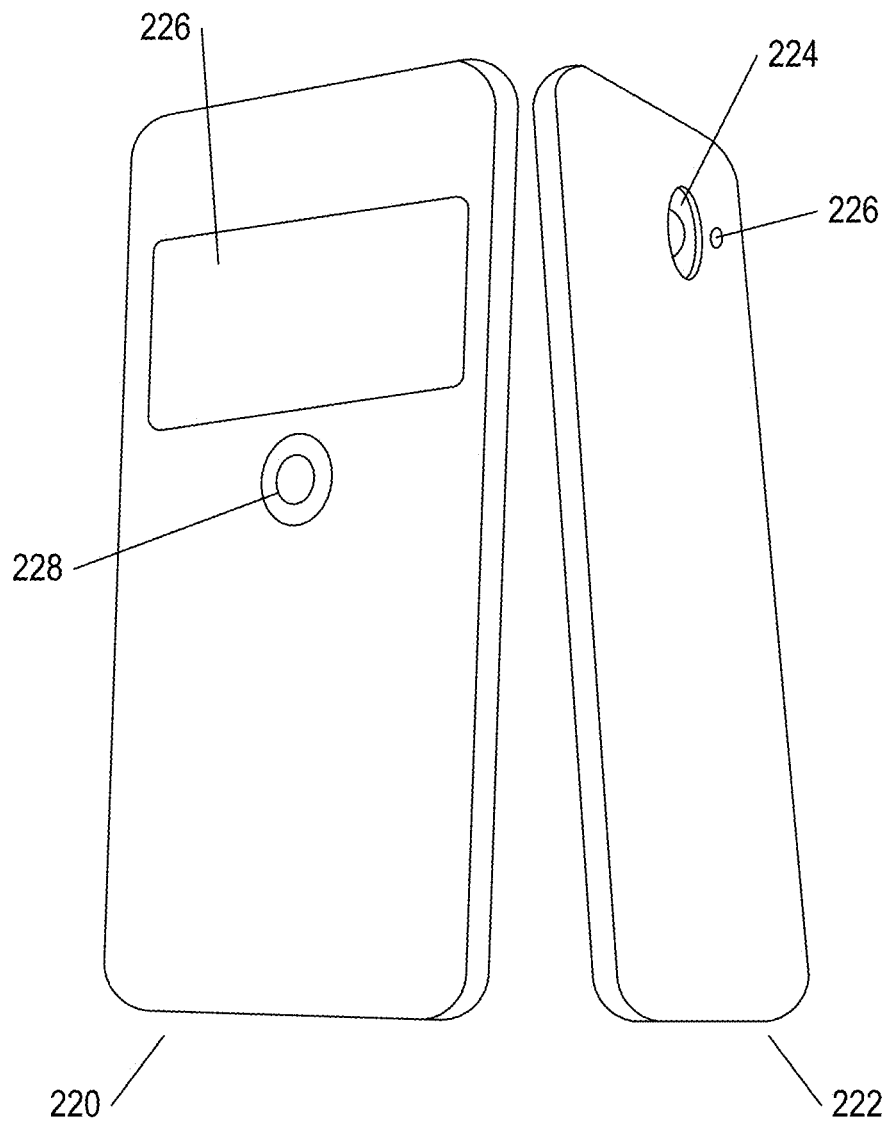
FIG. 2D illustrates two different types of hand-held imaging devices.

FIGS. 2A-D illustrate two different types of hand-held imaging devices. FIGS. 2A-C illustrate a digital camera 202. The digital camera includes an objective lens 204 and a shutter button 205 that, when depressed by a user, results in capture of a digital image corresponding to reflected light entering the lens 204 of the digital camera. On the back side of the digital camera, viewed by a user when the user is holding a camera to capture digital images, the digital camera includes a viewfinder 206 and an LCD viewfinder screen 208. The viewfinder 206 allows a user to directly view the image currently generated by the camera lens 204, while the LCD viewfinder screen 208 provides an electronic display of the image currently produced by the camera lens. Generally, the camera user adjusts the camera focus, using annular focus-adjusting features 210 while looking through the viewfinder 206 or observing the LCD viewfinder screen 208 in order to select a desired image prior to depressing the shutter button 205 to digitally capture the image and store the image in electronic memory within the digital camera.

FIG. 2D shows a typical smart phone from the front side 220 and from the back side 222. The back side 222 includes a digital-camera lens 224 and digital light meter and/or proximity sensor 226. The front side of the smart phone 220 may, under application control, display the currently received image 226, similar to the LCD viewfinder display 208 of the digital camera, as well as a touch-sensitive shutter-button 228, input of a touch to which captures a digital image within the smart-phone memory.

Figure 3:
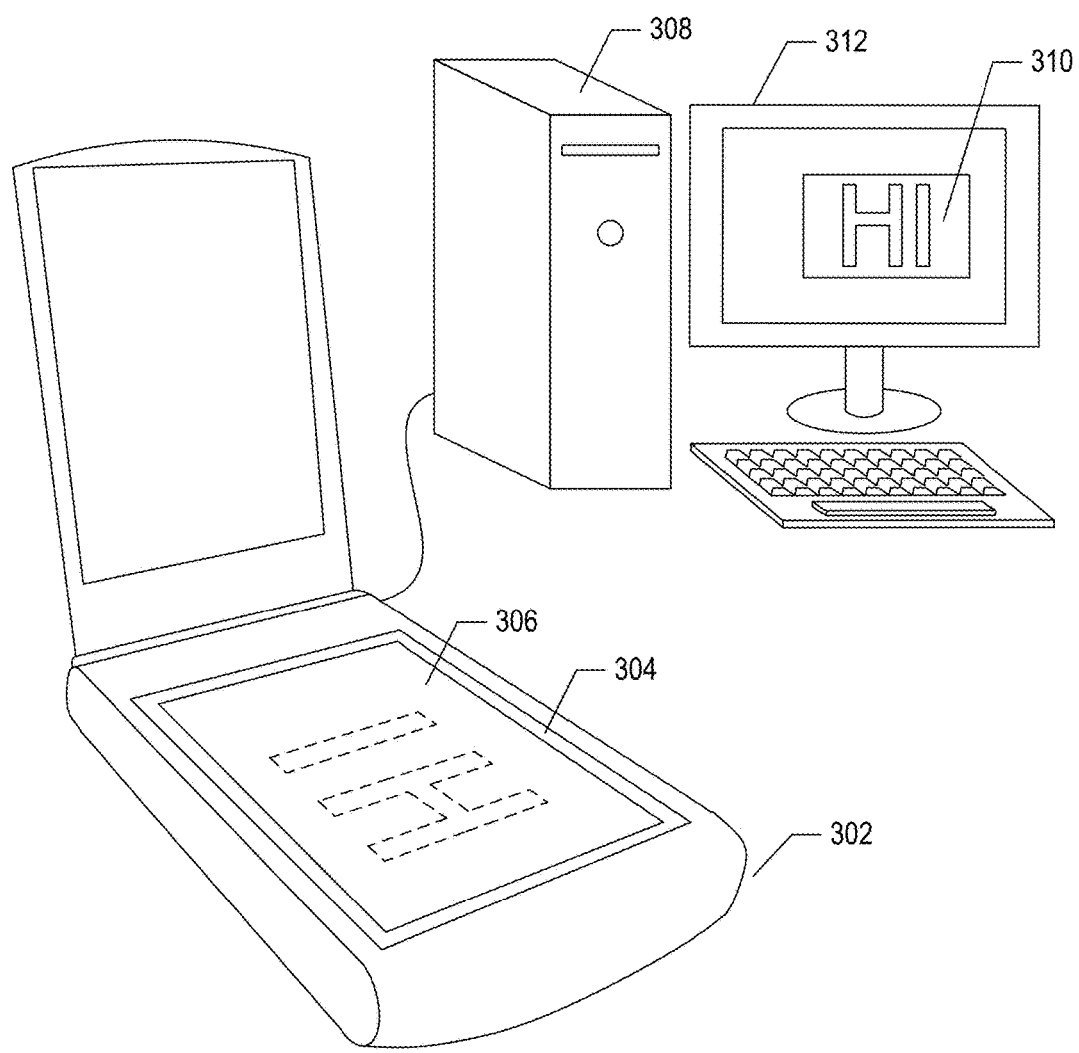
FIG. 3 illustrates a typical desktop scanner and personal computer that are together used to convert printed documents into digitally encoded electronic documents stored in mass-storage devices and/or electronic memories.

FIG. 3 illustrates a typical desktop scanner and personal computer that are together used to convert printed documents into digitally encoded electronic documents stored in mass-storage devices and/or electronic memories. The desktop scanning device 302 includes a transparent glass bed 304 onto which a document is placed, face down 306. Activation of the scanner produces a digitally encoded scanned-document image which may be transmitted to the personal computer ("PC") 308 for storage in a mass-storage device. A scanned-document-image-rendering program may render the digitally encoded scanned-document image for display 310 on a PC display device 312. A desktop scanner provides a more stable and accurate imaging platform for documents than a hand-held device, but may also generate documents images with contrast problems, distortions, and other defects.

Figure 4:
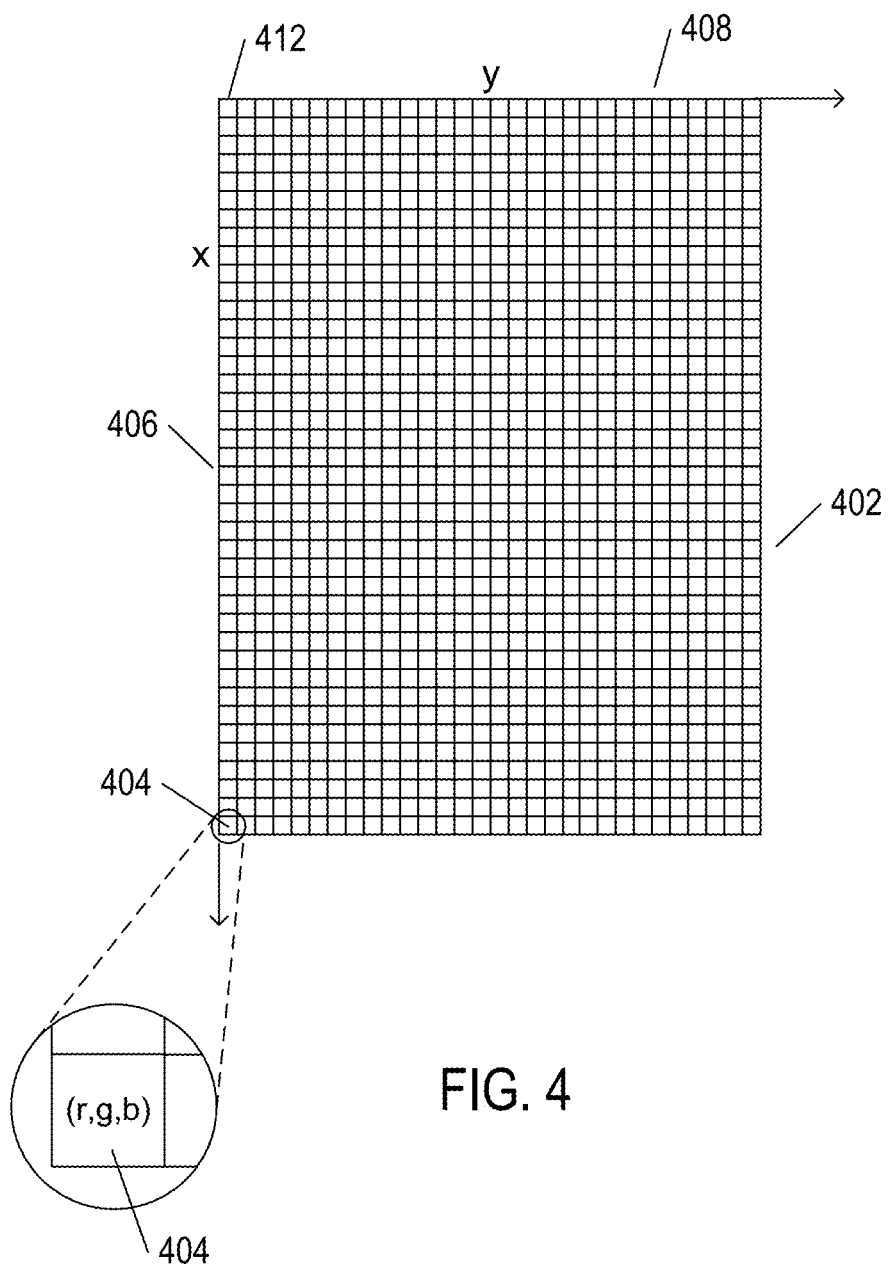
FIG. 4 illustrates a typical digitally encoded image.

FIG. 4 illustrates a typical digitally encoded image. The encoded image comprises a two dimensional array of pixels 402. In FIG. 4, each small square, such as square 404, is a pixel, generally defined as the smallest-granularity portion of an image that is numerically specified in the digital encoding. Each pixel is a location, generally represented as a pair of numeric values corresponding to orthogonal x and y axes 406 and 408, respectively. Thus, for example, pixel 404 has x, y coordinates (39,0), while pixel 412 has coordinates (0,0). In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 4, each pixel is associated with three values, or coordinates (r,g,b), which specify the red, green, and blue intensity components of the color to be displayed in the region corresponding to the pixel.

Figure 5:
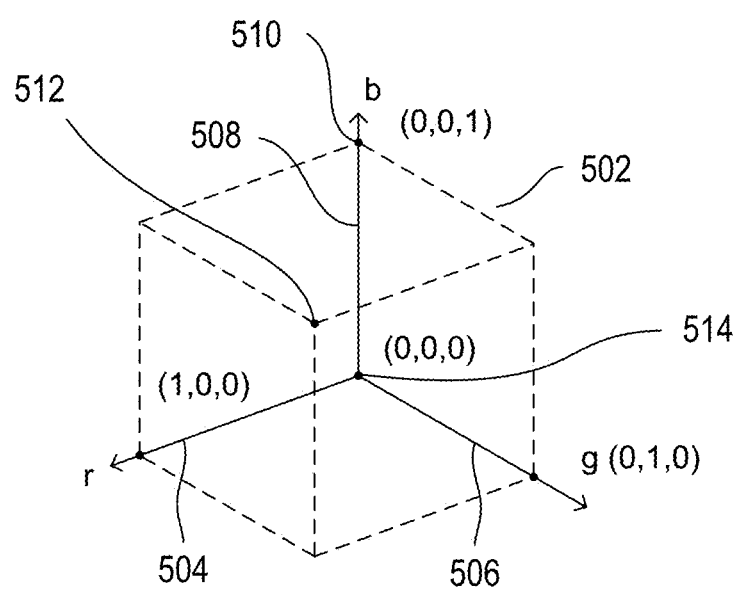
FIG. 5 illustrates one version of the RGB color model.

FIG. 5 illustrates one version of the RGB color model. The entire spectrum of colors is represented, as discussed above with reference to FIG. 4, by a three-primary-color coordinate (r,g,b). The color model can be considered to correspond to points within a unit cube 502 within a three-dimensional color space defined by three orthogonal axes: (1) r 504; (2) g 506; and (3) b 508. Thus, the individual color coordinates range from 0 to 1 along each of the three color axes. The pure blue color, for example, of greatest possible intensity corresponds to the point 510 on the b axis with coordinates (0,0,1). The color white corresponds to the point 512, with coordinates (1,1,1,) and the color black corresponds to the point 514, the origin of the coordinate system, with coordinates (0,0,0).

Figure 6:
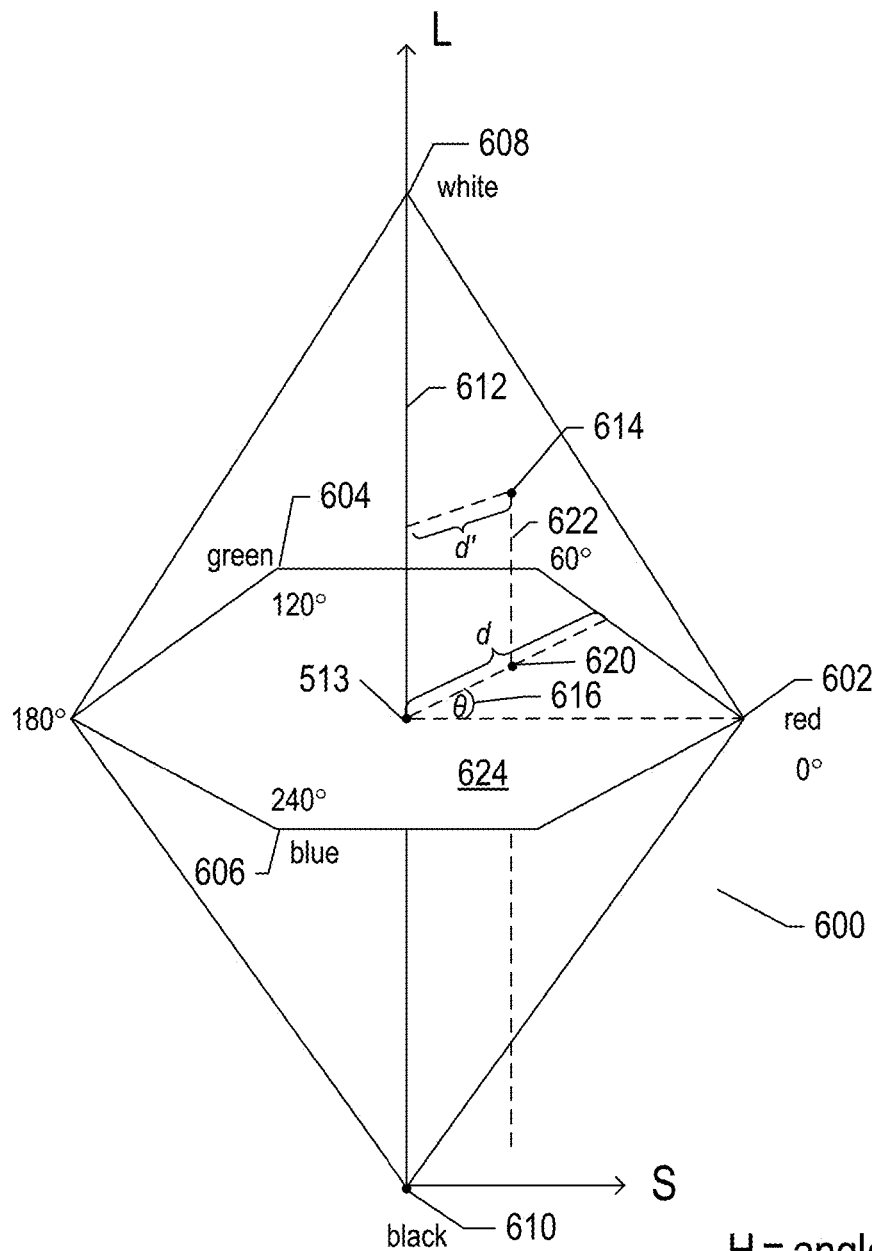
FIG. 6 shows a different color model, referred to as the "hue-saturation-lightness" ("HSL") color model.

FIG. 6 shows a different color model, referred to as the "hue-saturation-lightness" ("HSL") color model. In this color model, colors are contained within a three-dimensional bi-pyramidal prism 600 with a hexagonal cross section. Hue (h) is related to the dominant wavelength of a light radiation perceived by an observer. The value of the hue varies from 0° to 360° beginning with red 602 at 0°, passing through green 604 at 120°, blue 606 at 240°, and ending with red 602 at 360°. Saturation (s), which ranges from 0 to 1, is inversely related to the amount of white and black mixed with a particular wavelength, or hue. For example, the pure red color 602 is fully saturated, with saturation s=1.0, while the color pink has a saturation value less than 1.0 but greater than 0.0, white 608 is fully unsaturated, with s=0.0, and black 610 is also fully unsaturated, with s=0.0. Fully saturated colors fall on the perimeter of the middle hexagon that includes points 602, 604, and 606. A gray scale extends from black 610 to white 608 along the central vertical axis 612, representing fully unsaturated colors with no hue but different proportional combinations of black and white. For example, black 610 contains 100% of black and no white, white 608 contains 100% of white and no black and the origin 613 contains 50% of black and 50% of white. Lightness (l), or luma, represented by the central vertical axis 612, indicates the illumination level, ranging from 0 at black 610, with l=0.0, to 1 at white 608, with l=1.0. For an arbitrary color, represented in FIG. 6 by point 614, the hue is defined as angle θ 616, between a first vector from the origin 613 to point 602 and a second vector from the origin 613 to point 620 where a vertical line 622 that passes through point 614 intersects the plane 624 that includes the origin 613 and points 602, 604, and 606. The saturation is represented by the ratio of the distance of representative point 614 from the vertical axis 612, d', divided by the length of a horizontal line passing through point 620 from the origin 613 to the surface of the bi-pyramidal prism 600, d. The lightness is the vertical distance from representative point 614 to the vertical level of the point representing black 610. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \mod 6\right), & \text{when } C_{max} = r \\ 60° \times \left(\frac{b-r}{\Delta} + 2\right), & \text{when } C_{max} = g \\ 60° \times \left(\frac{r-g}{\Delta} + 4\right), & \text{when } C_{max} = b \end{cases}, \text{ and}$$

$$s = \begin{cases} 0, & \Delta = 0 \\ \frac{\Delta}{1 - |2l-1|}, & \text{otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and Δ is defined as $C_{max} - C_{min}$.

Figure 7:
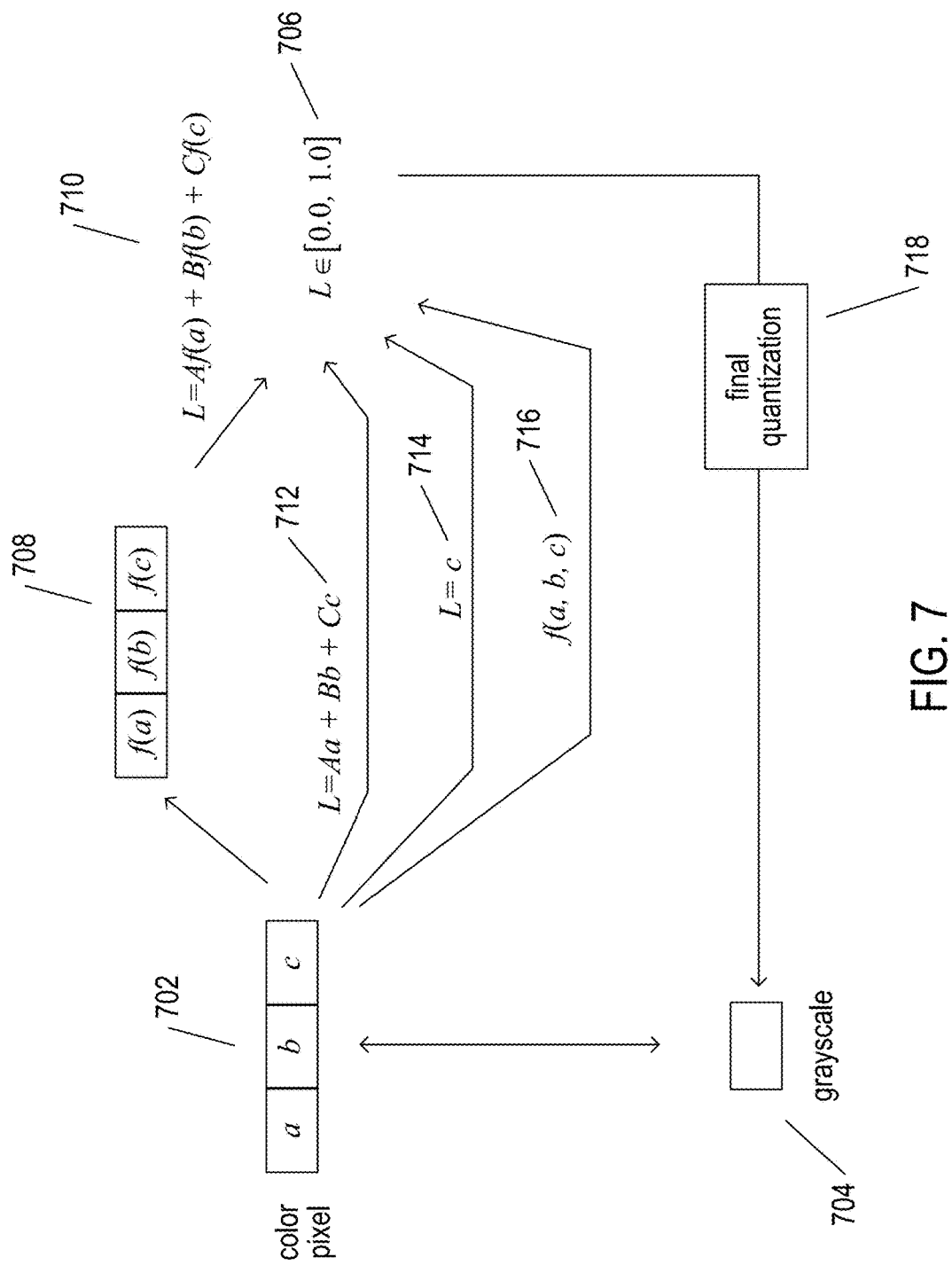
FIG. 7 illustrates generation of a grayscale or binary image from a color image.

FIG. 7 illustrates generation of a grayscale or binary image from a color image. In a color image, each pixel is generally associated with three values: a, b, and c 702. Different color models employ different values of a, b, and c to represent a particular color. A grayscale image includes only a single intensity value 704 for each pixel. A binary image is a special case of a grayscale image with only two different intensity values, 0 and 1. Commonly, grayscale images may have 256 or 65,536 different intensity values, with each pixel represented by a byte or 16-bit word, respectively. Thus, to transform a color image to grayscale, the three values a, b, and c in the color pixels need to be translated to single intensity values for the grayscale or binary image. In a first step, the three color values a, b, and c are transformed to a luminosity value L, generally in a range of [0.0, 1.0] 706. For certain color models, a function is applied to each of the color values 708 and the results are summed 710 to produce the luminosity value. In other color models, each color value is multiplied by a coefficient and the results are summed 712 to produce the luminosity value. In yet other color systems, one of the three color values is, in fact, the luminosity value 714. Finally, in the general case, a function is applied to the three color values 716 to produce the luminosity value. The luminosity value is then quantized 718 to produce a grayscale intensity value within the desired range, generally [0, 255] for grayscale images and (0,1) for binary images.

An Example RANSAC-Like Model Selection Method

Figure 8A:
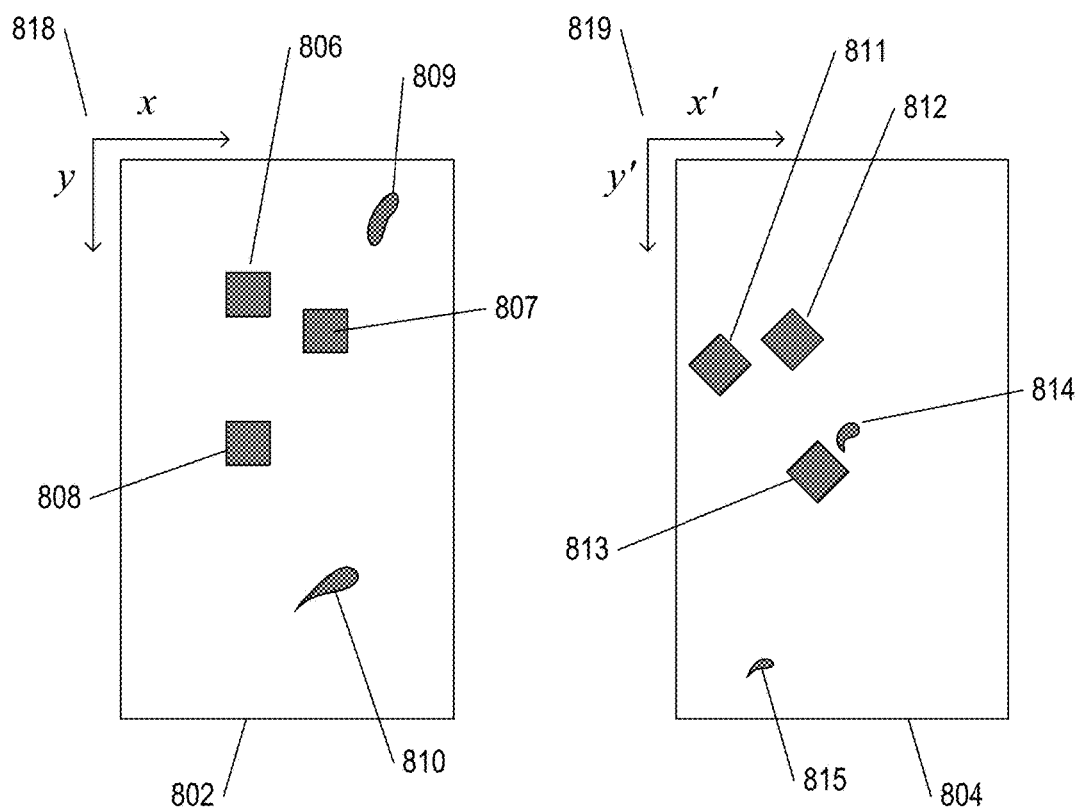
FIG. 8A illustrates models that express transformations of a first document image to a second document image and a method for selecting a particular model from among a set of candidate models to describe a particular transformation for two corresponding document images.
Figure 8B:
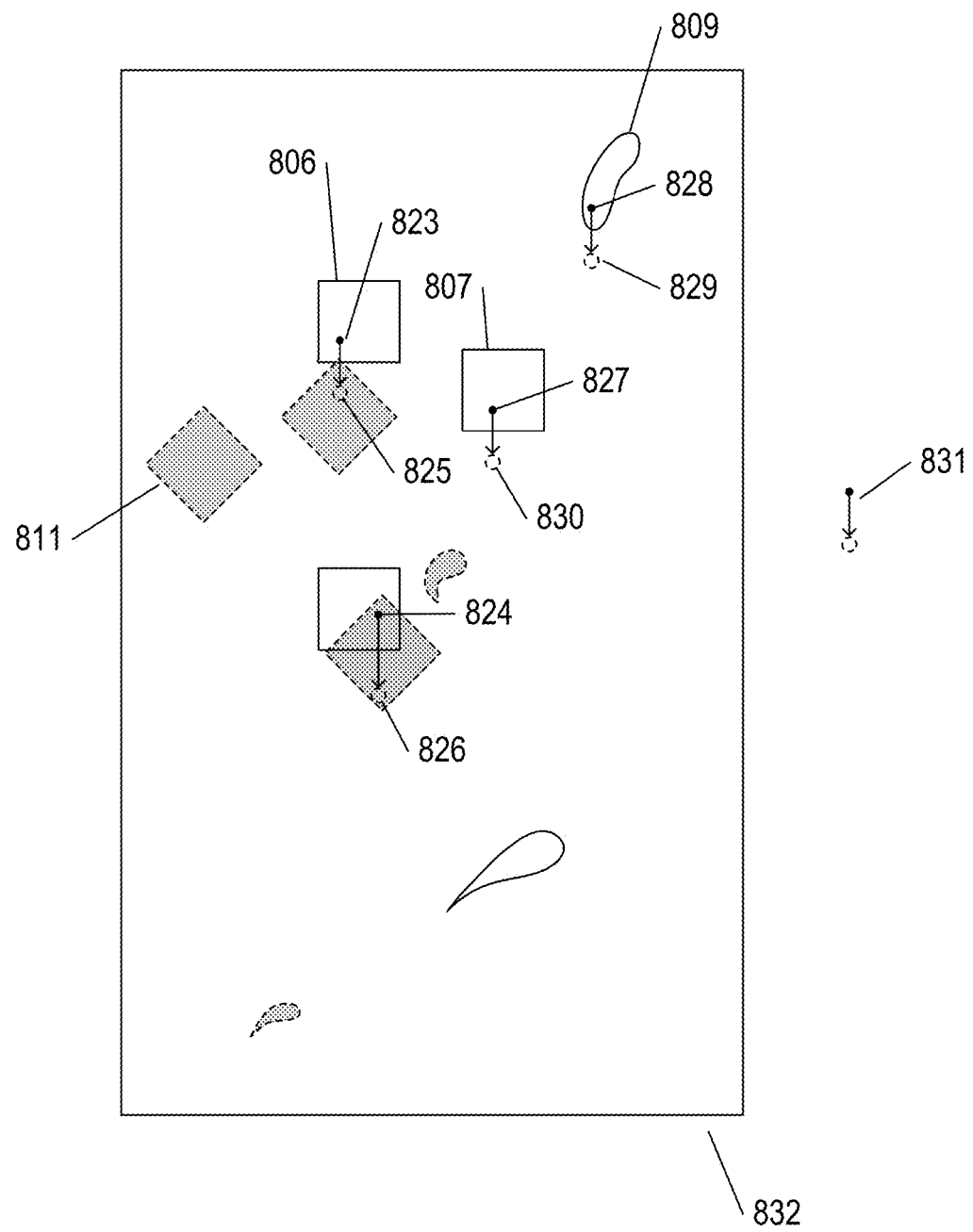
FIG. 8B illustrates models that express transformations of a first document image to a second document image and a method for selecting a particular model from among a set of candidate models to describe a particular transformation for two corresponding document images.
Figure 8C:
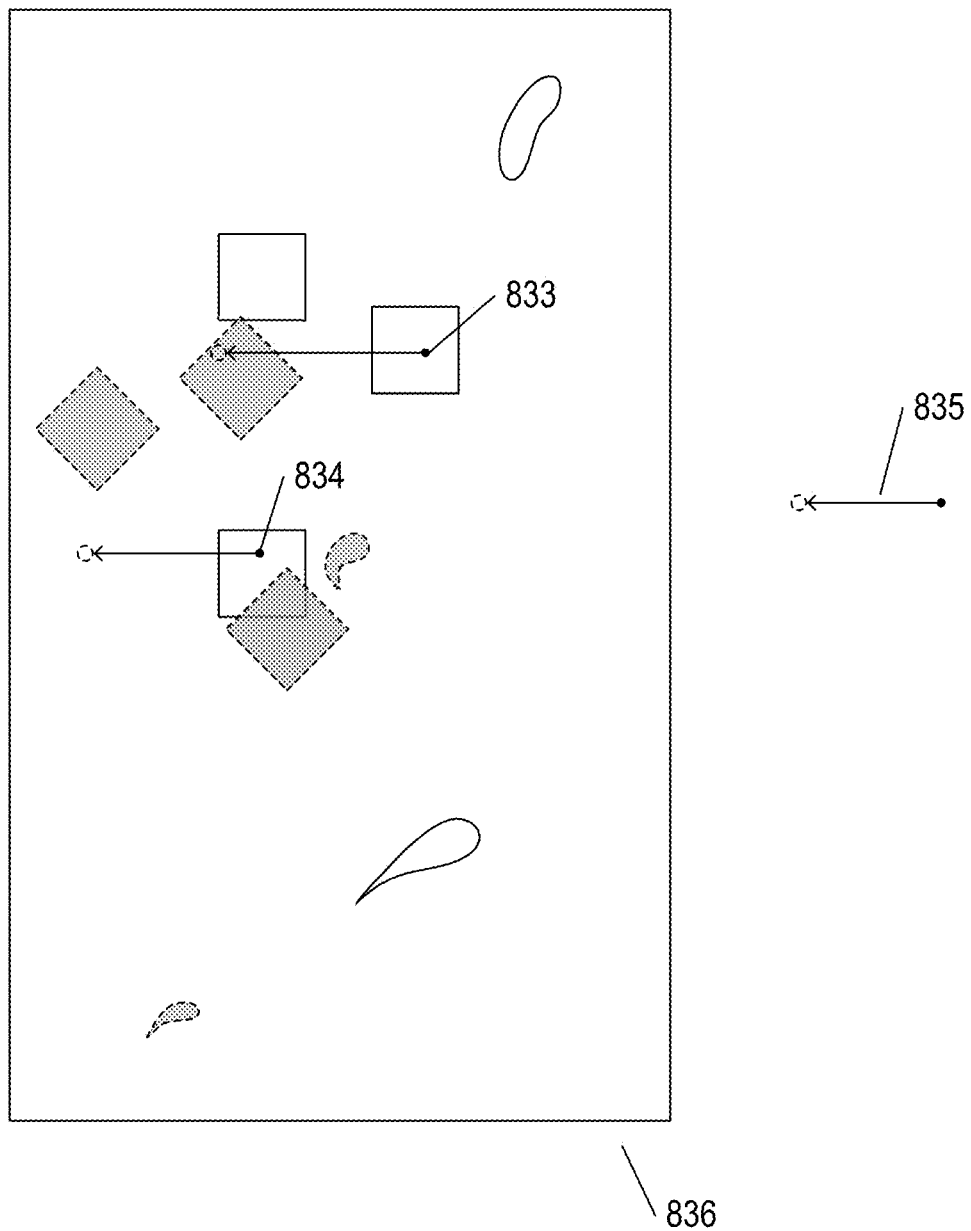
FIG. 8C illustrates models that express transformations of a first document image to a second document image and a method for selecting a particular model from among a set of candidate models to describe a particular transformation for two corresponding document images.
Figure 8D:
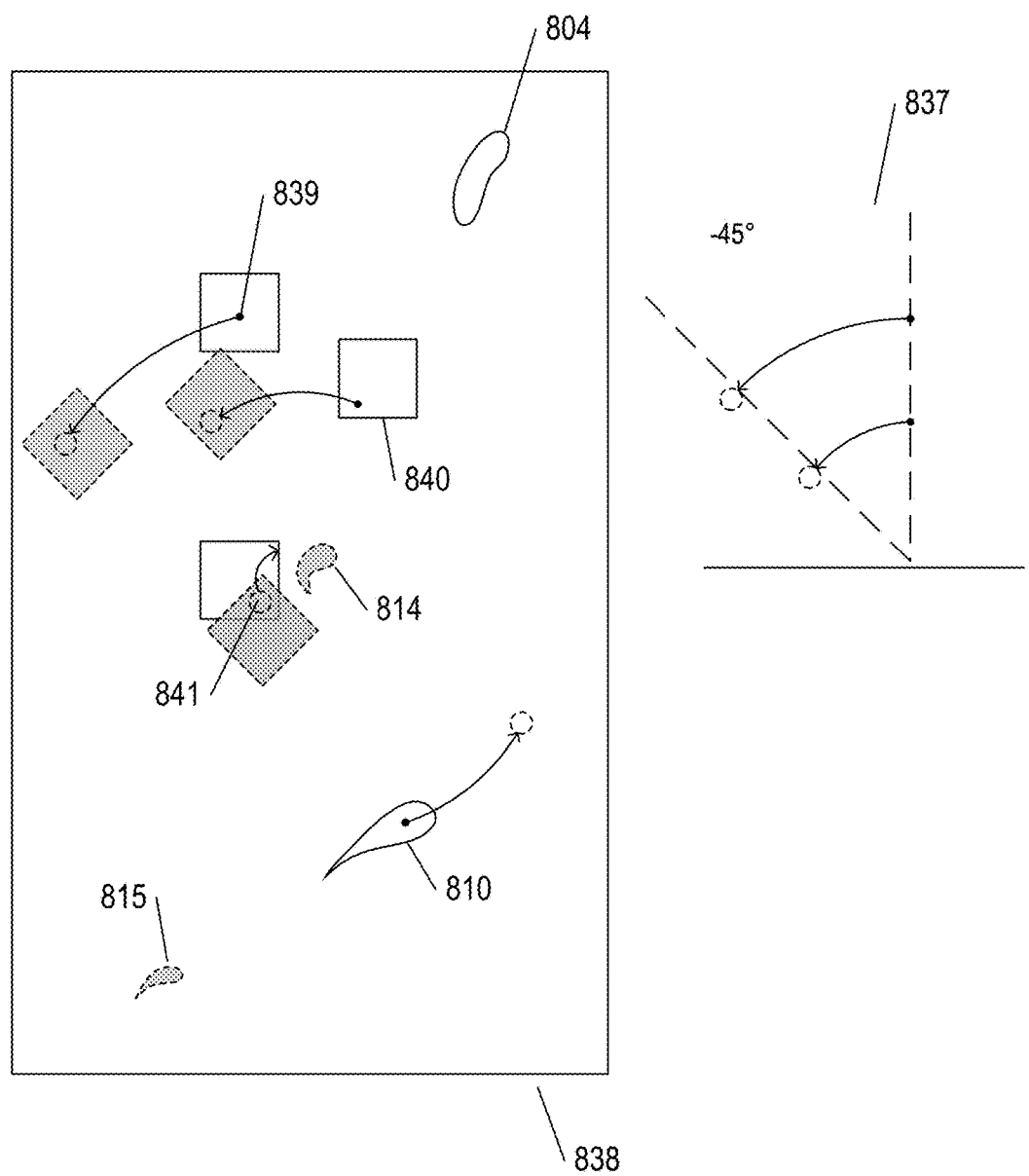
FIG. 8D illustrates models that express transformations of a first document image to a second document image and a method for selecting a particular model from among a set of candidate models to describe a particular transformation for two corresponding document images.
Figure 8G:
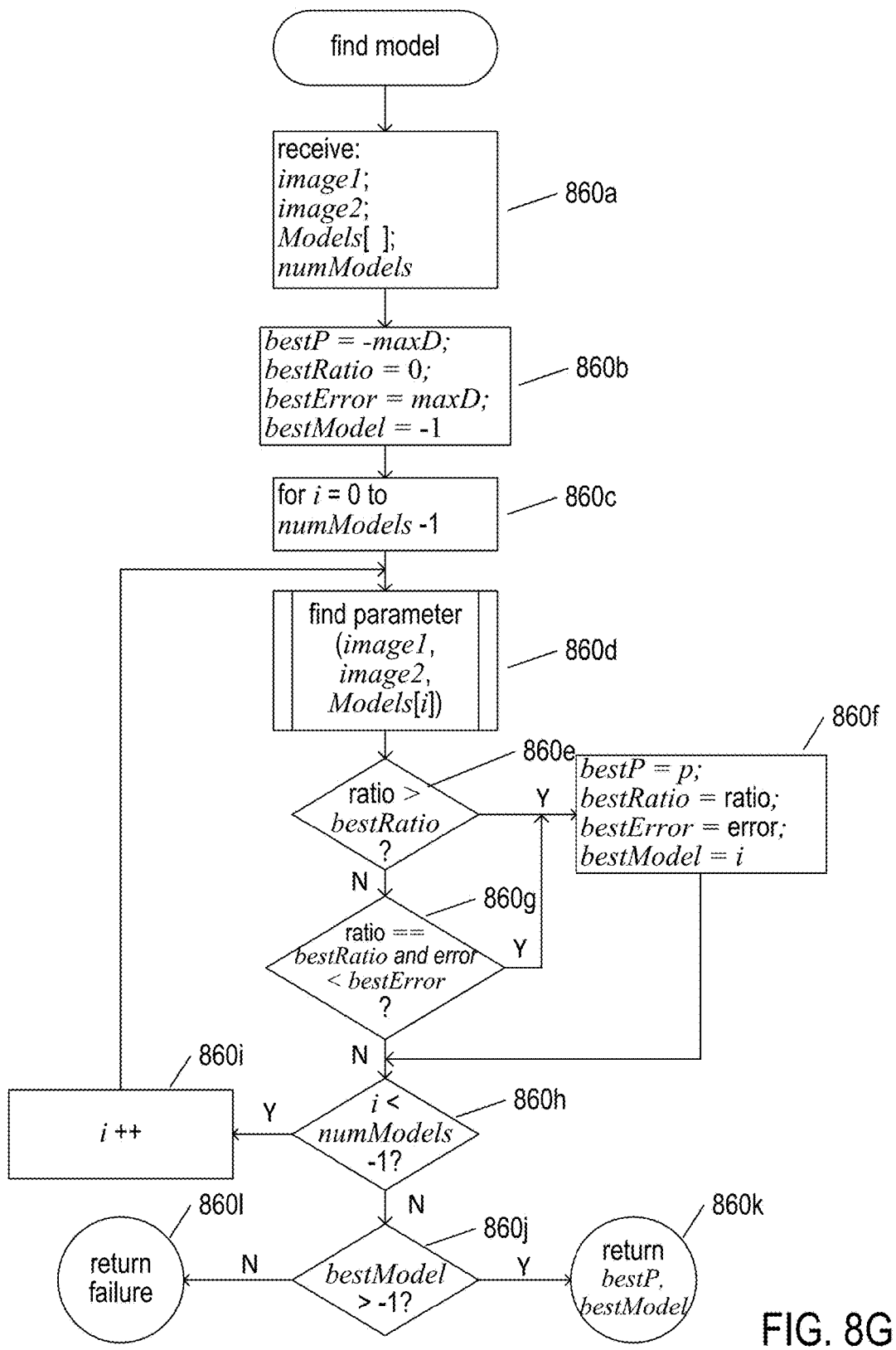
FIG. 8G illustrates models that express transformations of a first document image to a second document image and a method for selecting a particular model from among a set of candidate models to describe a particular transformation for two corresponding document images.
Figure 8H:
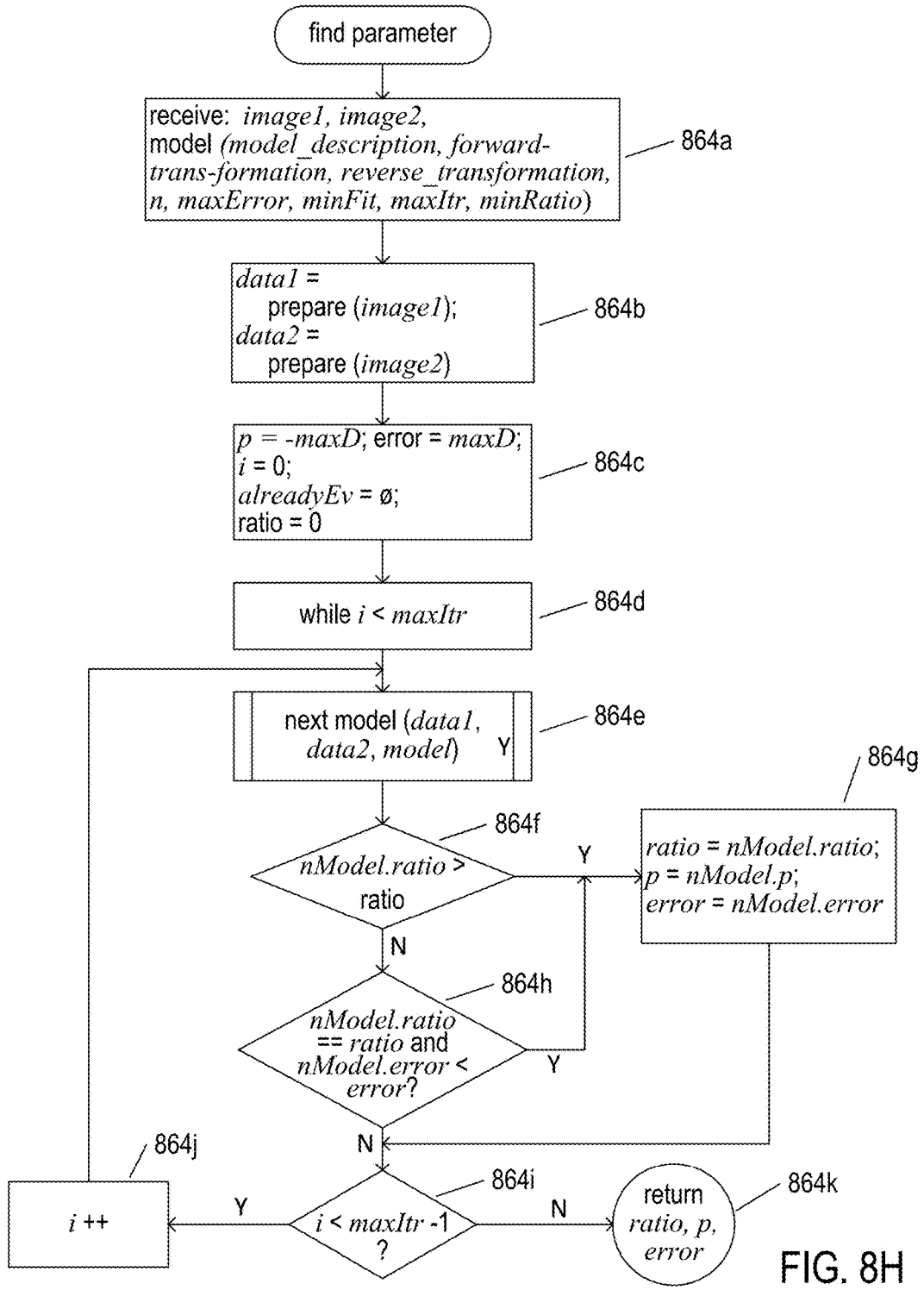
FIG. 8H illustrates models that express transformations of a first document image to a second document image and a method for selecting a particular model from among a set of candidate models to describe a particular transformation for two corresponding document images.
Figure 8I:
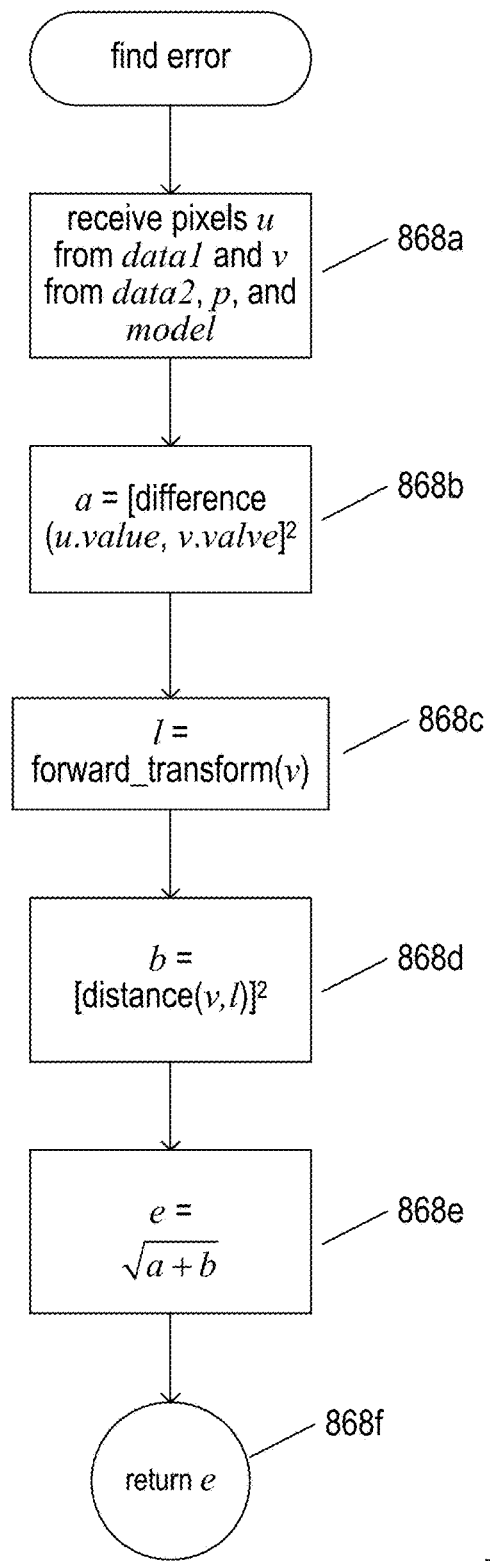
FIG. 8I illustrates models that express transformations of a first document image to a second document image and a method for selecting a particular model from among a set of candidate models to describe a particular transformation for two corresponding document images.
Figure 8J:
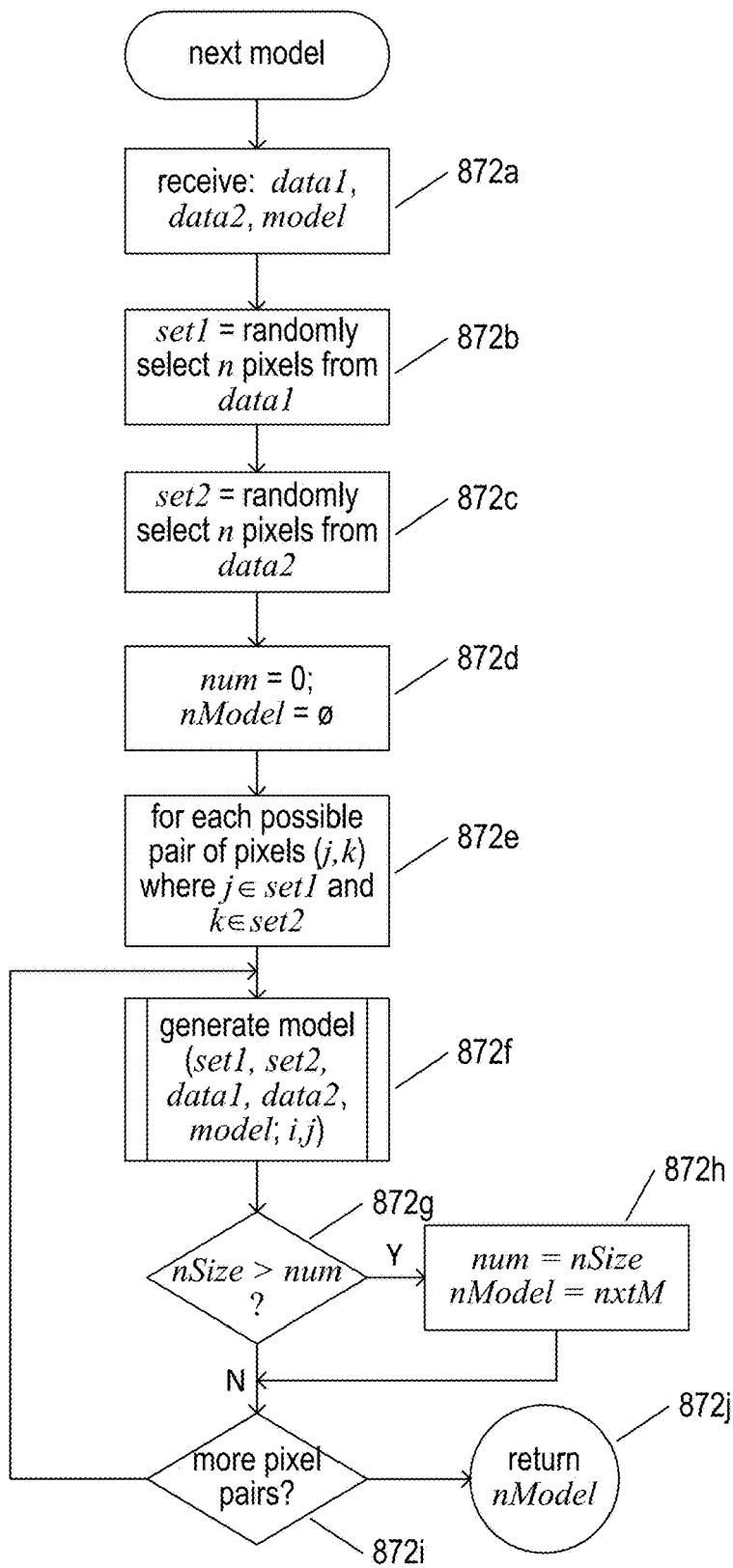
FIG. 8J illustrates models that express transformations of a first document image to a second document image and a method for selecting a particular model from among a set of candidate models to describe a particular transformation for two corresponding document images.
Figure 8K:
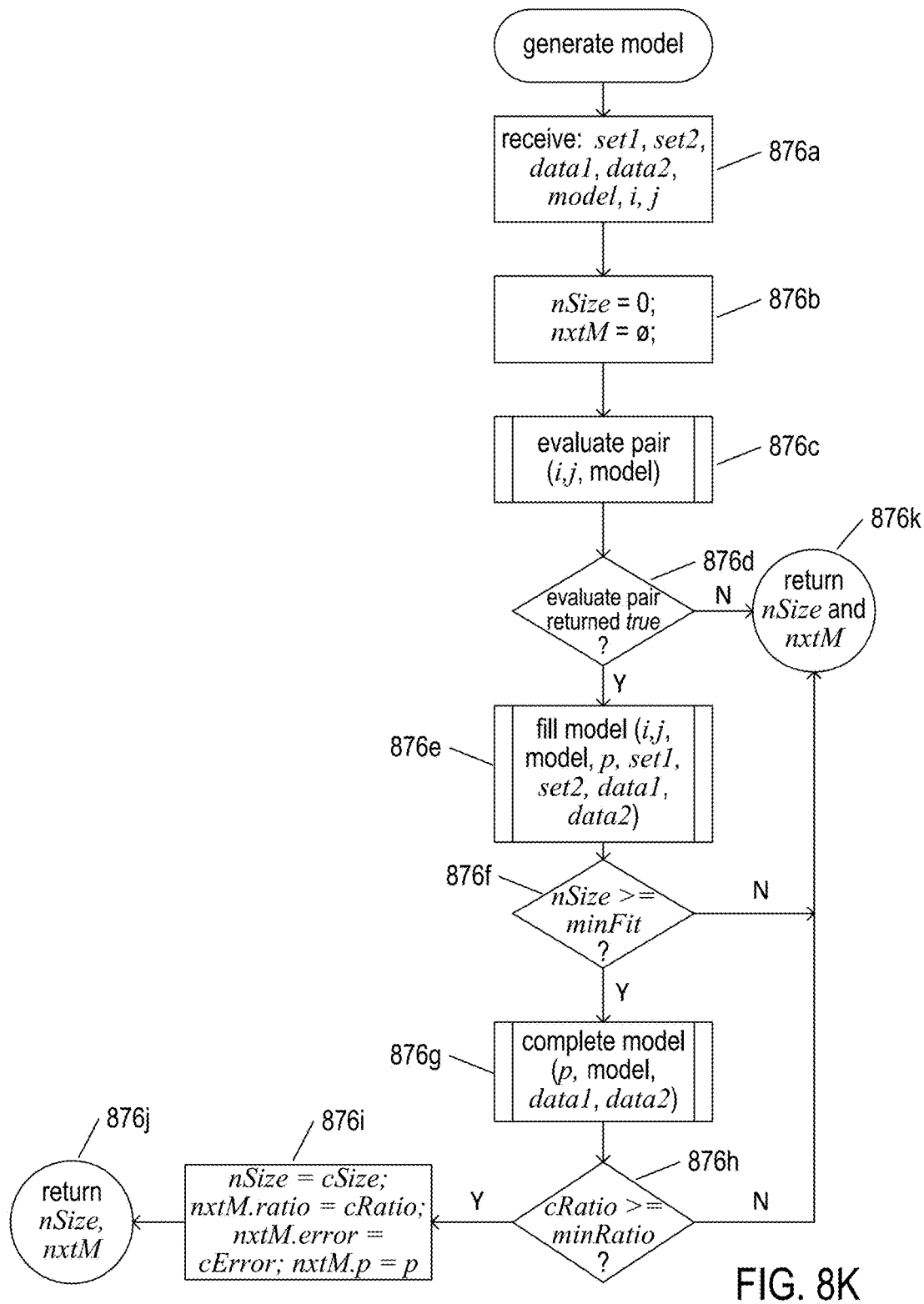
FIG. 8K illustrates models that express transformations of a first document image to a second document image and a method for selecting a particular model from among a set of candidate models to describe a particular transformation for two corresponding document images.
Figure 8L:
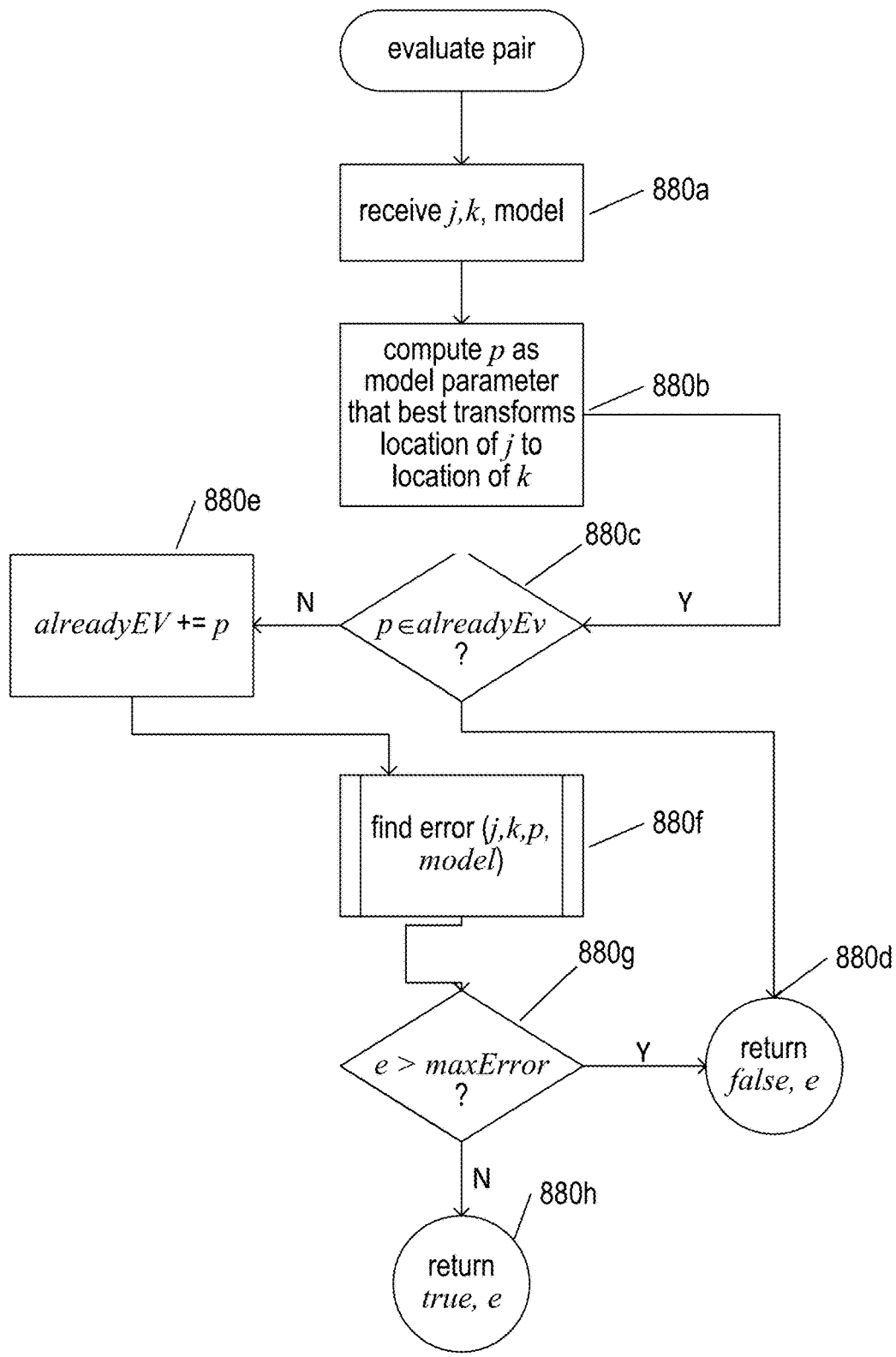
FIG. 8L illustrates models that express transformations of a first document image to a second document image and a method for selecting a particular model from among a set of candidate models to describe a particular transformation for two corresponding document images.
Figure 8M:
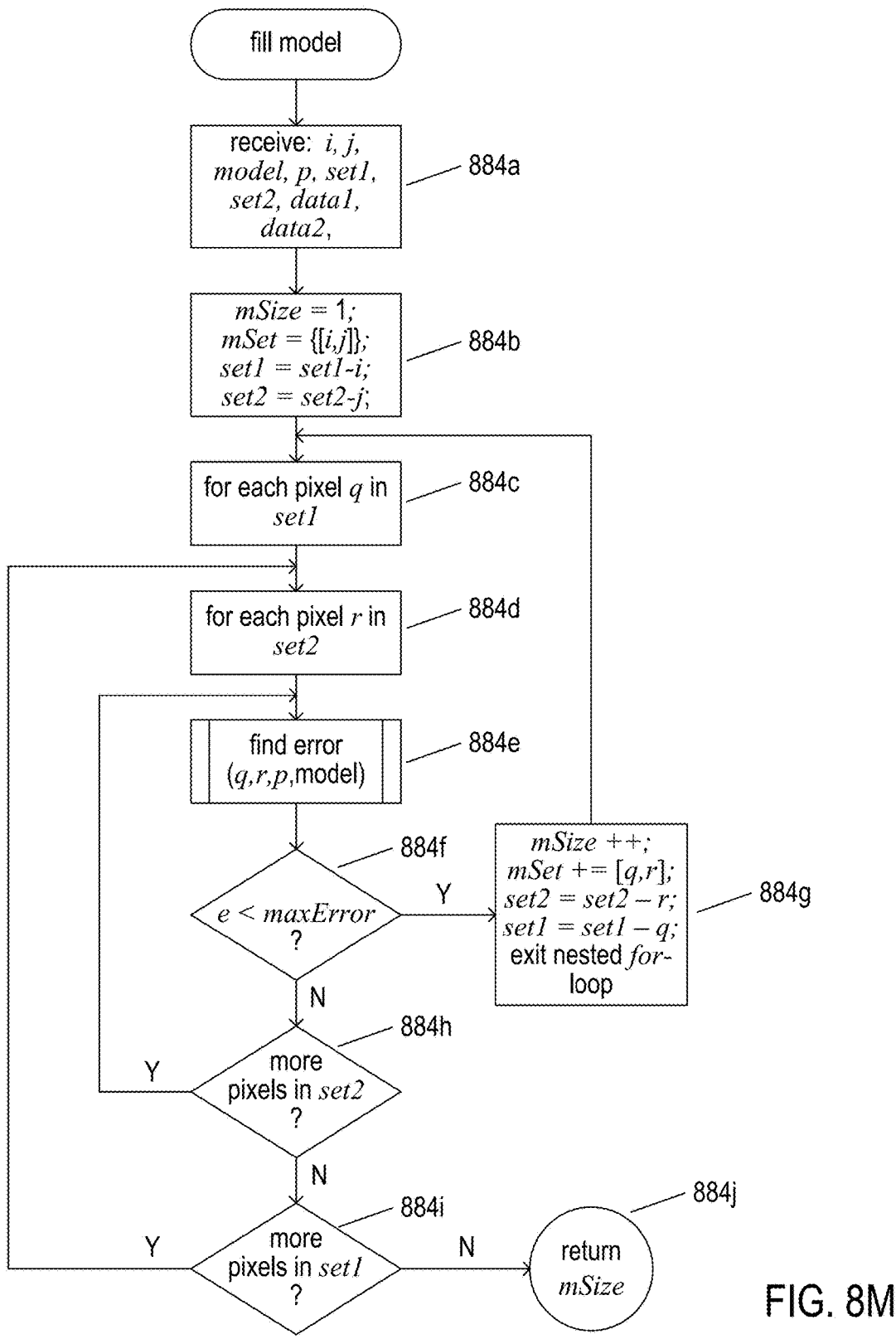
FIG. 8M illustrates models that express transformations of a first document image to a second document image and a method for selecting a particular model from among a set of candidate models to describe a particular transformation for two corresponding document images.
Figure 8N:
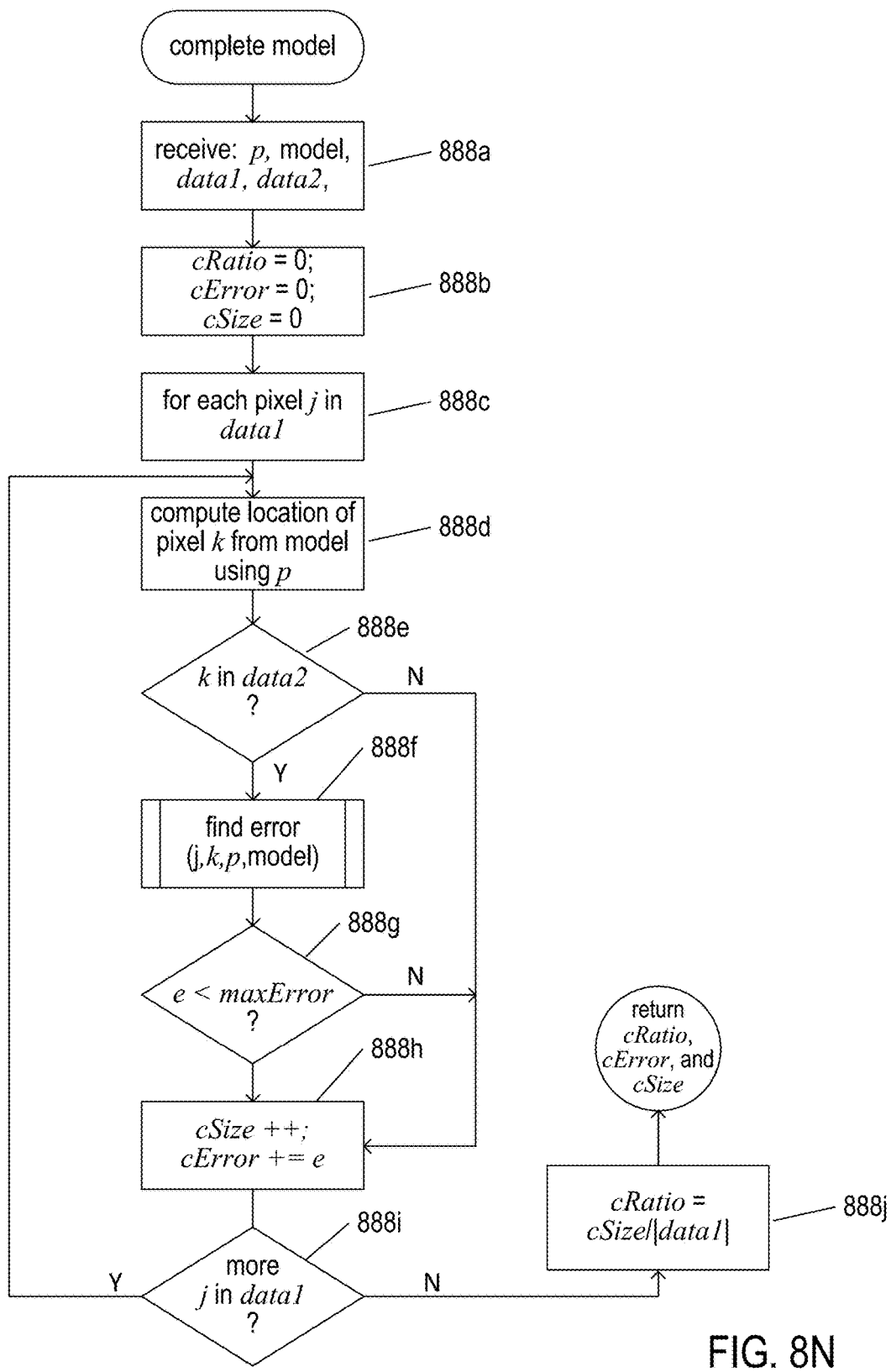
FIG. 8N illustrates models that express transformations of a first document image to a second document image and a method for selecting a particular model from among a set of candidate models to describe a particular transformation for two corresponding document images.

FIGS. 8A-N illustrate models that express transformations of a first document image to a second document image and a method for selecting a particular model from among a set of candidate models to describe a particular transformation for two corresponding document images. The transformations may reflect various types of physical or imaging-related distortion or alteration of a document with respect to a normalized document of the same type. For example, the normalized document may be an accurate image of a particular type of certificate or license. When such certificates or licenses are imaged in less-than-ideal conditions, various types of imaging distortions may arise, due to non-standard locations and orientations of the imaging device relative to the document, lack of focus, and other such distortion-inducing conditions. As another example, the certificate or license that is being imaged may be physically distorted as a result of crumpling, folding, staining, or other such physical-distortion-producing events. In the methods and systems for identifying particular types of document subimages within images, discussed below, a transformation is selected to describe any distortions or other differences between the normalized document, or document template, and a corresponding document subimage within an image. In many cases, identifying the transformation involves identifying both a model as well as one or more model parameters that best fit the observed distortions and differences between a normalized image and a corresponding subimage. One method for determining the parameters for a mathematical model from a set of observed data is referred to as the random sample consensus ("RANSAC") method. The example discussed below with reference to FIGS. 8A-N uses a RANSAC-like parameter-estimation method in order to determine a model parameter to best fit a model to the observed data. This example is intended to simply and generally illustrate RANSAC-like model-parameter selection. The currently disclosed methods and subsystems use different RANSAC-like methods for several more complex types of parameter fitting and model generation.

FIG. 8A illustrates the example problem domain for which the RANSAC-like parameter-fitting method is used, along with model selection, to determine a transformation that relates a first image, image1, to a second image, image2. In FIG. 8A, the first image 802 and second image 804 are shown at the top of the figure. The first image 802 includes five darker objects on a light background, including three dark square-shaped objects 806-808 and two irregularly shaped objects 809 and 810. The second image 804 also includes five objects, including three square-shaped objects 811-813 and two irregularly shaped objects 814 and 815. The first image is a two-dimensional matrix of pixels indexed by coordinates (x,y) 818 and the second image 804 is a two-dimensional matrix of pixels indexed by coordinates (x',y) 819. An assumption is that some or all of the objects in the second image 804 are related to the objects in the first image by a mathematically expressed transformation. The forward transformation 820 comprises a function $f(x,y)$ that returns corresponding coordinates (x',y') for a point with coordinates (x,y) in the first image. The reverse transform 821 transforms second-image pixel coordinates to first-image pixel coordinates. A third assumption, for the particular example problem, is that the color and/or intensity of the pixel (x,y) in the first image is equal to, or close to, the color and/or intensity of the corresponding pixel (x',y') in the second image 822.

FIGS. 8B-D illustrate three different possible models, represented by mathematical expressions, for the transformation of the objects in the first image 802 shown in FIG. 8A to corresponding objects in the second image 804 in FIG. 8A. A first possibility, shown in FIG. 8B, is a vertical translation of the positions of the objects in the first image to corresponding positions that, were the model correct, would coincide with the positions of corresponding objects in the second image. In FIG. 8B, the objects of the first image are shown as unshaded objects, such as square-shaped object 806, while the objects of the second image are shown as shaded objects with dashed-line boundaries, such as object 811. A reasonable transformation maps pixels in the first-image objects to corresponding pixels in the second-image objects. In the vertical-translation-model case, shown in FIG. 8B, certain pixels within first-image objects, such as pixels 823 and 824, map under the illustrated transformation to corresponding pixels 825 and 826 within second-image objects. However, in other cases, such as for pixels 827 and 828 within first-image objects 807 and 809, the illustrated translation maps pixels to non-object locations 829 and 830. Thus, the vertical-translation model does not appear to be a particularly robust and accurate model for the transformation of first-image objects to second-image objects. The downward, vertical-translation model is illustrated 831 to the side of the composite figure shown in FIG. 8B 832.

FIG. 8C shows a horizontal-translation model, using the same illustration conventions as used in FIG. 8B. Here again, some pixels, such as pixel 833, map from first-image objects to second-image objects while other pixels, such as pixel 834, map from first-image objects to non-object locations. As with FIG. 8B, the leftward, vertical translation model is diagrammatically represented 835 to the right of the composite image 836 shown in FIG. 8C.

Finally, FIG. 8D illustrates a third model for the transformation of the objects of image1 to image2, using the same illustration conventions as used in FIGS. 8B and 8C. This model is a rotation of 45 degrees of image1 about a central point of image1 in the counter-clockwise direction, as indicated by the representation of the model 837 to the right of the composite image 838 shown in FIG. 8D. In general, each point in each of the square-shaped first-image objects, such as points 839-841, mapped to corresponding second-image square-shaped objects. However, the irregularly shaped first-image objects 809 and 810 do not map to the irregularly shaped second-image objects 814 and 815. However, it is this model that would be deemed to be most correct of the three described models, since, in fact, the second image 804 in FIG. 8A was produced from the first image 802 by a 45-degree counter-clockwise rotation of the square-shaped objects about a central image point. Irregularly shaped objects were intentionally chosen not to be mapped by a 45-degree rotation. The example demonstrates that there may be an underlying model that represents the transformation between the positions of certain objects of interest in a first image to the positions to those objects in a second image, that there may be other image features, including noise, optical distortions, and other features that are not easily mappable. Therefore, the process of evaluating different possible models as well as choosing a best parameter value for the model may involve comparing results in order to select a best, although not fully explanatory, model. Note that, for each of the models illustrated in FIGS. 8B-D, there is a single parameter, the value of which needs to be determined. The two translation models have a translation-distance parameter while the rotation model has a rotation-angle parameter. In the general case, models may require two or more parameter values to be determined. RANSAC-like methods have been developed to address the general model-parameter-determination problem.

FIGS. 8E-N illustrate, using a table, input and output specifications, and a series of control-flow diagrams, a RANSAC-based approach to determining which of the models, illustrated in FIGS. 8B-D, best explain the transformation of the objects in the first image 802 of FIG. 8A to different locations in the second image 804 shown in FIG. 8A and to determine the best parameter value for the models with respect to the input data.

FIG. 8E shows a table that includes the specification of three models. The three rows 842-844 represent the downward-vertical-translation transformation illustrated in FIG. 8B, the leftward-horizontal-translation transformation illustrated in FIG. 8C, and the counter-clockwise-rotation transformation illustrated in FIG. 8D. The columns of the table correspond to fields in records represented by rows. Thus, each model includes a textural description, corresponding to column 845, a mathematical expression for the forward transformation, corresponding to column 846, one or more mathematical expressions for the reverse transformation, corresponding to column 847, and various non-variable parameters used in the RANSAC-like parameter-fitting method, discussed below, corresponding to columns 848-849. Each of the models is mathematically described with a single variable parameter, the parameter p for the first two models and the parameter θ for the third model.

FIG. 8F shows the input and output arguments for the program "find model" and the routine "find parameter." The program "find model" receives, as input, two images 850 and 851, an array of models 852, and an indication of the number of models in the array of models 853. The program evaluates each model with respect to the input images. If an acceptably accurate model is identified to explain systematic differences between the locations and colors of the objects in the two images, the program "find model" returns the index for the best model identified within the array Models as well as the value for a parameter p or θ used in the mathematical expressions for the transformation represented by the model 853. Otherwise, the program "find model" returns a failure indication 854. The routine "find parameter" is a RANSAC-like method that determines the parameter value for the model parameter p that best fits the input data. The routine "find parameter" receives the two images and the array models as inputs 855 and outputs the ratio of pixels in a first image that are correctly transformed by the model to transformed locations within the second image 856, the best value for the model parameter p 857, and a cumulative error characterizing application of the transformation to the first image 858.

FIG. 8G provides a control-flow diagram for the program "find model." In step 860*a*, the program "find model" receives a first and second image, the array Models, and an indication of the number of models, or entries, in the array Models. The images may be received as references to image files, as references to pixel arrays, or by other standard computational input methodologies. In step 860*b*, the program "find model" initializes a number of local variables, including: (1) bestP, the best parameter value; (2) bestRatio, the best ratio of correctly transformed pixels to total pixels in the first image; (3) bestError, the cumulative error for the best model; and (4) bestModel, an index into the array Models corresponding to the best model found to explain the differences between image1 and image2. In the for-loop of steps 860*c*-860*i*, each model in the array Models is considered. In step 860*d*, the routine "find parameter" is called to find the best value for the model parameter. When the ratio returned by the routine "find parameter" is greater than the value stored in the local variable bestRatio, as determined in step 860*e*, the local variables are updated to the values returned by the routine "findParameter" for the currently considered model, in step 860*f*. Otherwise, when the ratio returned by the routine "find parameter" is equal to the value stored in the local variable bestRatio and the cumulative error returned by the routine "find parameter" is lower than the value stored in the local variable bestError, then the local parameters are updated, in step 860*f*. Otherwise, when the loop variable i is less than the value numModels−1, as determined in step 860*h*, the loop variable is incremented, in step 860*i*, and control returns to step 860*d* for another iteration of the for-loop. Following completion of the for-loop, when the index stored in local variable bestModel is greater than the value −1, as determined in step 860*j*, then, in step 860*k*, the values stored in local variables bestP and bestModel are returned. Otherwise, a failure indication is returned in step 860*l*. Thus, the program "find model" evaluates all models in the array Models and returns an indication of the model that best describes the transformation of features between the first and second input images as well as the best parameter value for the model. However, when no acceptable model is found, as discussed further below, a failure indication is returned by the program "find model."

FIGS. 8H-N illustrate the routine "find parameter," called in step 860*d* of FIG. 8G. This is a RANSAC-like method for determining the best parameter value for a single-parameter model. The routine is straightforwardly extended for determining multiple parameter values for models that include two or more variable parameters, although the computational overhead increases geometrically for simplistic approaches.

FIG. 8H shows the highest-level control-flow diagram for the routine "find parameter." In step 864*a*, the routine "find parameter" receives two images and a particular model to evaluate for expressing the transformation between the two images. In step 864*b*, the routine "find parameter" prepares the two images for analysis, with the prepared images referenced by the variables data1 and data2. Preparation of the image may involve altering the color model, transforming the images to grayscale, transforming the images to a binary scheme, and other such preparations. In step 864*c*, a number of local variables are initialized, including: (1) p, the current best parameter value; (2) error, the current cumulative error for the best so-far-observed parameter value; (3) i, a loop variable; (4) alreadyEv, a set of parameters that have been previously evaluated during the current execution of the routine "find parameter;" and (5) ratio, the best ratio so far observed for the current best parameter value. In the while-loop of steps 864*d*-864*j*, various different values for the model parameter are tried, with the best parameter tried during the while-loop selected as the parameter value that most closely fits the model to the input-image data. The model parameter maxItr controls the number of different parameter values that are tried. In alternative implementations, the while-loop may be short-circuited when a parameter value is found that produces better than a threshold desirable result. In step 864*e*, the routine "next model" is called to determine and evaluate a next parameter value. When the ratio of properly transformed pixels to total pixels obtained when the model is applied to the input data with the parameter value is greater than the valued stored in the local variable ratio, as determined in step 864*f*, the local variables ratio, p, and error are updated to the corresponding values returned by the routine "next model." When the ratio returned by the routine "next model" is the same as the value stored in the local variable ratio but the cumulative error obtained by applying the model with the currently considered parameter to the input data is less than the value stored in the local variable error, as determined in step 864*h*, then the local variables ratio, p, and error are updated in step 864*g*. In either case, for which conditional steps 864*f* and 864*h* return true values, the currently considered parameter is the best observed parameter so far. Then, when the loop variable i is less than the value maxItr−1, as determined in step 864*i*, the loop variable is updated in step 864*j* and control returns to step 864*e* for another iteration of the while-loop. When the while-loop finishes, the routine "find parameter" returns the values of the local variables ratio, p, and error, in step 864*k*. Note that it is possible that no acceptable parameter value can be found, in which case the value of the local variables ratio, p, and error have the values with which they were initialized in step 864*c*. These initial values essentially constitute indication of an error condition.

FIG. 8I provides a control-flow diagram for the routine "find error." This routine determines an error value for two pixels transformed by a current model with a current parameter value. In step 868*a*, the routine "find error" receives two pixels u and v from the data sets data1 and data2, respectively, the current model-parameter value p, and the current model. In step 868*b*, the routine "find error" assigns, to the local variable a, the square of a difference between the values of pixels u and v. The difference may be a ratio of the distance between the pixel values to a maximum possible pixel-value difference or some other difference measure. In step 868*c*, the routine "find error" transforms pixel u to pixel l according to the model and current parameter value. In other words, using the forward transform for the model, the routine "find error" computes a transformed location for pixel u. Next, in step 868*d*, the routine "find error" computes the square of the distance between the locations of pixels v and l and places the value in local variable b. Various different distance metrics can be used, including the city block metric or the Euclidian distance, as examples. Finally, in step 868*e*, the routine "find error" computes a cumulative error as the square root of the sum of local variables a and b and returns the computed error in step 868*f*.

FIG. 8J provides a high-level control-flow diagram for the routine "next model," called in step 864*e* of FIG. 8H. In step 872*a*, the routine "next model" receives the data sets data1 and data2 as well as the currently considered model, an entry in the array Models. In step 872*b*, the routine "next model" randomly selects n pixels from the data set data1 and places them in the local set variable set1. The value n is one of the non-variable parameters associated with the model, discussed above with reference to FIG. 8E (848-849). In step 872*c*, the routine "next model" randomly selects n pixels from the second data set and places them into the local set variable set2. In step 872*d*, the local variables num and nModel are set to 0 and the null set, respectively. In the for-loop of steps 872*e*-872*i*, the routine "next model" considers each possible pair of pixels (j,k) from the local set variables set1 and set2, with the first pixel of the pair selected from set1 and the second pixel of the pair selected from set2. In step 872*f*, the routine "next model" calls the routine "generate model" to generate and evaluate a new parameter value for the input model, as discussed below. When the value nSize returned by the routine "generate model" is greater than the value currently stored in local variable num, as determined in step 872*g*, the local variables num and nModel are updated to corresponding values by the routine "generate model" in step 872*h*. When there are more pixel pairs to consider, as determined in step 872*i*, control returns to step 872*f* for another iteration of the for-loop of steps 872*e*-872*i*. Finally, in step 872*j*, the values contained within the current value of the set or record variable nModel are returned.

FIG. 8K provides a control-flow diagram for the routine "generate model" called in step 872*f* in FIG. 8J. In step 876*a*, the routine "generate model" receives the sets set1 and set2, the originally prepared input data data1 and data2, the currently considered model, and a pair of pixels (i,j). The routine "generate model" attempts to generate a parameter value for the currently considered model based on the pixel pair (i,j). In step 876*b*, the local variables nSize and nxtM are set to 0 and the null set, respectively. In step 876*c*, the routine "generate model" calls the routine "evaluate pair" to determine whether the pixel pair (i,j) can be explained as a transformation according to the model with a selected parameter value. When the routine "evaluate pair" returns true, as determined in step 876*d*, then, in step 876*e*, the routine "generate model" calls the routine "fill model" to generate characteristics from set1 and set2 for the transform represented by the model in the current parameter value. When the number of pixel pairs within the randomly selected sets of pixels set1 and set2 that are explained by the model and current parameter value is greater than the value minFit, as determined in step 876*f*, then, in step 876*g*, the routine "generate model" calls the routine "complete model" to generate characteristics for the transform comprising the current model and currently selected model parameter. When the ratio cRatio for correctly transformed pixels returned by the routine "complete model" is greater than or equal to the value minRatio, as determined in step 876*h*, the return values nSize and nextM are set to the characteristics returned by the routine "complete model," in step 876*i*, and returned in step 876*j*. Note that the values minFit and minRatio are both non-variable parameter values discussed above with reference to FIG. 8E. When the routine "evaluate pair" returns false, then the initial values of the local variables nSize and nxtM are returned in step 876*k* as a failure indication.

FIG. 8L provides a control-flow diagram for the routine "evaluate pair" called in step 876*d* of FIG. 8K. In step 880*a*, the routine "evaluate pair" receives two pixels (j,k) in the currently considered model. In step 880*b*, the routine "evaluate pair" computes a value for the model parameter p as the model parameter that best transforms the location of j to the location of k. When the parameter value p has already been evaluated, as determined in step 880*c*, then the routine "evaluate pair" returns a false value in step 880*d*. Otherwise, the value p is added to the set alreadyEv in step 880*e*. In step 880*f*, the routine "evaluate pair" calls the routine "find error" to determine the error associated with the two pixels j and k. When the error returned by the routine "find error" is greater than the value maxError, as determined in step 880*g*, the routine "evaluate pair" returns a false value in step 880*d*. Otherwise, in step 880*h*, a true value and the computed error are returned. Note that the value maxError is another of the parameter-fitting parameters discussed above with reference to FIG. 8E.

FIG. 8M illustrates a flow-control diagram for the routine "fill model" that is called in step 876*e* in FIG. 8K. In step 884*a*, the routine "fill model" receives a pair of pixels, a current model parameter and model, the randomly selected pixel sets set1 and set2, and the prepared input data data1 and data2. In step 884*b*, the routine "fill model" sets the local variable mSize to 1, the local set variable mSet to include the received pixel pair (i,j), and removes pixels i and j from the set variables set1 and set2. Then, in the nested for-loop of steps 884*c*-884*i*, each pixel in set1 is attempted to be matched to a pixel in set2 via the currently considered model and current parameter value for that model. When two pixels represent a transformed pair within an error less than maxError, as determined in step 884*f*, the value of the local variable mSize is incremented, the currently considered pixel pair q and r are added to the local set variable mSet, the pixels q and r are removed from the set variables set1 and set2 and control breaks from the nested for-loop, in step 884*g*. In step 884*j*, following completion of the nested for-loops, the value in the local variable mSize is returned, which reflects the number of pixels in the randomly selected set set1 that are correctly transformed by the currently considered model and parameter value. It is this value that is compared to the parameter-fitting parameter minFit, in step 876*f* of FIG. 8K, to determine whether the currently considered model and parameter value represent an acceptable model for transformation of input image1 to image2.

FIG. 8N provides a control-flow diagram for the routine "complete model" called in step 876*g* in FIG. 8K. In step 888*a*, the routine "complete model" receives the currently considered model and parameter value model and p and the input data sets data1 and data2. In step 888*b*, local variables are initialized to 0, including: (1) cRatio, the ratio of correctly transformed pixels to total pixels, cError, the cumulative error for transformation of the first data set to the second data set via the model and model parameter; and (3) cSize, the number of pixels that are transformed. Then, in the for-loop of steps 888*c*-888*i*, each pixel in the initial data set is transformed by the current model and model parameter value, in step 888*d*, and when the computed location for the pixel is found in the data set data2 and the error associated with the currently considered pixel and relocated pixel is less than maxError, as determined in step 888*g*, the value of local variable cSize is incremented and the error for the two pixels is added to the cumulative error cError in step 888*h*. In step 888*j*, following completion of the for-loop, the ratio of correctly transformed pixels to total pixels, cRatio, is computed by dividing the value of the local variable cSize by the cardinality of input data set data1.

The routine "find parameter" is not guaranteed to return a reasonable parameter value for the model. However, by choosing reasonable values for the parameter-fitting parameters, it is likely that if a model reasonably accurately expresses the transformation between two input images, a reasonable parameter value will be found. The RANSAC-like methodology can be employed for fitting parameters to a variety of different types of models to explain various different data sets. For example, one input image may be a canonical or normalized image of a particular type of document and additional input images are various images of real documents of the document type of the input canonical or template document. In this case, the procedure would need to be enhanced to compare the template or canonical document to multiple images for each set of one or more parameter values that are evaluated for fitting the model to the input data. As discussed above, the RANSAC-like methodology can fit multiple parameters to multiple-parameter models. The types of input data may also vary. The only actual constraint is that whatever the data, there must be a norm or evaluation criteria for determining how well transformed data correspond to the non-template or non-canonical input data.

The Current Problem Domain and Several Document-Type Examples

The current document is directed to methods, systems, and subsystems that identify the borders or outlines of document subimages within digital images. Because of the ubiquitous use of smart phones to capture images, many document-processing methods and applications are applied to digital images of documents acquired by smart phones and other digital-camera-containing mobile devices. In general, as an initial step or subprocess in interpreting digital images of documents, a digital image is processed to identify subimages within the digital image corresponding to various types of text-containing documents, with the subimages defined by borders, boundaries, or edges of the physical documents imaged by a digital camera to produce the document-subimages-containing digital image. Once the subimages within a digital image corresponding to documents have been identified, a variety of different types of methodologies and subsystems may be applied to extract information from the document subimages, including optical character recognition ("OCR") methods and subsystems that transform document images or subimages into corresponding electronic documents that contain digital encodings of text rather than images of text. In general, an electronic document contains digital values corresponding to text characters and text symbols as well as additional digitally encoded information that control and specify document formatting, character fonts, and other such information. The methods and subsystems to which the current document are directed identify subimages corresponding to particular types of documents and digital images so that OCR methods and/or other processing methods can then be applied to extract information from the document subimages.

Figure 9A:
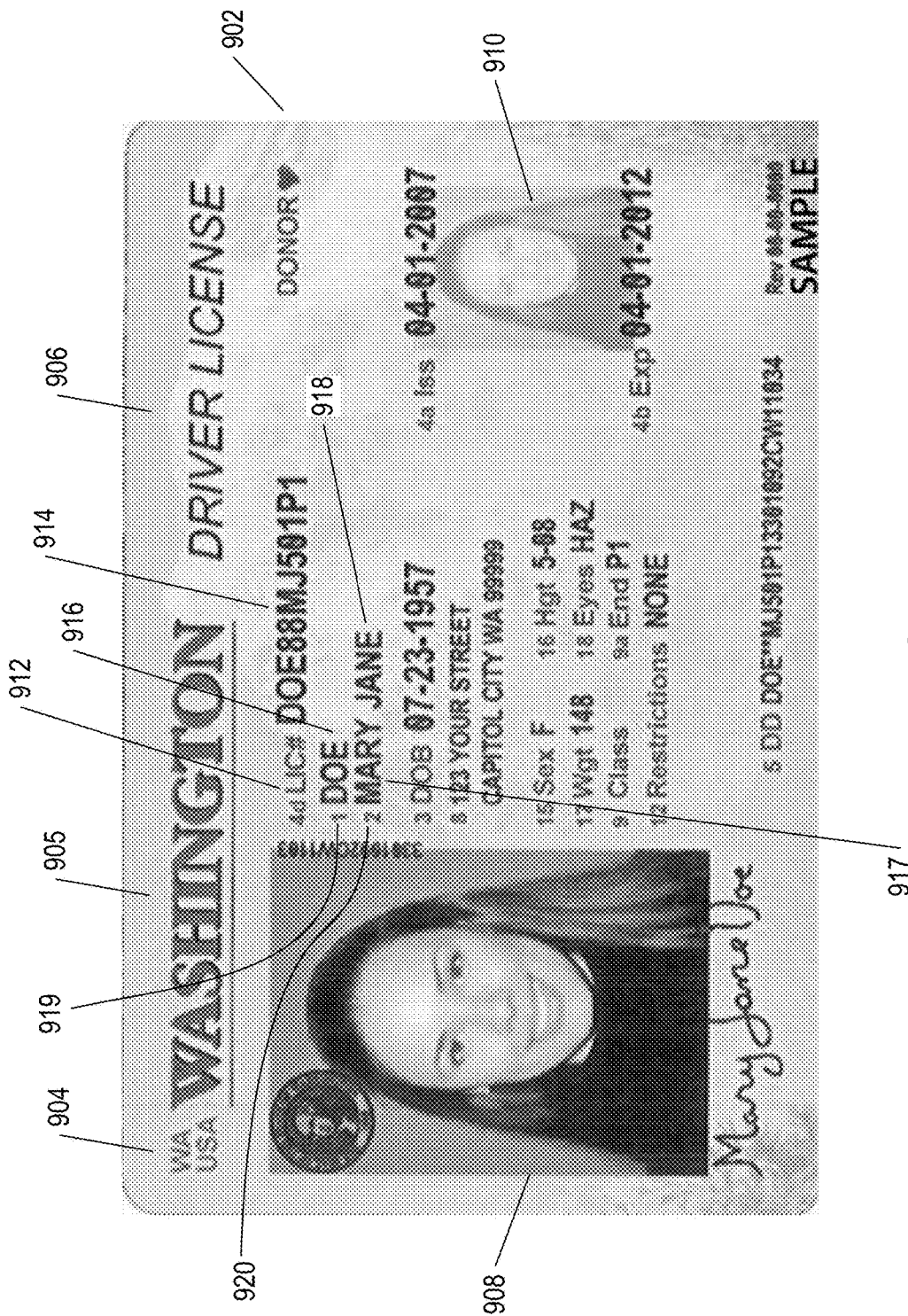
FIG. 9A illustrates two exemplary documents used as examples in the discussion of the currently disclosed methods and subsystems.
Figure 9B:
FIG. 9B illustrates two exemplary documents used as examples in the discussion of the currently disclosed methods and subsystems.

In many cases, digital-image-processing subsystems and methodologies are directed to extracting information from subimages corresponding to particular types of documents, such as driver's licenses, passports, insurance cards, military-identification certificates, and other such documents that have relatively tightly specified formats, layouts, and organizations. FIGS. 9A-B illustrate two exemplary documents used as examples in the discussion of the currently disclosed methods and subsystems. FIG. 9A shows a driver's license and FIG. 9B shows the first two pages of a passport. As discussed further below, these types of documents can be characterized by corresponding templates. In essence, the documents are physical records or data structures analogous to records and data structures used in computer programming. For example, the driver's license 902 in FIG. 9A includes a top banner comprising a state abbreviation and country abbreviation 904, the name of the state issuing the driver's license 905, and the phrase "Driver License" 906. All driver's licenses issued by this particular state, at least within some most recent time period, include the same, identical banner. The driver's license includes two photos 908 and 910, with the photo sizes and locations common to all driver's licenses issued by the state. In addition, there are numerous information fields. As one example, a common or generic label "4d LIC#" 912 is followed by a driver's-license number 914 unique to each individual to which a driver's license is issued. That individual's last name 916 and first and middle names 917-918 are provided in two additional information fields preceded by the numeric labels "1" and "2" 919 and 920.

The two pages from a passport, shown in FIG. 9B, are similarly analogous to records or data structures, including common graphics, text, a photograph in a standard location and of a standard size, and multiple information fields containing information unique or particular to the individual to which the passport was issued.

Figure 10A:
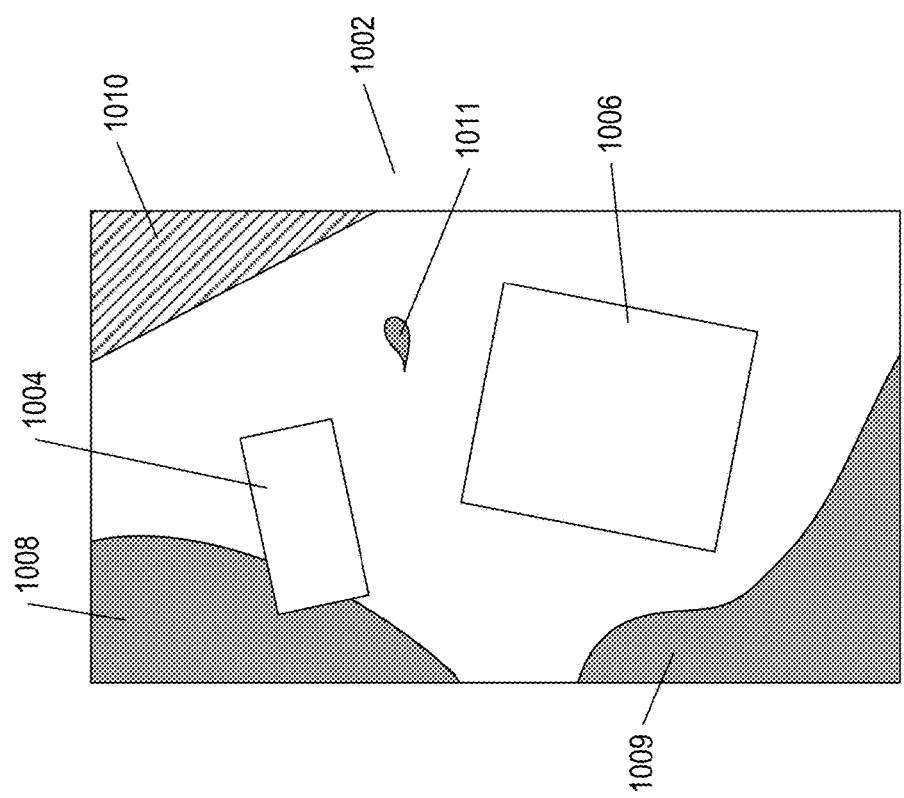
FIG. 10A illustrates certain of the many problems and challenges associated with identifying document subimages within a digital image, particularly a digital image captured by a hand-held smart phone or other mobile processor-controlled device.

FIGS. 10A-10J illustrate certain of the many problems and challenges associated with identifying document subimages within a digital image, particularly a digital image captured by a hand-held smart phone or other mobile processor-controlled device. FIG. 10A illustrates an example digital image that contains two document subimages. The digital image 1002 includes a first subimage 1004 corresponding to a driver's license and a second subimage 1006 corresponding to the first two pages of a passport. However, in addition, the digital image includes various background patterns and objects 1008-1011. A first challenge to identifying the subimages corresponding to images of documents is the need to distinguish those subimages from the various types of additional features, patterns, and objects contained within the digital image.

Figure 10C:
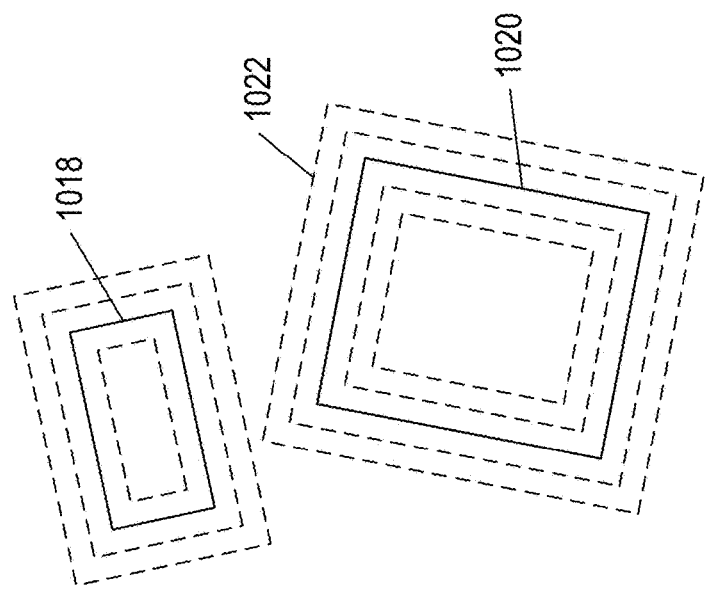
FIG. 10C illustrates certain of the many problems and challenges associated with identifying document subimages within a digital image, particularly a digital image captured by a hand-held smart phone or other mobile processor-controlled device.
Figure 10B:
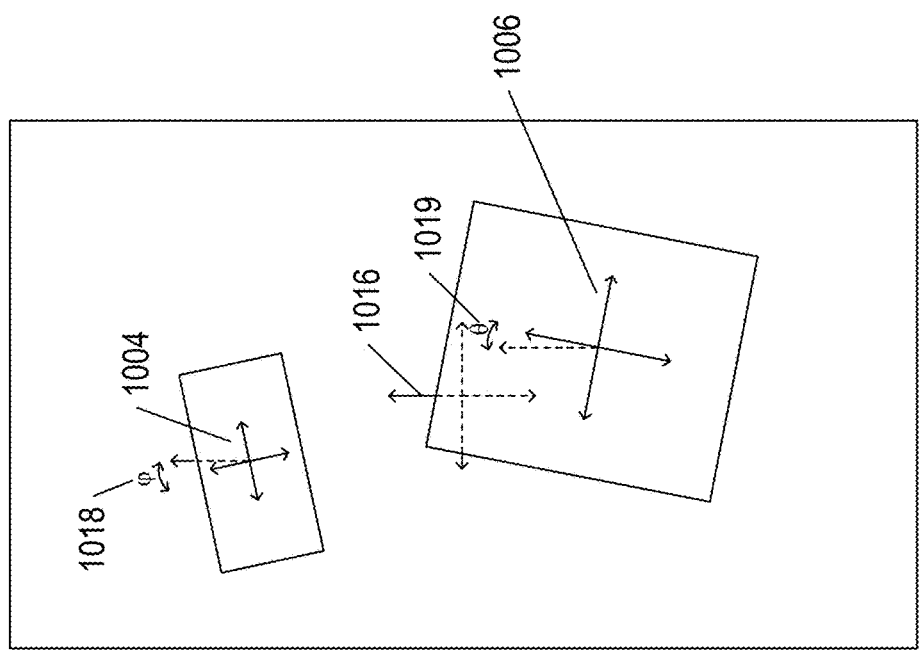
FIG. 10B illustrates certain of the many problems and challenges associated with identifying document subimages within a digital image, particularly a digital image captured by a hand-held smart phone or other mobile processor-controlled device.

FIGS. 10B-C illustrate two additional challenges. As shown in FIG. 10B, the rotational orientation of the driver's license 1004 and the passport 1006 differ from that of the digital image 1016. Thus, the angular orientation of digital subimages corresponding to imaged documents, such as the angles $\varphi$ 1018 and $\theta$ 1019 in FIG. 10B, are examples of parameters that may have different values depending on how the digital image was captured and how the documents were physically arranged prior to image acquisition. As shown in FIG. 10C, another parameter is the scale of the document images. In the example document-subimage-containing image 1002 shown in FIG. 10A, the driver's license has a border or boundary 1018 and the passport subimage has a border or boundary 1020 of a particular size. However, depending on the distance of the digital camera from these documents, the size of the subimages may vary continuously over a range of different sizes, as indicated in FIG. 10C by the dashed boundaries of different scales, such as dashed boundary 1022.

Figures 10D, 10E, 10F:
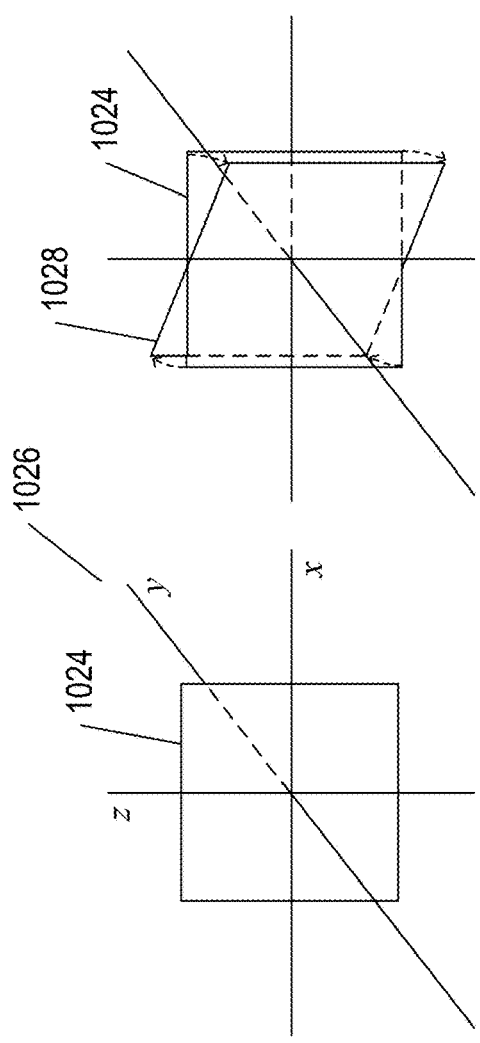
FIG. 10D illustrates certain of the many problems and challenges associated with identifying document subimages within a digital image, particularly a digital image captured by a hand-held smart phone or other mobile processor-controlled device.
FIG. 10E illustrates certain of the many problems and challenges associated with identifying document subimages within a digital image, particularly a digital image captured by a hand-held smart phone or other mobile processor-controlled device.
FIG. 10F illustrates certain of the many problems and challenges associated with identifying document subimages within a digital image, particularly a digital image captured by a hand-held smart phone or other mobile processor-controlled device.

FIGS. 10D-I illustrate additional problems associated with identifying document-containing subimages within digital images, particularly those acquired by mobile, processor-controlled devices such as smart phones. FIG. 10D shows a square document 1024 in the x,z plane of a three-dimensional x,y,z Cartesian space 1026. In FIG. 10E, the document in the x,z plane 1024 is rotated about the z axis to produce a rotated version of the document 1028. In FIG. 10F, the rotated version of the document 1028 is rotated about a central horizontal line through the document to produce a doubly rotated document 1030. FIGS. 10G-I illustrate the image captured for the square document in the three different rotational states shown in FIG. 10D-F by a camera with an internal imaging surface normal to the y axis. In FIG. 10G, the image 1032 of the square document 1024 is a faithful reproduction of the document, with a possible difference being the scale, or dimension, ƒ the document subimage depending on the magnification produced by the lens of the camera and by display of the captured image on a display device. By contrast, the image 1034 of the rotated document 1028 in FIG. 10E, as shown in FIG. 10H, is distorted. It appears to be a parallelogram in the two-dimensional captured image 1036 rather than a square. Similarly, the image 1038 shown in FIG. 10I of the doubly rotated document 1030, previously shown in FIG. 10F, is an even more distorted parallelogram in the captured digital image 1040. Thus, the relative orientation of the imaging surface within a digital camera and the documents being imaged may introduce various relative-orientation-induced distortions in the shape of the subimage corresponding to the document.

Figure 10J:
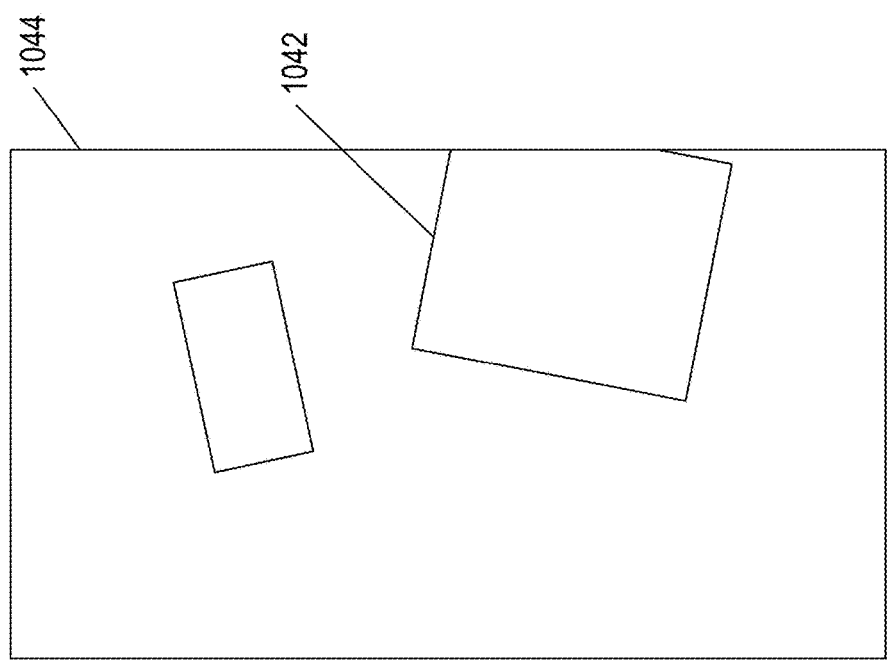
FIG. 10J illustrates certain of the many problems and challenges associated with identifying document subimages within a digital image, particularly a digital image captured by a hand-held smart phone or other mobile processor-controlled device.

FIG. 10J illustrates yet another problem associated with identifying document-containing subimages within a digital image. In FIG. 10J, the position of the camera prior to image acquisition has been shifted to the left, as a result of which the subimage corresponding to the passport 1042 in the acquired image 1044 is now cut off or truncated. Thus, the full border or boundary of the passport-representing subimage is not contained within the image, which may create significant problems in identifying that portion of the boundary or border of the subimage that has been captured in the digital image 1044.

There are, of course, many other types of problems and challenges that may arise, depending on various parameters associated with imaging of documents and with the physical documents and their arrangement and orientation. For example, a particular image may contain only a single document-containing subimage or may contain two or more document-containing subimages. The physical documents may be physically distorted, by crumpling, staining, tearing, or other such physical alternations. A document may be misprinted or blurred, due to defective document preparation. Because of all of these and additional reasons, a naïve approach to identifying document-containing subimages and digital images cannot possibly provide the accuracy and robustness needed in many applications. The current document is directed to robust and accurate methods for identifying document-containing subimages in digital images, despite the various types of variations that may be observed in digital images containing subimages corresponding to a particular type of document.

Perspective Transformations

Figure 11A:
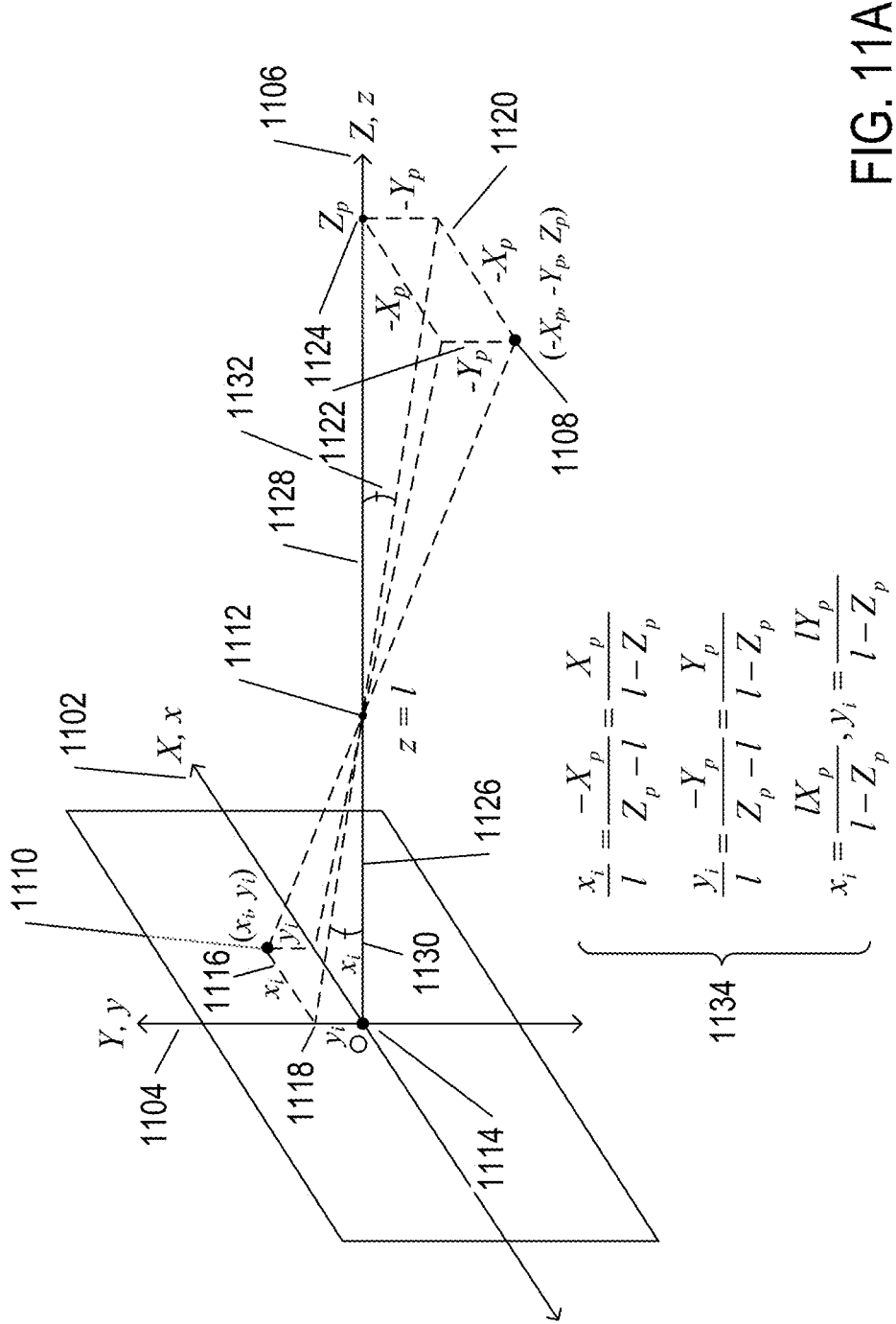
FIG. 11A illustrates one approach to mapping points in a world coordinate system to corresponding points on an image plane of a camera.

FIGS. 11A-F illustrate one approach to mapping points in a world coordinate system to corresponding points on an image plane of a camera. FIG. 11A illustrates the image plane of a camera, an aligned camera coordinate system and world coordinate system, and a point in three-dimensional space that is imaged on the image plane of the camera. In FIG. 11A, the camera coordinate system, comprising the x, y, and z axes, is aligned and coincident with the world-coordinate system X, Y, and Z. This is indicated, in FIG. 11A, by dual labeling of the x and X axis 1102, the y and Y axis 1104, and the z and Z axis 1106. The point that is imaged 1108 is shown to have the coordinates $(X_p, Y_p,$ and $Z_p)$. The image of this point on the camera image plane 1110 has the coordinates $(x_i, y_i)$. The virtual lens of the camera is centered at the point 1112, which has the camera coordinates (0, 0, l) and the world coordinates (0, 0, l). When the point 1108 is in focus, the distance l between the origin 1114 and point 1112 is the focal length of the camera. A small rectangle is shown, on the image plane, with the corners along one diagonal coincident with the origin 1114 and the point 1110 with coordinates $(x_i, y_i)$. The rectangle has horizontal sides, including horizontal side 1116, of length $x_i$, and vertical sides, including vertical side 1118, with lengths $y_i$. A corresponding rectangle with horizontal sides of length $-X_p$, including horizontal side 1120, and vertical sides of length $-Y_p$, including vertical side 1122. The point 1108 with world coordinates $(-X_p, -Y_p,$ and $Z_p)$ and the point 1124 with world coordinates $(0, 0, Z_p)$ are located at the corners of one diagonal of the corresponding rectangle. Note that the positions of the two rectangles are inverted through point 1112. The length of the line segment 1128 between point 1112 and point 1124 is $Z_p-l$. The angles at which each of the lines shown in FIG. 11A passing through point 1112 intersects the z, Z axis are equal on both sides of point 1112. For example, angle 1130 and angle 1132 are identical. As a result, the principal of the correspondence between the lengths of similar sides of similar triangles can be used to derive expressions for the image-plane coordinates $(x_i, y_i)$ for an imaged point in three-dimensional space with world coordinates $(X_p, Y_p,$ and $Z_p)$ 1134:

$$\frac{x_i}{l} = \frac{-X_p}{Z_p-l} = \frac{X_p}{l-Z_p}$$

$$\frac{y_i}{l} = \frac{-Y_p}{Z_p-l} = \frac{Y_p}{l-Z_p}$$

$$x_i = \frac{lX_p}{l-Z_p}, y_i = \frac{lY_p}{l-Z_p}$$

Camera coordinate systems are not, in general, aligned with the world coordinate system. Therefore, a slightly more complex analysis is required to develop the functions, or processes, that map points in three-dimensional space to points on the image plane of a camera.

Figure 11B:
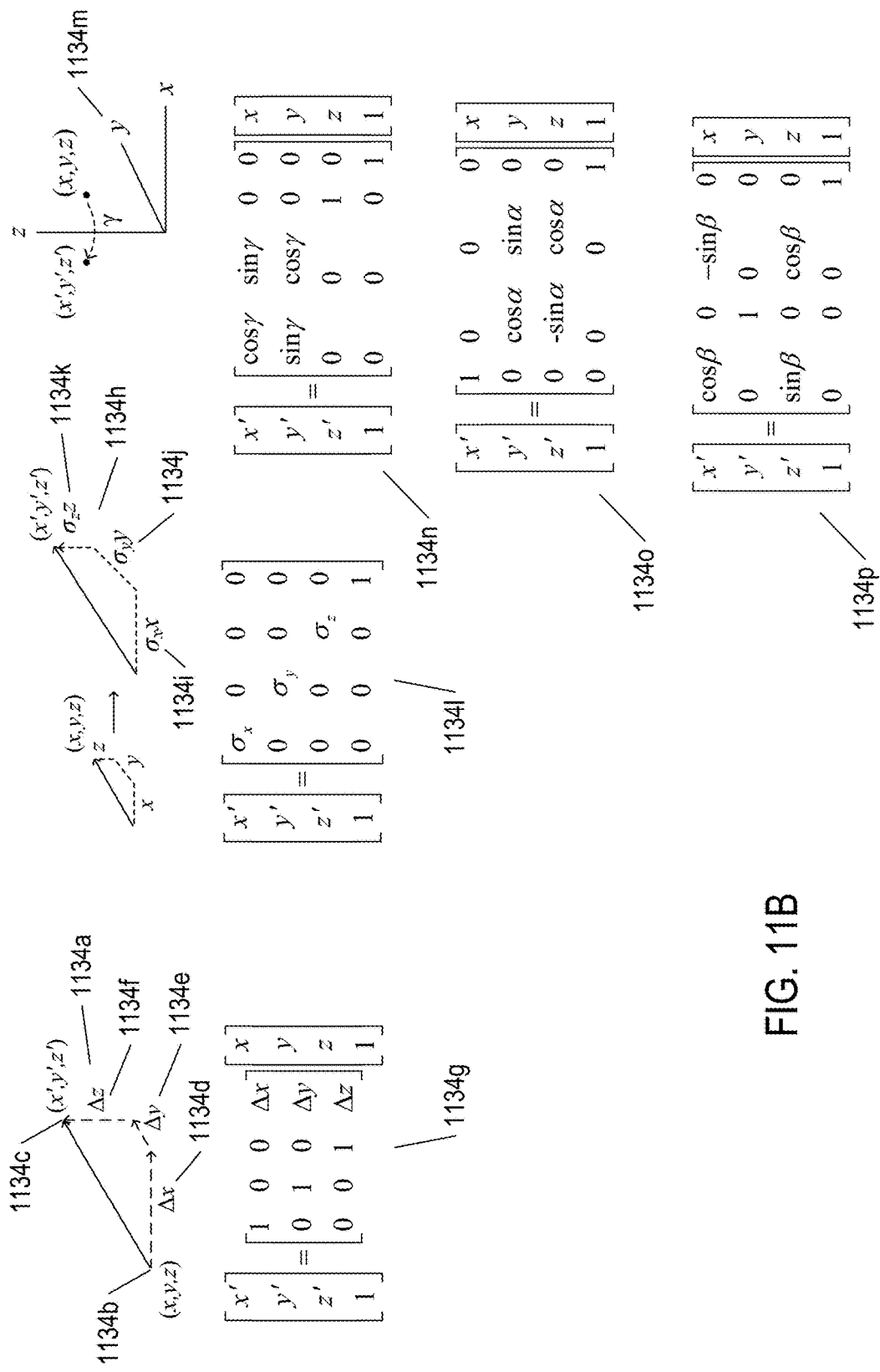
FIG. 11B illustrates one approach to mapping points in a world coordinate system to corresponding points on an image plane of a camera.

FIG. 11B illustrates matrix equations that express various types of operations on points in a three-dimensional space. A translation 1134a moves a first point with coordinates (x,y,z) 1134b to a second point 1134c with coordinates (x',y',z). The translation involves displacements in the x 1134d, y 1134e, and z 1134f directions. The matrix equation for the translation 1134g is provided below the illustration of the translation 1134a. Note that a fourth dimension is added to the vector representations of the points in order to express the translation as a matrix operation. The value "1" is used for the fourth dimension of the vectors and, following computation of the coordinates of the translated point, can be discarded. Similarly, a scaling operation 1134h multiplies each coordinate of a vector by a scaling factor $\sigma_x, \sigma_y,$ and $\sigma_z$, respectively 1134i, 1134j, and 1134k. The matrix equation for a scaling operation is provided by matrix equation 1134l. Finally, a point may be rotated about each of the three coordinate axes. Diagram 1134m shows rotation of a point (x,y,z) to the point (x',y',z') by a rotation of γ radians about the z axis. The matrix equation for this rotation is shown as matrix equation 1134n in FIG. 3B. Matrix equations 1134o and 1134p express rotations about the x and y axis, respectively, by α and β radians, respectively.

Figure 11C:
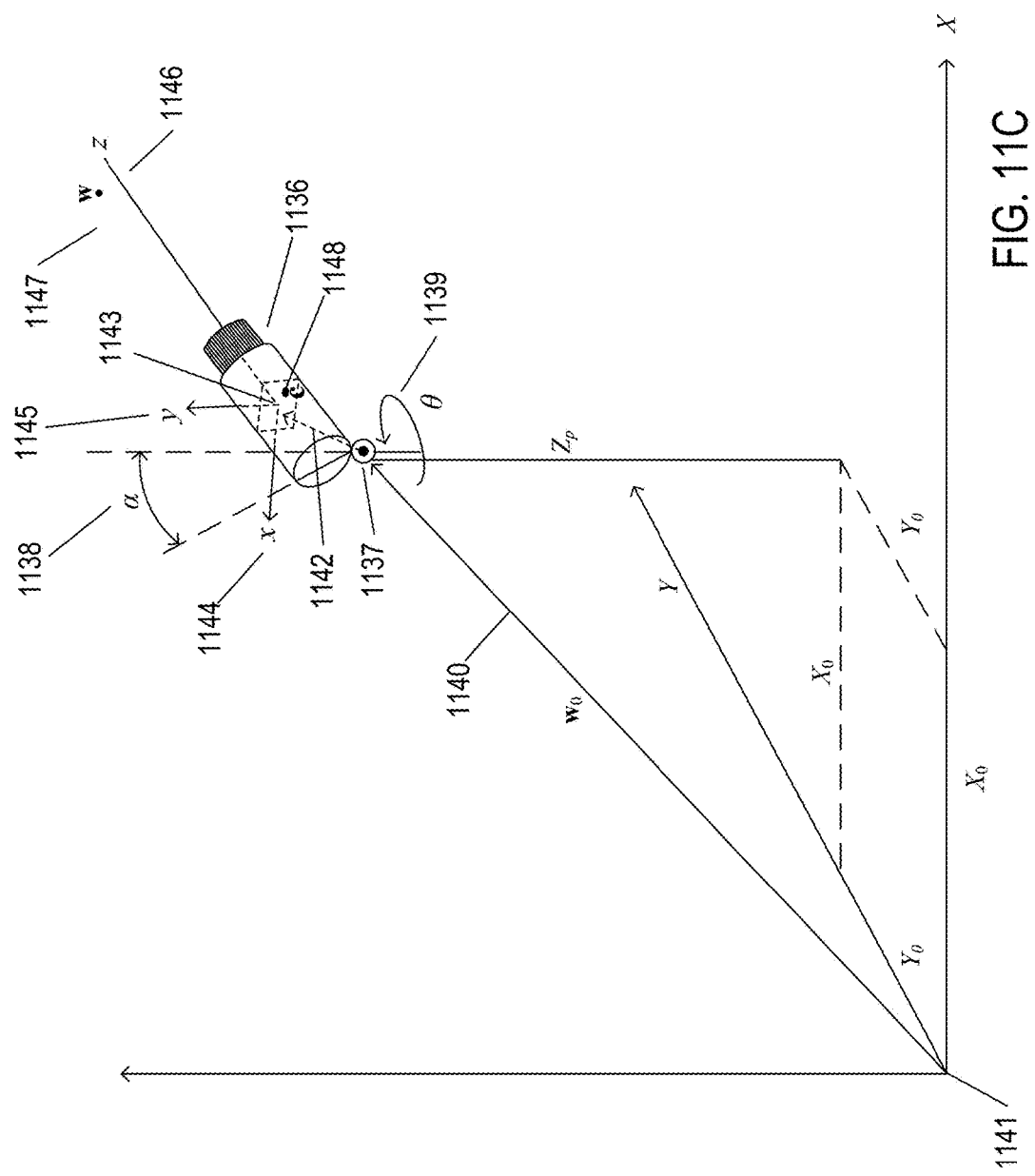
FIG. 11C illustrates one approach to mapping points in a world coordinate system to corresponding points on an image plane of a camera.
Figure 11D:
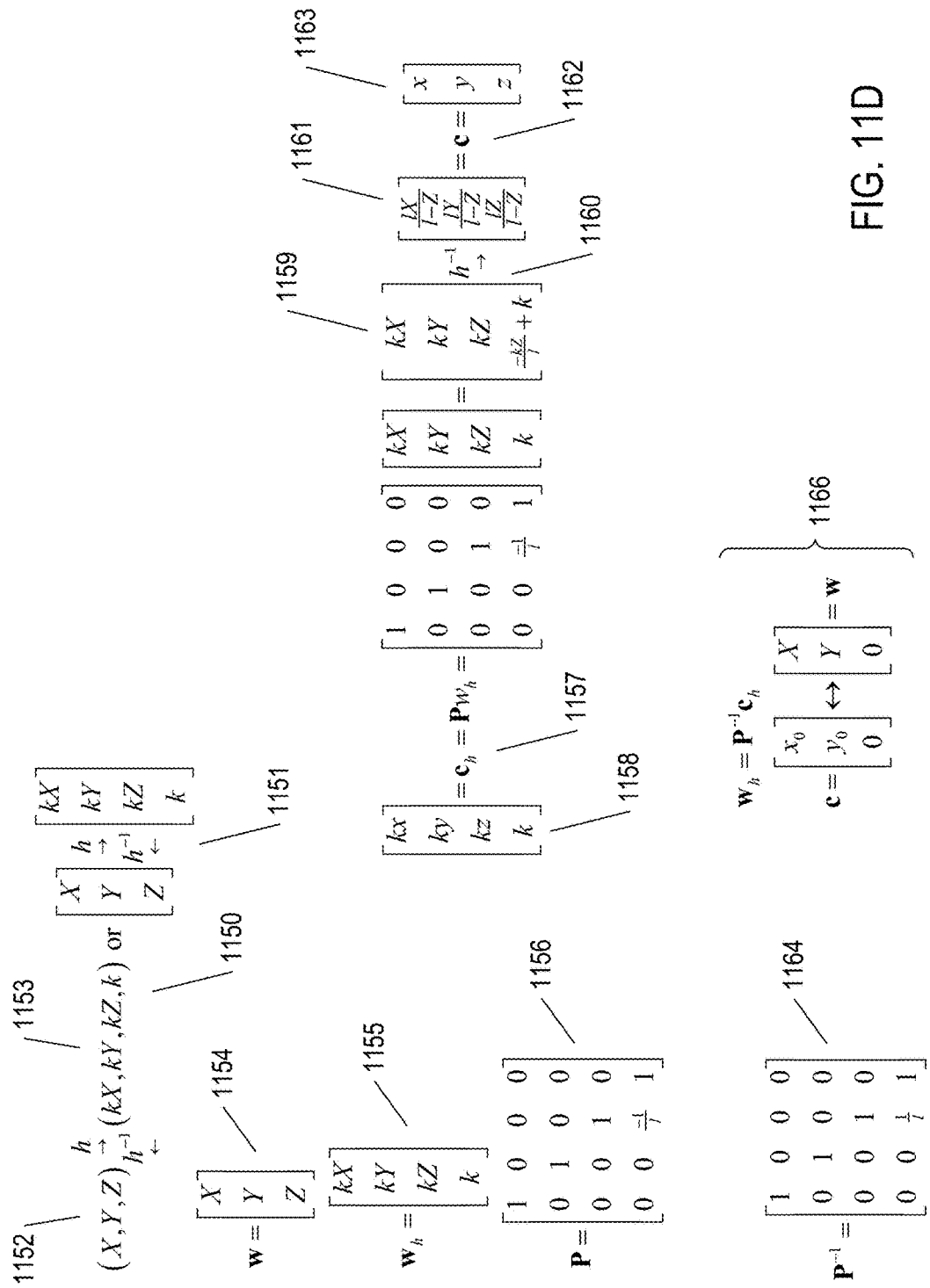
FIG. 11D illustrates one approach to mapping points in a world coordinate system to corresponding points on an image plane of a camera.

FIGS. 11C-E illustrate the process for computing the image of points in a three-dimensional space on the image plane of an arbitrarily oriented and positioned camera. FIG. 11C shows the arbitrarily positioned and oriented camera. The camera 1136 is mounted to a mount 1137 that allows the camera to be tilted by an angle α 1138 with respect to the vertical Z axis and to be rotated by an angle θ 1139 about a vertical axis. The mount 1137 can be positioned anywhere in three-dimensional space, with the position represented by a position vector $w_0$ 1140 from the origin of the world coordinate system 1141 to the mount 1137. A second vector r 1142 represents the relative position of the center of the image plane 1143 within the camera 1136 with respect to the mount 1137. The orientation and position of the origin of the camera coordinate system coincides with the center of the image plane 1143 within the camera 1136. The image plane 1143 lies within the x, y plane of the camera coordinate axes 1144-1146. The camera is shown, in FIG. 11C, imaging a point w 1147, with the image of the point w appearing as image point c 1148 on the image plane 1143 within the camera. The vector $w_0$ that defines the position of the camera mount 1137 is shown, in FIG. 11C, to be the vector $$w_0 = \begin{bmatrix} X_0 \\ Y_0 \\ Z_0 \end{bmatrix}.$$

FIGS. 11D-E show the process by which the coordinates of a point in three-dimensional space, such as the point corresponding to vector w in world-coordinate-system coordinates, is mapped to the image plane of an arbitrarily positioned and oriented camera. First, a transformation between world coordinates and homogeneous coordinates h and the inverse transformation $h^{-1}$ is shown in FIG. 11D by the expressions 1150 and 1151. The forward transformation from world coordinates 1152 to homogeneous coordinates 1153 involves multiplying each of the coordinate components by an arbitrary constant k and adding a fourth coordinate component having the value k. The vector w corresponding to the point 1147 in three-dimensional space imaged by the camera is expressed as a column vector, as shown in expression 1154 in FIG. 11D. The corresponding column vector $w_h$ in homogeneous coordinates is shown in expression 1155. The matrix P is the perspective transformation matrix, shown in expression 1156 in FIG. 11D. The perspective transformation matrix is used to carry out the world-to-camera coordinate transformations (1134 in FIG. 11A) discussed above with reference to FIG. 11A. The homogeneous-coordinate-form of the vector c corresponding to the image 1148 of point 1147, $c_h$, is computed by the left-hand multiplication of $w_h$ by the perspective transformation matrix, as shown in expression 1157 in FIG. 11D. Thus, the expression for $c_h$ in homogeneous camera coordinates 1158 corresponds to the homogeneous expression for $c_h$ in world coordinates 1159. The inverse homogeneous-coordinate transformation 1160 is used to transform the latter into a vector expression in world coordinates 1161 for the vector c 1162. Comparing the camera-coordinate expression 1163 for vector c with the world-coordinate expression for the same vector 1161 reveals that the camera coordinates are related to the world coordinates by the transformations (1134 in FIG. 11A) discussed above with reference to FIG. 11A. The inverse of the perspective transformation matrix, $P^{-1}$, is shown in expression 1164 in FIG. 11D. The inverse perspective transformation matrix can be used to compute the world-coordinate point in three-dimensional space corresponding to an image point expressed in camera coordinates, as indicated by expression 1166 in FIG. 11D. Note that, in general, the Z coordinate for the three-dimensional point imaged by the camera is not recovered by the perspective transformation. This is because all of the points in front of the camera along the line from the image point to the imaged point are mapped to the image point. Additional information is needed to determine the Z coordinate for three-dimensional points imaged by the camera, such as depth information obtained from a set of stereo images or depth information obtained by a separate depth sensor.

Three additional matrices are shown in FIG. 11E that represent the position and orientation of the camera in the world coordinate system. The translation matrix $T_{w_0}$ 1170 represents the translation of the camera mount (1137 in FIG. 11C) from its position in three-dimensional space to the origin (1141 in FIG. 11C) of the world coordinate system. The matrix R represents the α and θ rotations needed to align the camera coordinate system with the world coordinate system 1172. The translation matrix C 1174 represents translation of the image plane of the camera from the camera mount (1137 in FIG. 11C) to the image plane's position within the camera represented by vector r (1142 in FIG. 11C). The full expression for transforming the vector for a point in three-dimensional space $w_h$ into a vector that represents the position of the image point on the camera image plane $c_h$ is provided as expression 1176 in FIG. 11E. The vector $w_h$ is multiplied, from the left, first by the translation matrix 1170 to produce a first intermediate result, the first intermediate result is multiplied, from the left, by the matrix R to produce a second intermediate result, the second intermediate result is multiplied, from the left, by the matrix C to produce a third intermediate result, and the third intermediate result is multiplied, from the left, by the perspective transformation matrix P to produce the vector $c_h$. Expression 1178 shows the inverse transformation. Thus, in general, there is a forward transformation from world-coordinate points to image points 1180 and, when sufficient information is available, an inverse transformation 1181. It is the forward transformation 1180 that is used to generate two-dimensional images from a three-dimensional model or object corresponding to arbitrarily oriented and positioned cameras. Each point on the surface of the three-dimensional object or model is transformed by forward transformation 1180 to points on the image plane of the camera.

FIG. 11F illustrates matrix equations that relate two different images of an object, when the two different images differ because of relative changes in the position, orientation, and distance from the camera of the objects, arising due to changes in the position and orientation of the camera, position and orientation of the objects being imaged, or both. Because multiplications of square matrices produce another square matrix, equation 1176 shown in FIG. 11E can be concisely expressed as equation 1190 in FIG. 11F. This equation determines the position of points in an image to the position of the corresponding points in a three-dimensional space. Equation 1191 represents computation of the points in a second image from corresponding points in a three-dimensional space where the points in the three-dimensional space have been altered in position or orientation from the corresponding points used to produce the points $c_h$ in a first imaging operation represented by equation 1190. The T, R, and S matrices in equation 1191 represent translation, rotation, and scaling operations. Equation 1190 can be recast as equation 1192 by multiplying both sides of equation 1190 by the inverse of matrix M. Substituting the left side of equation 1192 into equation 1191 produces equation 1194, which relates positions in the first image, $c_h$, to positions in the second image, $c'_h$. Equation 1194 can be more succinctly represented as equation 1195 and alternatively as equation 1196. Because equation 1196 is expressing a relationship between positions of points in two images, and therefore the z coordinate is of no interest, equation 1196 can be recast as equation 1197 where the z-coordinate values are replaced by 0. Representing the matrix M* abstractly in equation 1198, a new matrix M** can be created by removing the third row and third column from matrix M*, as shown in equation 1199a. Removing the z-coordinate values from the $c_h$ and $c'_h$ vectors, equation 1199b is obtained. In the case that there are four pairs of points with known coordinates in each of the two images, the relationship between these four pairs of points can be expressed as equation 1199c. This equation is slightly over-determined, but can be used to determine, by known techniques, values for the nine elements of the matrix M**. Thus, regardless of the differences in orientation, position, and distance from the camera of a set of objects during two different image-acquisition operation, a matrix can be determined, by comparing the positions of a number of known corresponding features in the two images, that represents the transformation and reverse transformation relating the two images.

Feature Detectors

Feature detectors are another type of image-processing methodology, various types of which are used in the methods and systems to which the current document is directed, as discussed below. A particular feature detector, referred to as the "Scale Invariant Feature Transform" ("SIFT"), is discussed in some detail, in the current subsection, as an example of the various feature detectors that may be employed in methods and subsystems to which the current document is directed.

Figure 12:
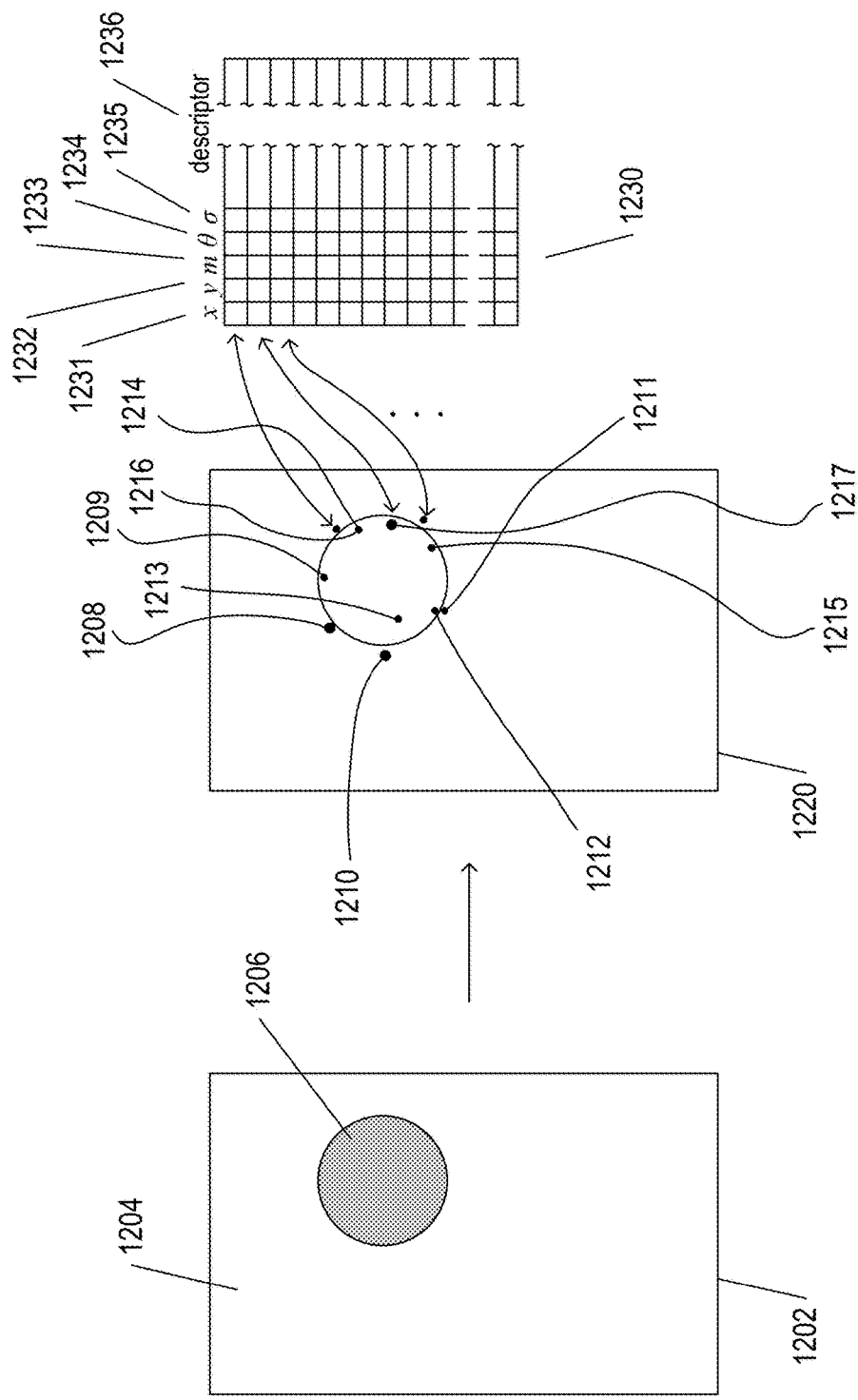
FIG. 12 illustrates feature detection by the SIFT technique.

FIG. 12 illustrates feature detection by the SIFT technique. In FIG. 12, a first simple digital image 1202 is shown to include a generally featureless background 1204 and a shaded disk region 1206. Application of SIFT feature detection to this image generates a set of keypoints or features, such as the features 1208-1217 overlaid on a copy 1220 of the original image, shown in FIG. 12 to the right of the original image. The features are essentially annotated points within the digital image, having coordinates (x,y) relative to image coordinate axes generally parallel to the top and left-hand edges of the image. These points are selected to be relatively invariant to image translation, scaling, and rotation and partially invariant to illumination changes and affine projection. Thus, in the case that a particular object is first imaged to generate a canonical image of the object, features generated by the SIFT technique for this first canonical image can be used to locate the object in additional images in which image acquisition differs in various ways, including perspective, illumination, location of the object relative to the camera, orientation of the object relative to the camera, or even physical distortion of the object. Each feature generated by the SIFT technique is encoded as a set of values and stored in a database, file, in-memory data structure, or other such data-storage entity. In FIG. 12, the stored descriptors are arranged in a table 1230, each row of which represents a different feature. Each row contains a number of different fields corresponding to columns in the table: (1) x 1231, the x coordinate of the feature; (2) y 1232, the y coordinate of the feature; (3) m 1233, a magnitude value for the feature; (4) θ 1234, an orientation angle for the feature; (5) σ 1235, a scale value for the feature; and (6) a descriptor 1236, an encoded set of characteristics of the local environment of the feature that can be used to determine whether a local environment of a point in another image can be considered to be the same feature identified in the other image.

Figure 13:
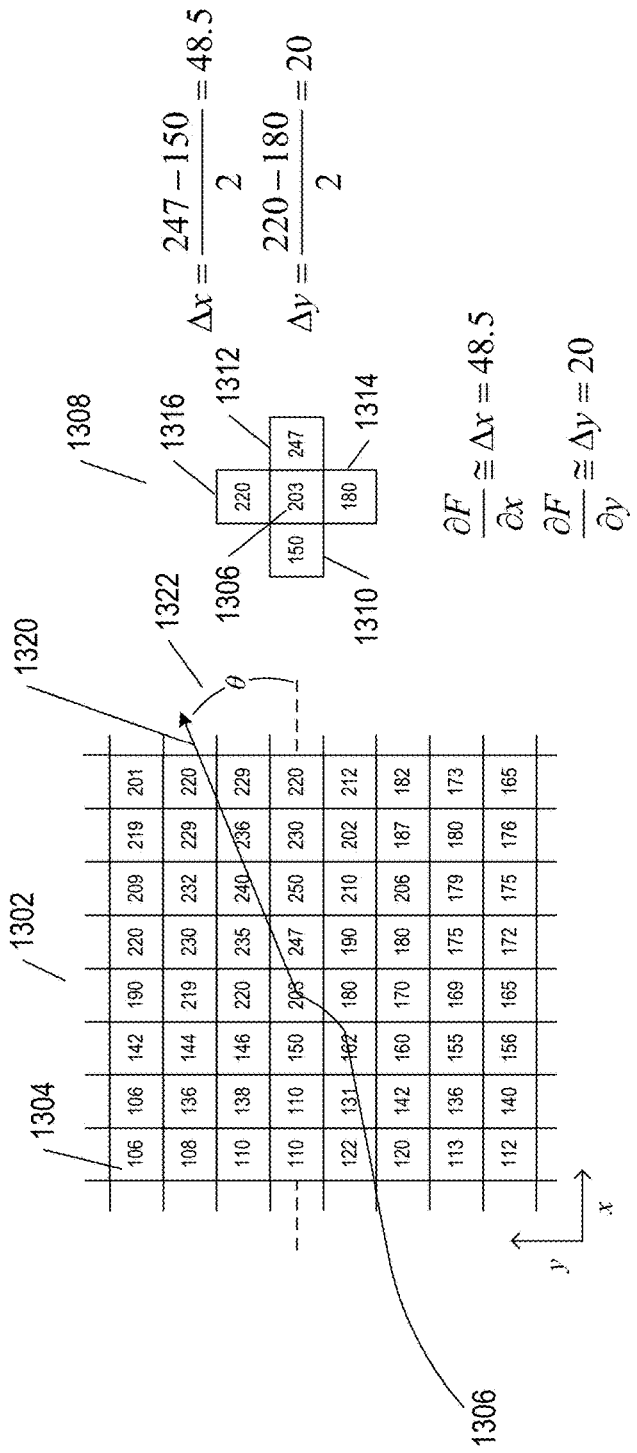
FIG. 13 provides background information for various concepts used by the SIFT technique to identify features within images.

FIGS. 13-18 provide background information for various concepts used by the SIFT technique to identify features within images. FIG. 13 illustrates a discrete computation of an intensity gradient. In FIG. 13, a small square portion 1302 of a digital image is shown. Each cell, such as cell 1304, represents a pixel and the numeric value within the cell, such as the value "106" in cell 1304, represents a grayscale intensity. Consider pixel 1306 with the intensity value "203." This pixel, and four contiguous neighbors, are shown in the cross-like diagram 1308 to the right of the portion 1302 of the digital image. Considering the left 1310 and right 1312 neighbor pixels, the change in intensity value in the x direction, Δx, can be discretely computed as:

$$\Delta x = \frac{247 - 150}{2} = 48.5.$$

Considering the lower 1314 and upper 1316 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 1306:

$$\frac{\partial F}{\partial x} \cong \Delta x = 48.5.$$

The partial differential of the intensity function F with respect to the y coordinate at the central pixel 1306 is estimated by Δy:

$$\frac{\partial F}{\partial y} \cong \Delta y = 20.$$

The intensity gradient at pixel 1306 can then be estimated as:

$$\text{gradient} = \nabla F = \frac{\partial F}{\partial x}i + \frac{\partial F}{\partial y}j = 48.5i + 20j$$

where i and j are the unit vectors in the x and y directions. The magnitude of the gradient vector and the angle of the gradient vector are then computed as:

$|\text{gradient}| = \sqrt{48.5^2 + 20^2} = 52.5$ $\theta = a\tan 2(20, 48.5) = 22.4$ The direction of the intensity gradient vector 1320 and the angle θ 1322 are shown superimposed over the portion 1302 of the digital image in FIG. 13. Note that the gradient vector points in the direction of steepest increase in intensity from pixel 1306. The magnitude of the gradient vector indicates an expected increase in intensity per unit increment in the gradient direction. Of course, because the gradient is only estimated by discrete operations, in the computation illustrated in FIG. 13, both the direction and magnitude of the gradient are merely estimates.

Figure 14:
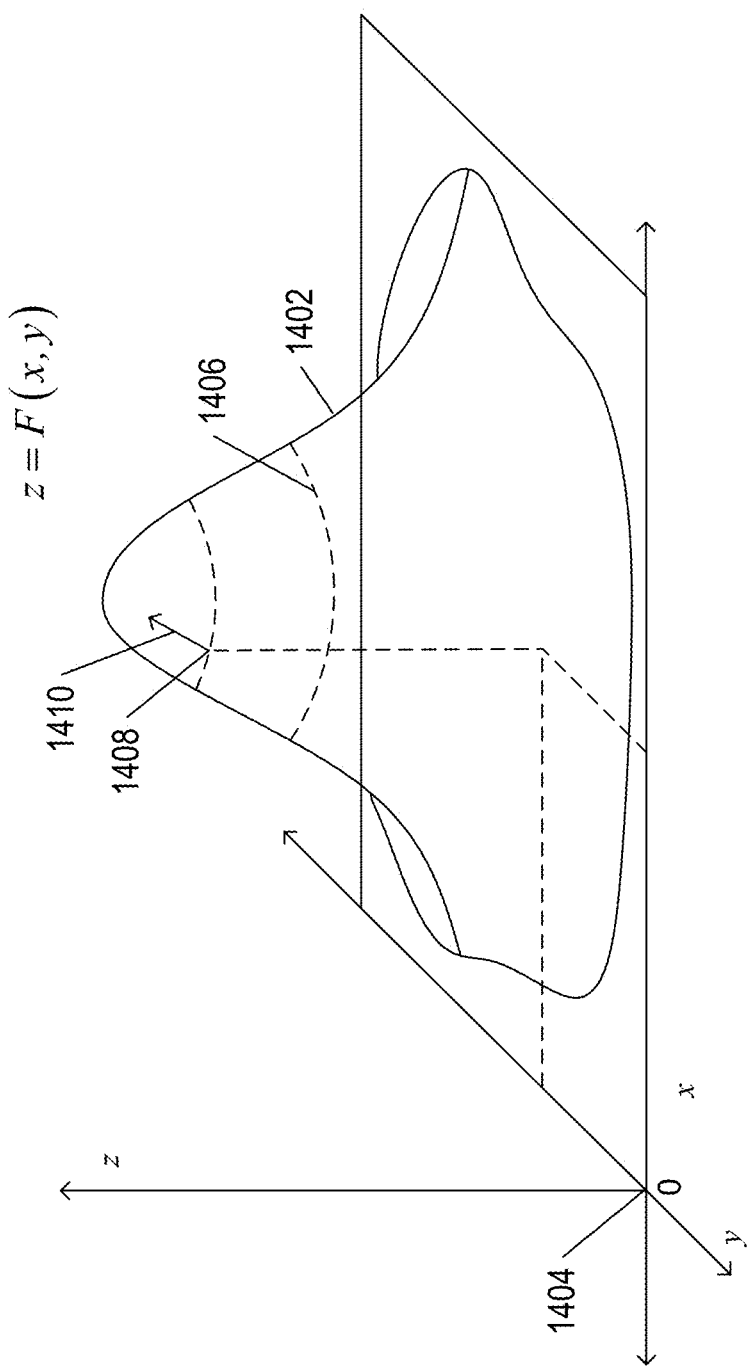
FIG. 14 provides background information for various concepts used by the SIFT technique to identify features within images.

FIG. 14 illustrates a gradient computed for a point on a continuous surface. FIG. 14 illustrates a continuous surface z=F(x,y). The continuous surface 1402 is plotted with respect to a three-dimensional Cartesian coordinate system 1404, and has a hat-like shape. Contour lines, such as contour line 1406, can be plotted on the surface to indicate a continuous set of points with a constant z value. At a particular point 1408 on a contour plotted on the surface, the gradient vector 1410 computed for the point is perpendicular to the contour line and points in the direction of the steepest increase along the surface from point 1408.

Figure 15:
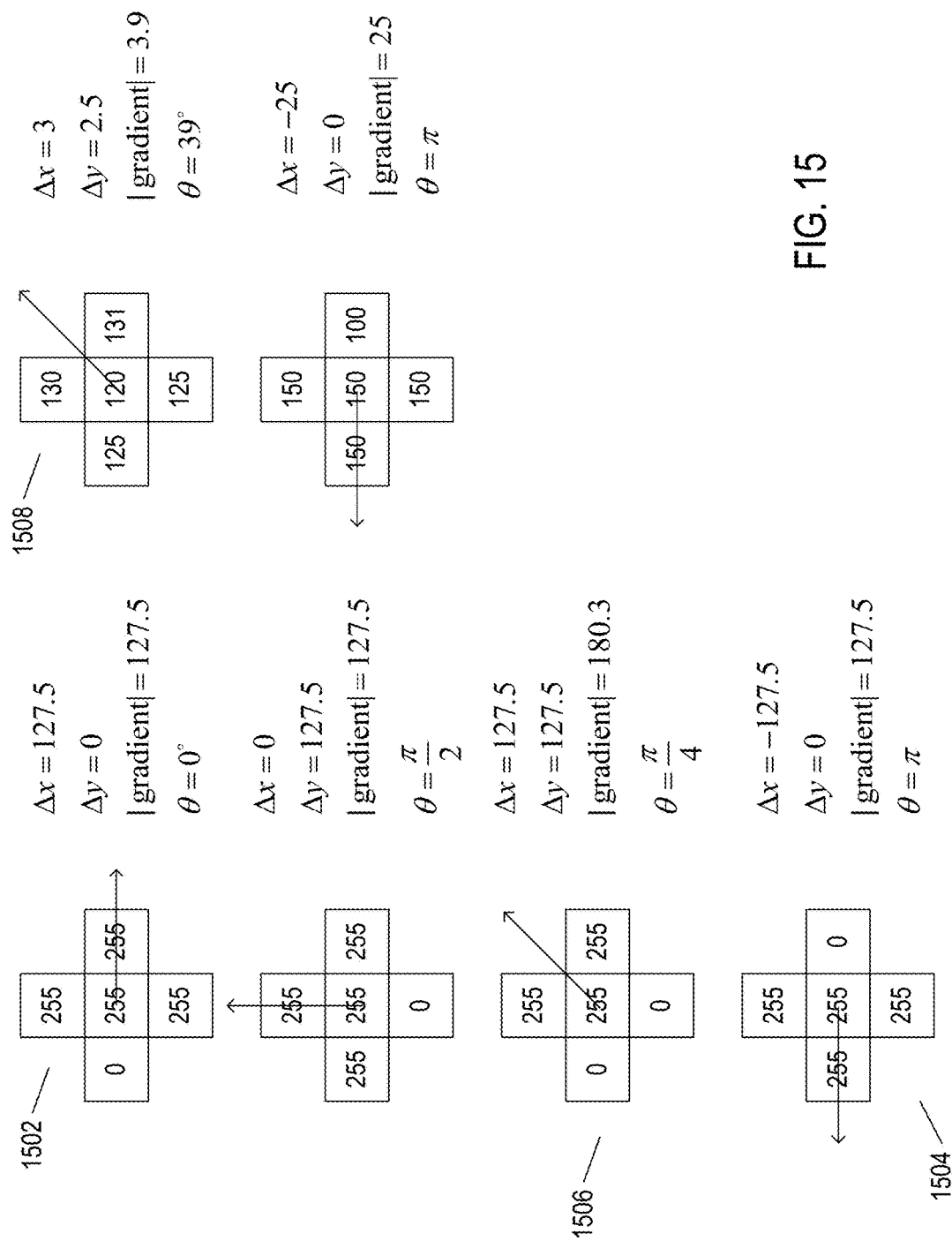
FIG. 15 provides background information for various concepts used by the SIFT technique to identify features within images.

In general, an intensity gradient vector is oriented perpendicularly to an intensity edge, and the greater the magnitude of the gradient, the sharper the edge or the greatest difference in intensities of the pixels on either side of the edge. FIG. 15 illustrates a number of intensity-gradient examples. Each example, such as example 1502, includes a central pixel for which the gradient is computed and the four contiguous neighbors used to compute Δx and Δy. The sharpest intensity boundaries are shown in the first column 1504. In these cases, the magnitude of the gradient is at least 127.5 and, for the third case 1506, 180.3. A relatively small difference across an edge, shown in example 1508, produces a gradient with a magnitude of only 3.9. In all cases, the gradient vector is perpendicular to the apparent direction of the intensity edge through the central pixel.

Figure 16:
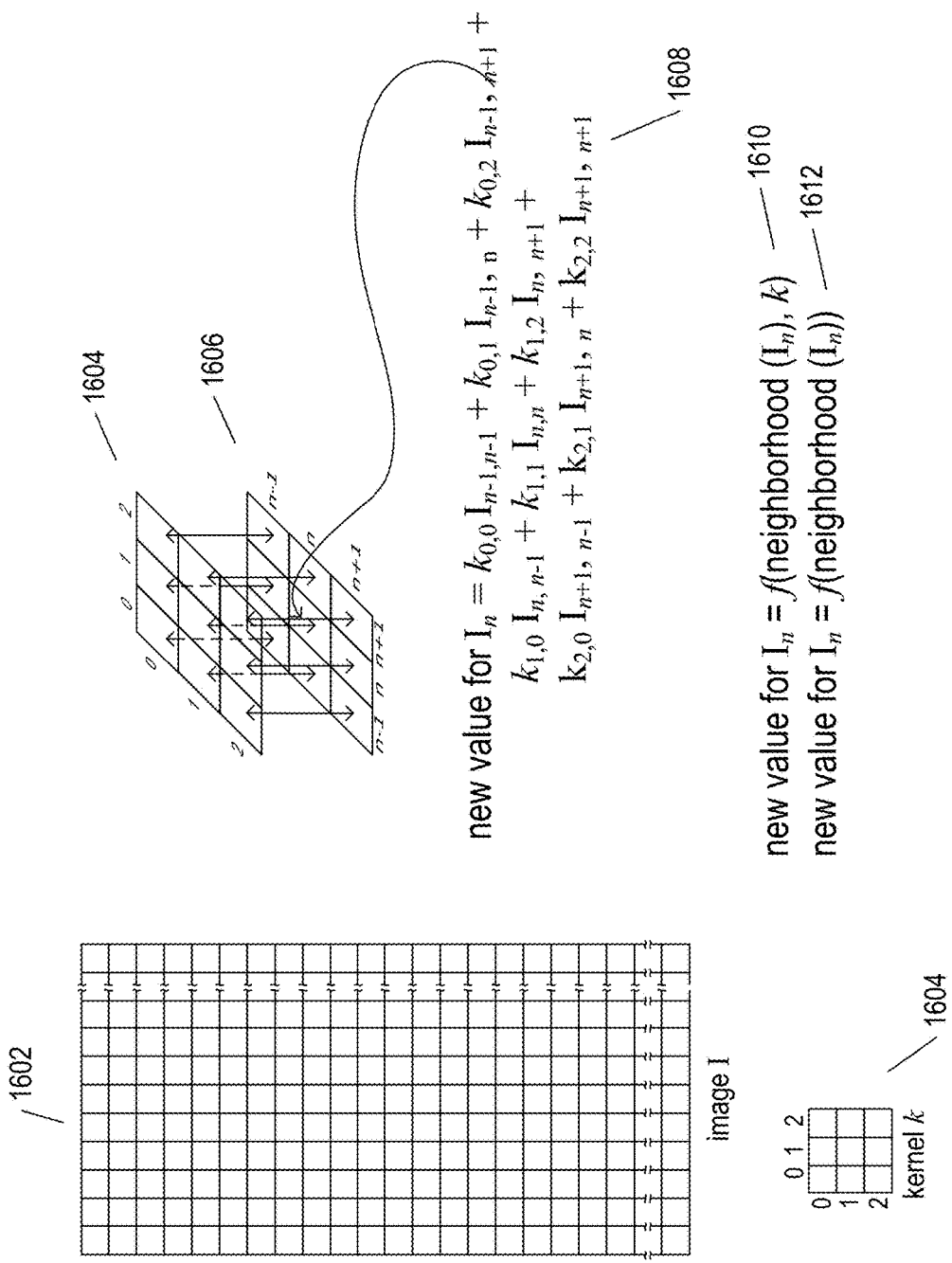
FIG. 16 provides background information for various concepts used by the SIFT technique to identify features within images.

Many image-processing methods involve application of kernels to the pixel grid that constitutes the image. FIG. 16 illustrates application of a kernel to an image. In FIG. 16, a small portion of an image 1602 is shown as a rectilinear grid of pixels. A small 3×3 kernel k 1604 is shown below the representation of image I 1602. A kernel is applied to each pixel of the image. In the case of a 3×3 kernel, such as kernel k 1604 shown in FIG. 16, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1604 is computationally layered over a neighborhood of the pixel to which the kernel is applied 1606 having the same dimensions, in pixels, as the kernel. Application of the kernel to the neighborhood of the pixel to which the kernel is applied produces a new value for the pixel in a transformed image produced by applying the kernel to pixels of the original image. In certain types of kernels, the new value for the pixel to which the kernel is applied, $I_n$, is obtained as the sum of the products of the kernel value and pixel aligned with the kernel value 1608. In other cases, the new value for the pixel is a more complex function of the neighborhood about the pixel and the kernel 1610. In yet other types of image processing, a new value for a pixel is generated by a function applied to the neighborhood of the pixel, without using a kernel 1612.

Figure 17:
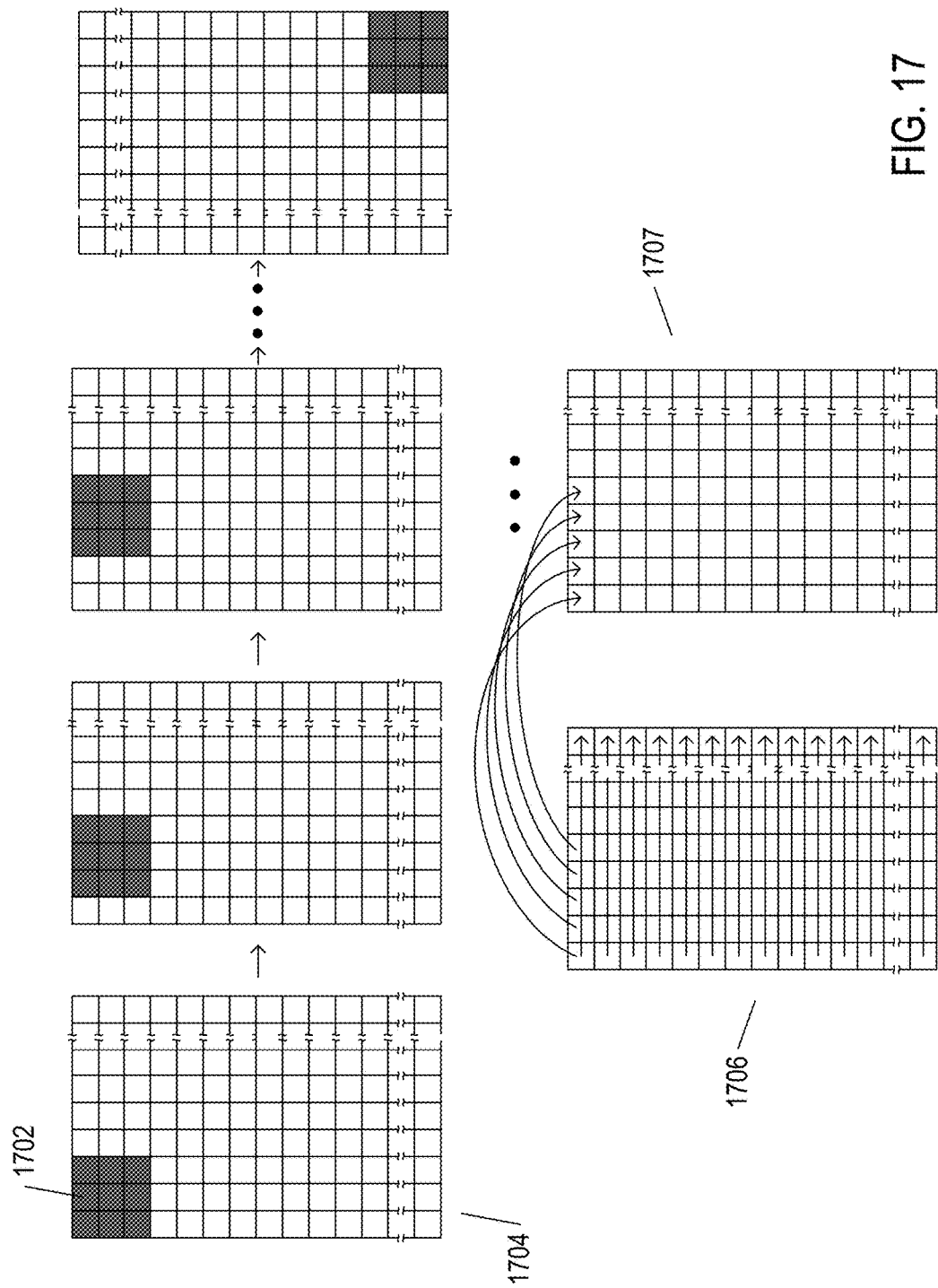
FIG. 17 provides background information for various concepts used by the SIFT technique to identify features within images.

FIG. 17 illustrates convolution of a kernel with an image. In general, the kernel is sequentially applied to each pixel of an image, in some cases, into each non-edge pixel of an image; in other cases, to produce new values for a transformed image. In FIG. 17, a 3×3 kernel, shown by shading 1702, is sequentially applied to the first row of non-edge pixels in an image 1704. Each new value generated by application of a kernel to a pixel in the original image 1706 is then placed into the transformed image 1707. In other words, the kernel is sequentially applied to the original neighborhoods of each pixel in the original image to produce the transformed image. This process is referred to as "convolution," and is loosely related to the mathematical convolution operation computed by multiplying Fourier-transformed images and then carrying out an inverse Fourier transform on the product.

Figure 18:
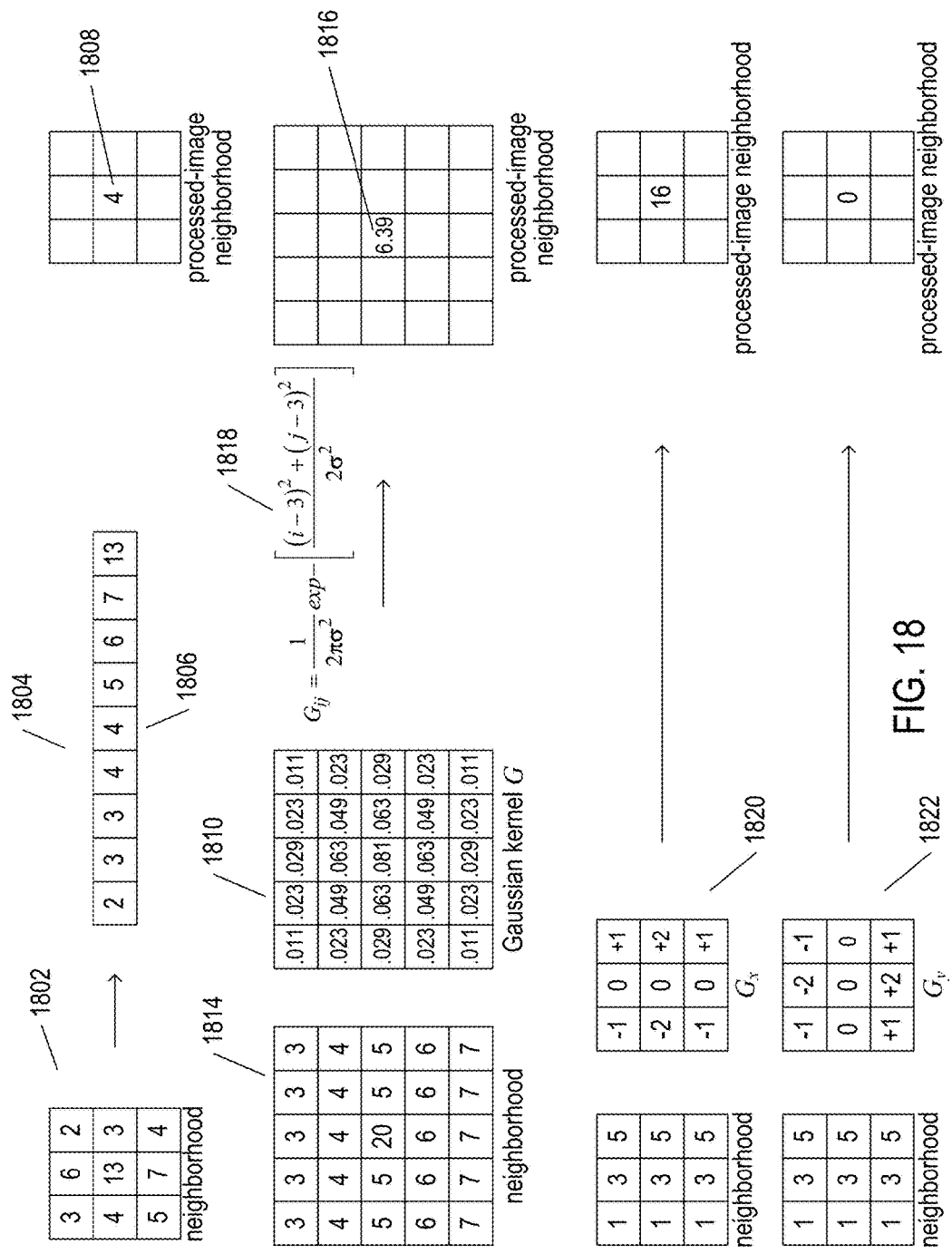
FIG. 18 provides background information for various concepts used by the SIFT technique to identify features within images.

FIG. 18 illustrates some example kernel and kernel-like image-processing techniques. In the process referred to as "median filtering," the intensity values in a neighborhood of the original image 1802 are sorted 1804 in ascending-magnitude order and the median value 1806 is selected as a new value 1808 for the corresponding neighborhood of the transformed image. Gaussian smoothing and denoising involves applying a Gaussian kernel 1810 to each neighborhood 1814 of the original image to produce the value for the central pixel of the neighborhood 1816 in the corresponding neighborhood of the processed image. The values in the Gaussian kernel are computed by an expression such as expression 1818 to produce a discrete representation of a Gaussian surface above the neighborhood formed by rotation of a bell-shaped curve about a vertical axis coincident with the central pixel. The horizontal and vertical components of the image gradient for each pixel can be obtained by application of the corresponding $G_x$ 1820 and $G_y$ 1822 gradient kernels. These are only three of the many different types of convolution-based image-processing techniques.

Returning to the SIFT technique, a first task is to locate candidate points in an image for designation as features. The candidate points are identified using a series of Gaussian filtering or smoothing and resampling steps to create a first Gaussian pyramid and then computing differences between adjacent layers in the first Gaussian pyramid to create a second difference-of-Gaussians ("DoG") pyramid. Extrema points within neighborhoods of the DoG pyramid are selected as candidate features, with the maximum value of a point within the neighborhood used to determine a scale value for the candidate feature.

Figure 19B:
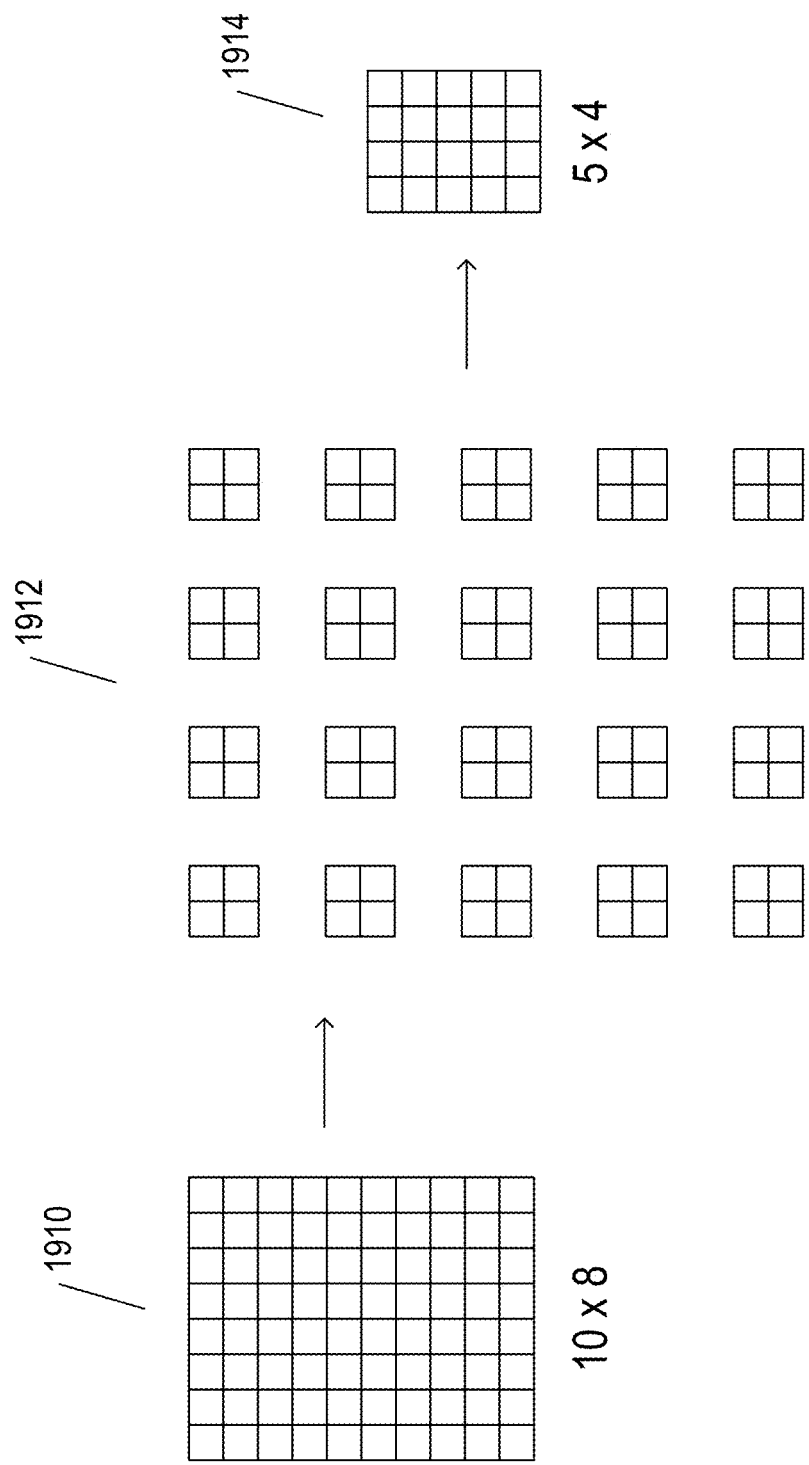
FIG. 19B illustrates the selection of candidate feature points from an image.

FIGS. 19A-D illustrate the selection of candidate feature points from an image. FIG. 19A shows changes in the shape of a one-dimensional Gaussian curve with increasing values of the variance parameter for the curve. A first one-dimensional Gaussian curve 1902 is obtained using an initial variance parameter 1903. By increasing the value of the variance parameter to produce a second variance parameter 1904, a broader Gaussian curve 1905 is obtained. As the variance parameter increases, the Gaussian curve becomes broader and broader, as can be seen in the series of Gaussian curves 1902, 1905, and 1906-1907. Convolution of a Gaussian kernel with an image generally removes fine-granularity detail and produces a smoothing of the image. As the variance parameter increases, the corresponding Gaussian kernel removes increasing levels of detail from an image, resulting in increasing blurring of the image, since the value assigned to the central pixel by a Gaussian kernel is the average of an increasing number of neighboring pixels.

FIG. 19B illustrates rescaling of an image. An initial image 1910 has ten rows of pixels and eight columns of pixels. The pixels in this image can be partitioned into 20 groups of four pixels each 1912, and the average value of the four pixels assigned to each group. These average values can then be reassembled into a rescaled image 1914 having fewer pixels. This is one, simplistic rescaling method. In general, rescaling can choose an arbitrary rescaling parameter with the values for the rescaled pixels computed from neighborhoods centered around grid points in the original image defined by the rescaling parameter.

Figure 19C:
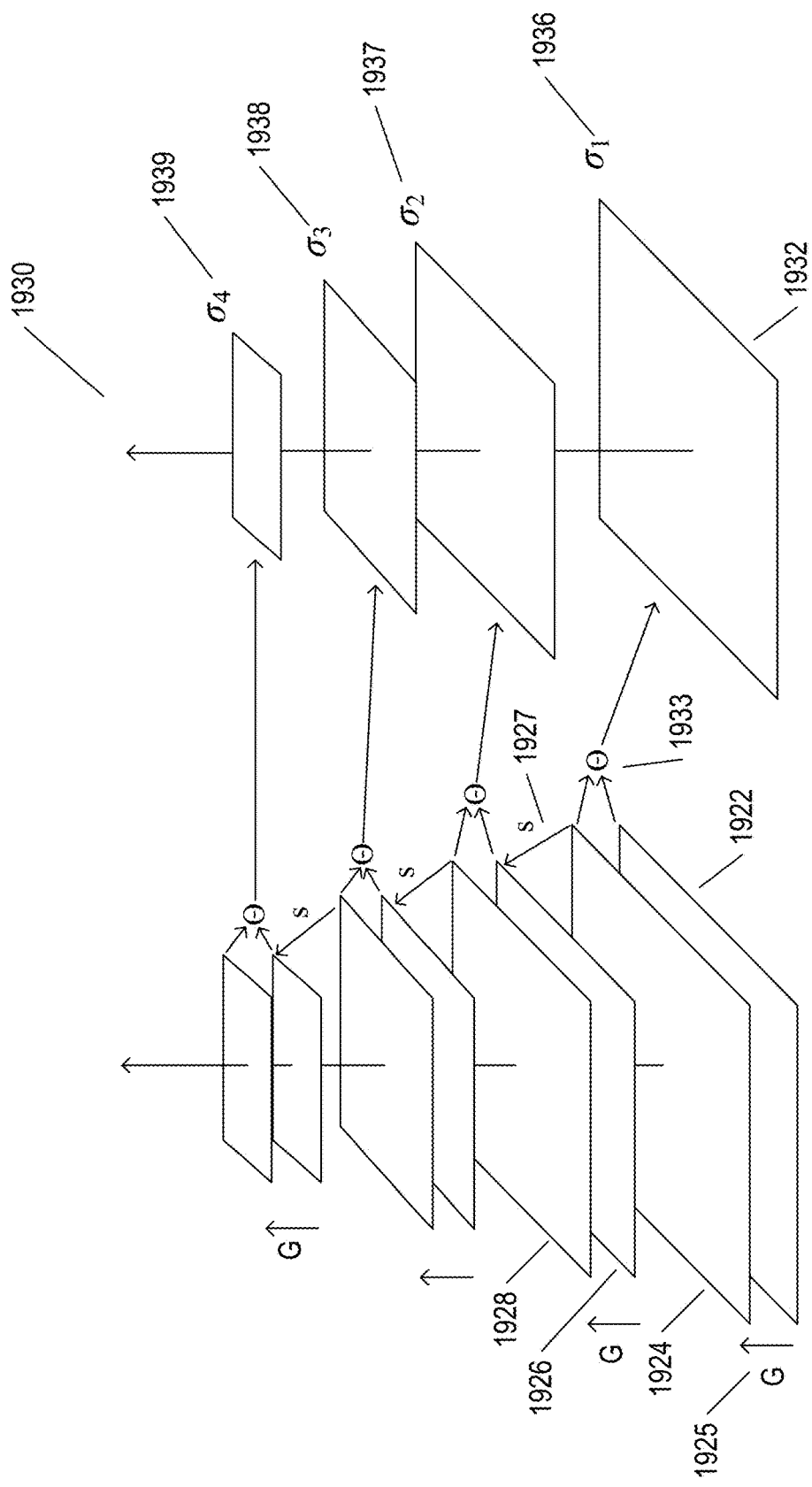
FIG. 19C illustrates the selection of candidate feature points from an image.

FIG. 19C illustrates construction of the initial Gaussian pyramid and second DoG pyramid. The initial Gaussian pyramid 1920 begins with the original image 1922 as its lowest level. The original image is smoothed using a Gaussian kernel to produce a corresponding smoothed image 1924. The symbol "G" and vertical arrow 1925 represent the Gaussian smoothing operation. Next, the smooth image 1924 is rescaled to produce a rescaled image 1926. This rescaling operation is represented by the symbol "S" and arrow 1927. The rescaled image is then smoothed by application of a Gaussian filter to produce a smoothed rescale image 1928. These operations are repeated to create successive double layers within the initial Gaussian pyramid. The second, DoG pyramid 1930 is obtained by computing a difference image from each pair of adjacent images in the initial Gaussian pyramid 1920. For example, the first image 1932 in the second, DoG pyramid is obtained by computing the difference 1933 of the initial two images 1922 and 1924 in the initial Gaussian pyramid 1920. Because the Gaussian kernel is applied to ever-greater rescalings of the initial image, the smoothing operation represented by each successive Gaussian smoothing operation from bottom to the top of the Gaussian pyramid is effectively carrying out smoothing at greater values of the variance parameter. Thus, the images from bottom to top of the Gaussian pyramid 1920 are increasingly blurred. A scale value 1936-1939 is associated with each layer in the DoG pyramid 1930 reflective of the combined effects of rescaling and Gaussian smoothing, with a greater value of the scale parameter indicating increasing blurring of the image.

Figure 19D:
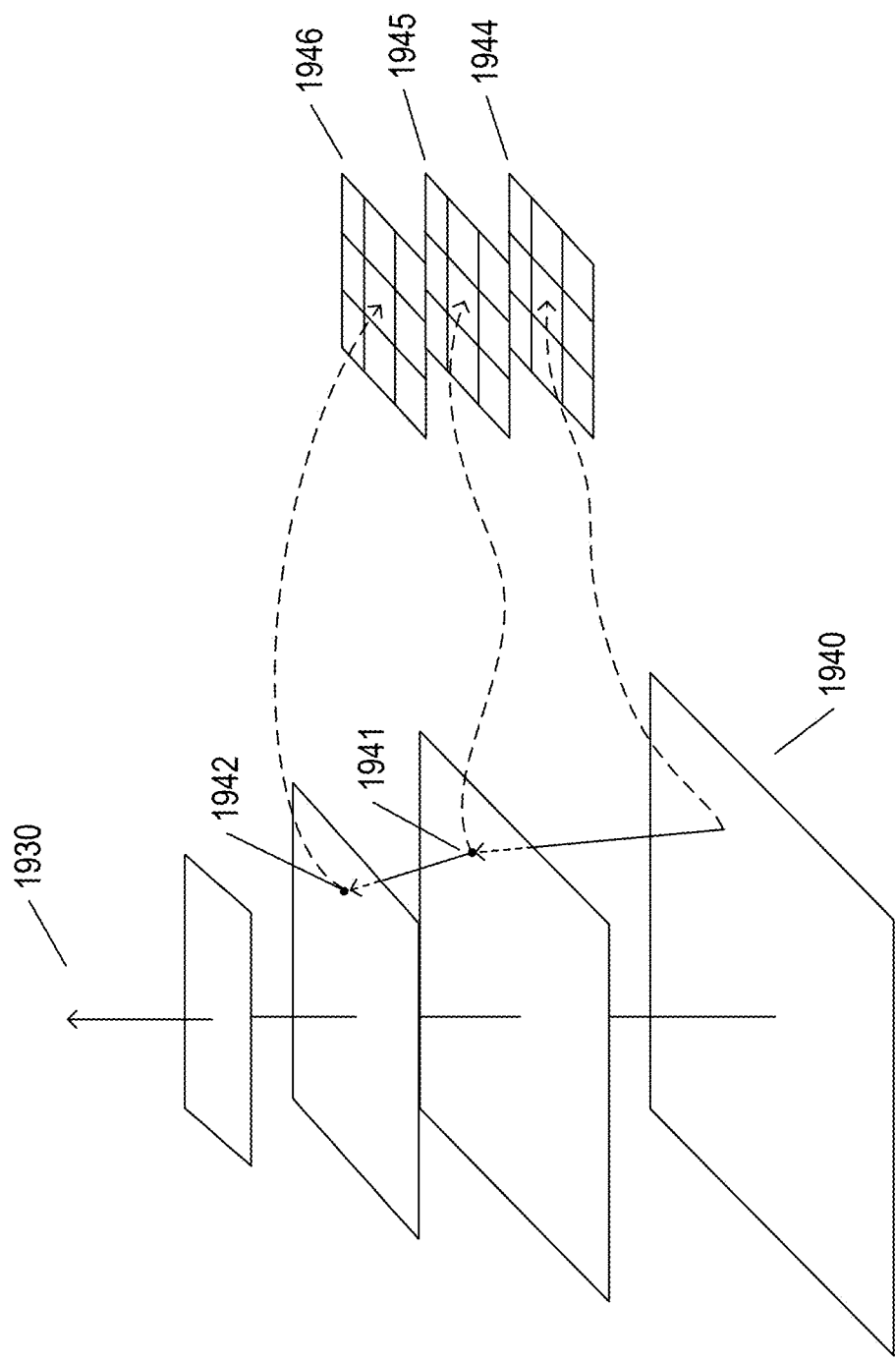
FIG. 19D illustrates the selection of candidate feature points from an image.

FIG. 19D illustrates selection of a candidate feature using the DoG pyramid obtained by the methods discussed above with reference to FIGS. 19A-C. A point in the lowest level of the DoG pyramid, such as point 1940, has corresponding locations in higher-level images 1941 and 1942 in the DoG pyramid 1930. A 3×3 neighborhood of the point in each of three successive layers 1944-1946 constitutes a neighborhood of the point within the DoG pyramid. If the value of the point is the maximum value in each neighborhood layer, then the point is selected as a candidate feature point. Furthermore, the scale parameter associated with the image from which the neighborhood layer is selected for the neighborhood layer in which the point has maximum value is selected as the scale for the candidate feature point (1235 in FIG. 12). Thus, by the method discussed with reference to FIGS. 19A-D, a set of candidate feature points is obtained along with the x, y, and a parameters for the candidate feature point.

It should be noted that the above discussion is somewhat simplified. For example, the original image may be added as a lowest level of the DoG pyramid and minimization of a Taylor series may be used to more precisely locate the positions of points within layers of the Gaussian pyramid and DoG pyramids. In fact, this method is an approximation to generating a scale space as the Laplacian of Gaussians, a mathematical operation that lies at the foundation of a variety of different image-processing techniques.

Figure 19E:
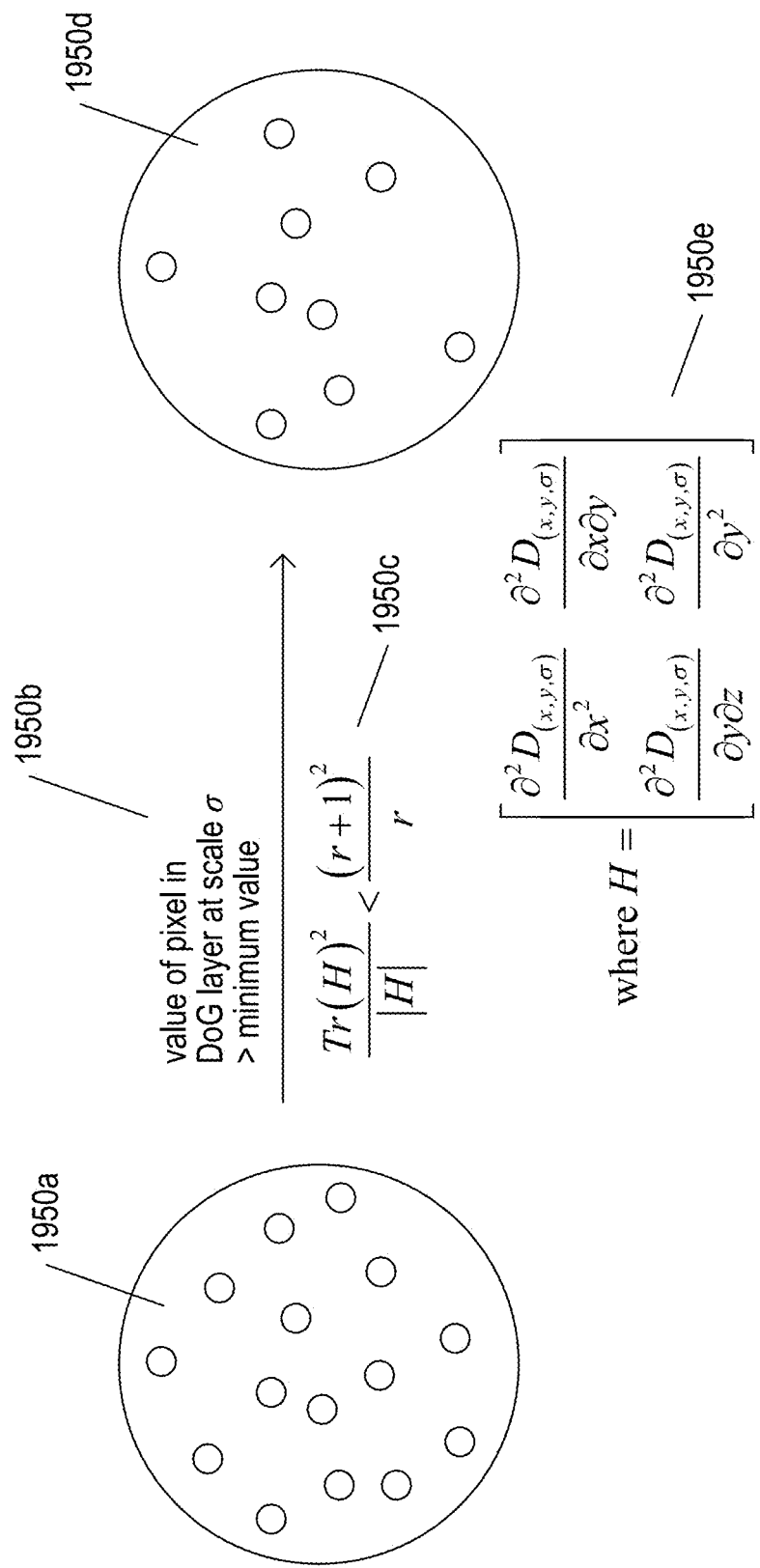
FIG. 19E illustrates filtering of candidate keypoints, or features, in the difference-of-Gaussian layers generated by the SIFT technique.

FIG. 19E illustrates filtering of candidate keypoints, or features, in the DoG layers generated by the SIFT technique. Extreme values in these layers are candidate keypoints or features. Because the DoG procedure tends to emphasize points lying on edges, candidate keypoints or features are filtered to remove candidate keypoints or features close to edges as well as candidate keypoints or features with values less than a minimum or threshold value. Thus, of the initial set of candidate keypoints or features 1950a, those candidate features with values less than the minimum or threshold value or with a ratio of principal curvatures greater than a value obtained using a different threshold r 1950c are removed to produce a smaller, filtered set of candidate features 1950d. The ratio of principal curvatures is obtained from the Hessian matrix 1950e which describes the local curvature of a surface.

Figure 19F:
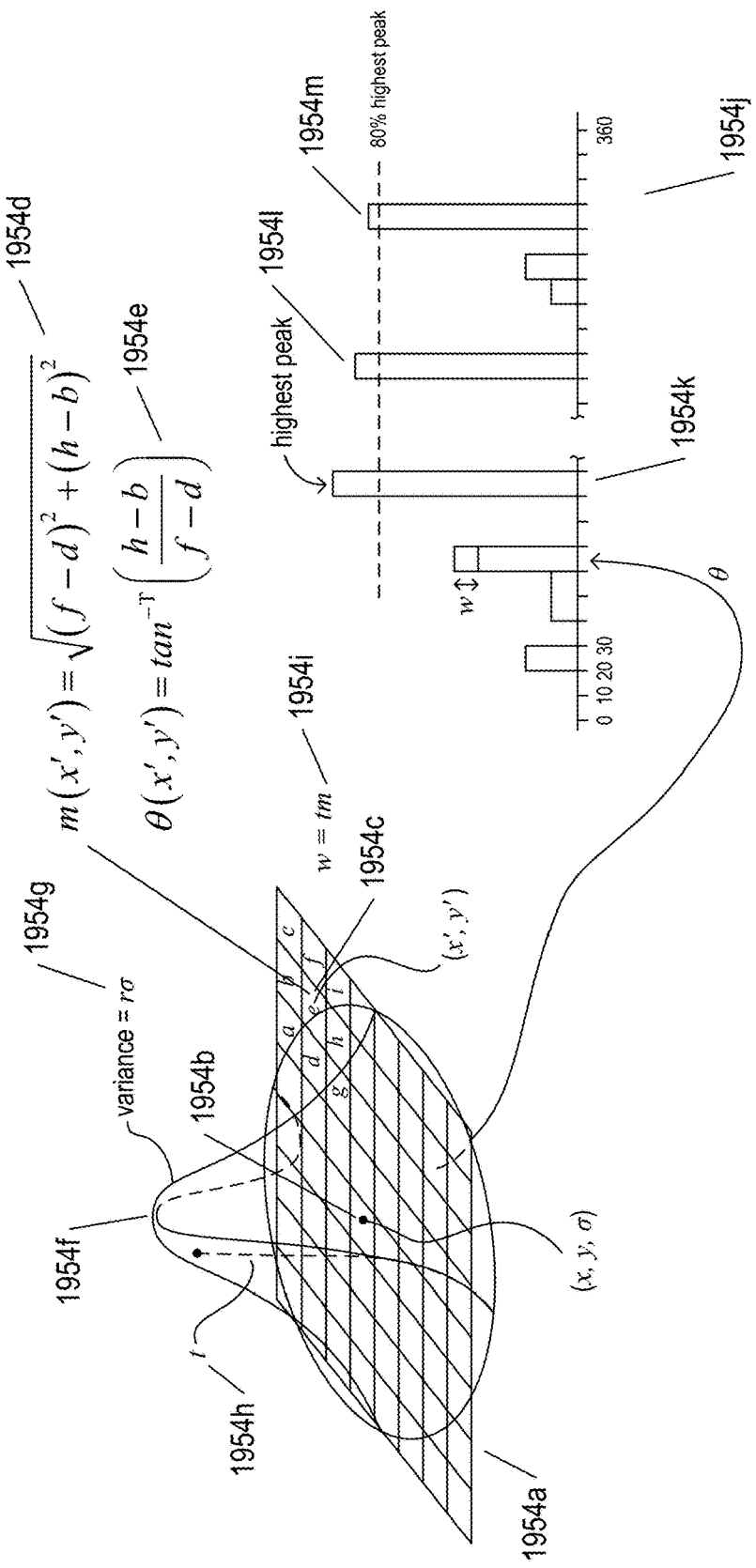
FIG. 19F illustrates how the magnitude and orientation of a feature is assigned from values in a difference-of-Gaussian layer.

FIG. 19F illustrates how the magnitude and orientation of a feature is assigned from values in a DoG layer. A pixel neighborhood 1954a about an identified candidate feature point 1954b is considered. For each point in the neighborhood, such as point 1954c, a gradient magnitude 1954d and orientation angle 1954e are estimated using differences in neighboring pixel values. A Gaussian weighting surface 1954f is constructed above the local neighborhood 1954a using the Gaussian parameter a equal to a value v times the scale value for the DoG plane 1954g. The height 1954h of the weighting surface above a particular point, t, is used as a multiplier of the computed magnitude for the pixel to generate a weight w 1954i. The weighted magnitudes of the pixels are then entered into a histogram 1954j that includes 36 bins for each 10° range of the computed gradient orientations for the pixels. The magnitude and θ value for the highest peak produced 1954k is used as the magnitude and θ value for the feature 1954b. Any histogram peaks greater than or equal to 80 percent of the height of the highest peak, such as peaks 1954l and 1954m, are treated as additional features that are assigned the corresponding magnitudes and θ values of those peaks.

Figure 19G:
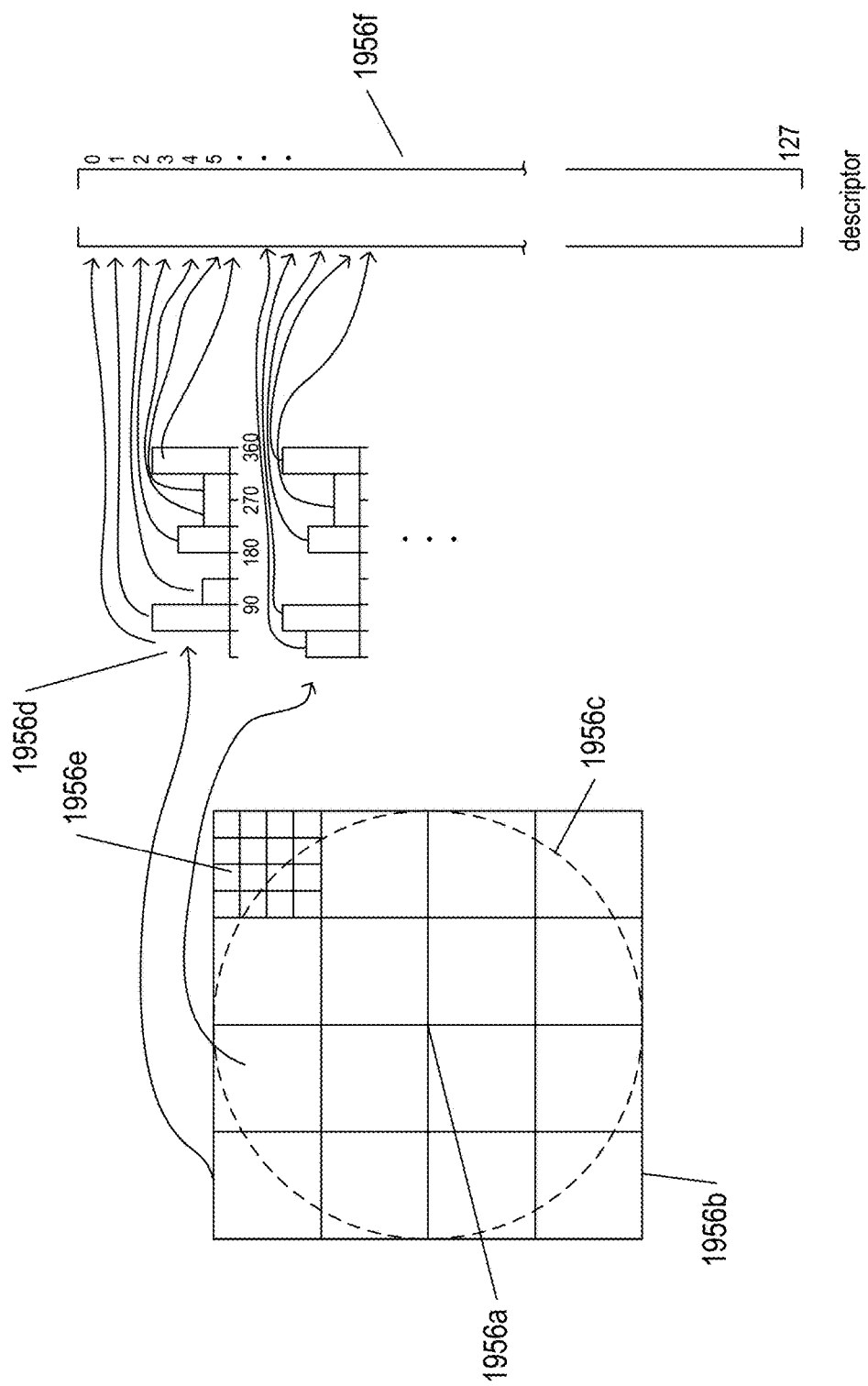
FIG. 19G illustrates computation of a descriptor for a feature.

FIG. 19G illustrates computation of a descriptor for a feature. In FIG. 19G, a feature is located at position 1956a within a 16×16 pixel neighborhood 1956b. As with the Gaussian surface constructed as shown in FIG. 19F, a similar Gaussian surface is constructed above neighborhood 1956b, as indicated by the dashed circle 1956c in FIG. 19G. The height of the surface of a point above a point is used to weight gradient magnitudes determined for each pixel in neighborhood 1956b. A histogram, such as histogram 1956d, is constructed for each 4×4 neighborhood within neighborhood 1956b, such as 4×4 neighborhood 1956e. The weighted magnitudes for the pixels in each 4×4 neighborhood are placed into the histogram according to the computed gradient orientations for the pixels. In this case, the histogram has eight bins, each bin corresponding to a 45° range of θ values. The column heights, or magnitudes, of the histogram are then entered into a 128-element vector 1956f to a form a feature descriptor. Determination of all of the attributes for SIFT features, shown as columns in table 1230 of FIG. 12, have now been described.

Figure 19H:
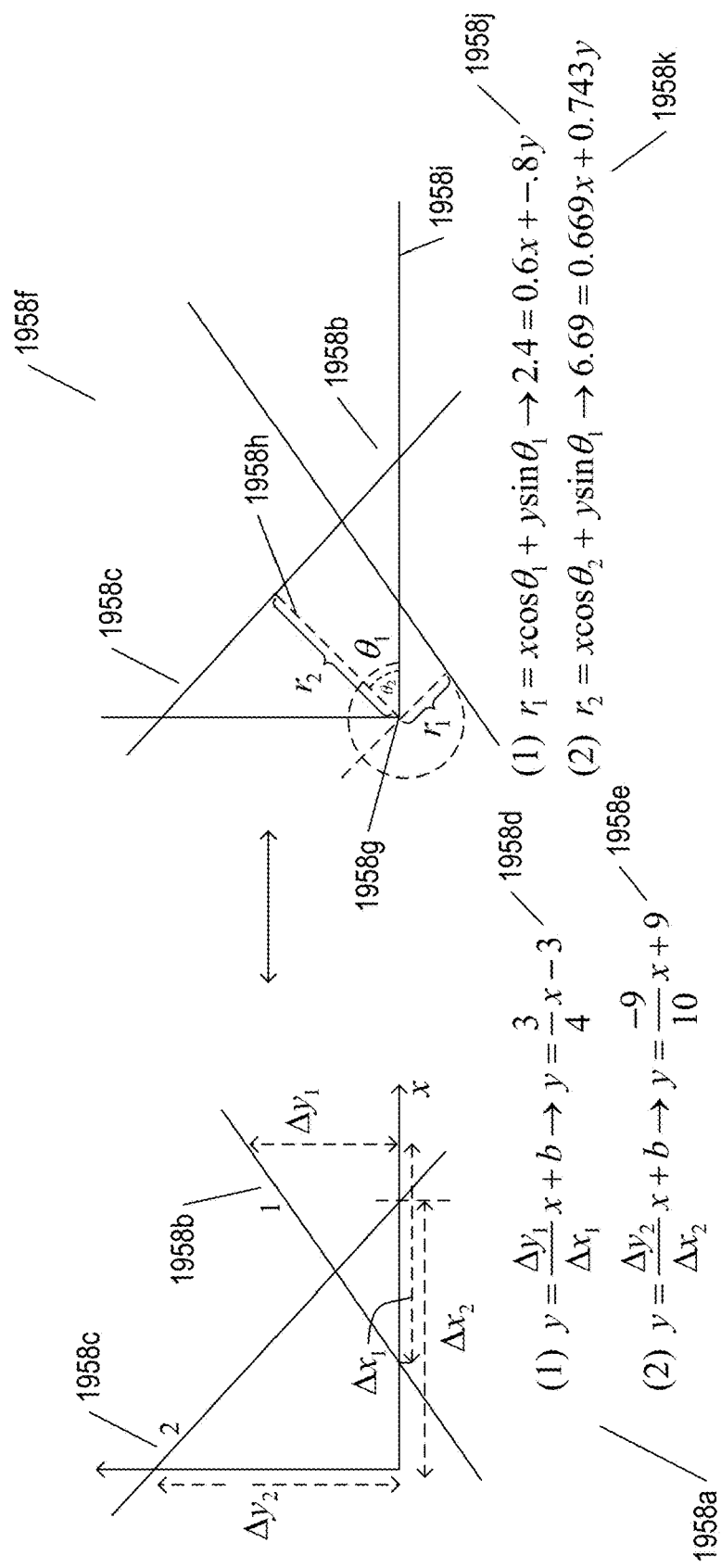
FIG. 19H illustrates a simple, one-parameter application of the Hough transform.

Another technique used both in identifying and characterizing SIFT features as well as in many other image-processing techniques is referred to as the Hough transform. FIGS. 19H-I illustrate a simple, one-parameter application of the Hough transform. It is the application for which the Hough transform was initially proposed in the image-processing context. As shown in FIG. 19H, the equations for lines in a two-dimensional plane can be expressed in a normal y=mx+b form 1958a. In this left-hand plot, there are two lines: line 1 1958b and line 2 1958c. The y=mx+b equations for these lines are shown as expressions 1958d and 1959e, respectively. The lines can alternatively be represented in a r=x cos θ+y sin θ, as shown in the right-hand plot 1958f in FIG. 19H. In this plot, the same two lines 1958b and 1958c are again plotted in a two-dimensional plane. The parameter r is the shortest distance between a line and the origin 1958g of the coordinate axes that define coordinate assignments to points in the two-dimensional plane. The angle of the line segment that connects the line to the origin, such as line segment 1958h, shown as a dashed line segment connecting line 1958b to the origin 1958g, with respect to the horizontal coordinate axis 1958i is the parameter θ in the r=x cos θ+y sin θ form of the equations of the lines. The r=x cos θ+y sin θ forms for the expressions for the two lines 1958b and 1958c are shown as expressions 1958j and 1958k, below plot 1958f.

FIG. 19I illustrates an example problem of determining whether or not a set of three data points plotted within a two-dimensional plane can be described as falling on a line and, if so, the equation for the line. Plot 1960a, in the top right-hand corner of FIG. 19I, shows a plot of three data points 1960b, 1960c, and 1960d, with their Cartesian coordinates shown next to the data points. These data points do not exactly fall on a line, but fall close to a line. In the Hough-Transform method, each data point places values in an r|θ parameter space corresponding to possible lines on which the data point is located. For example, data point 1960b is shown in plot 1960e as lying on seven different lines indicated by dashed-line segments, such as dashed-line segment 1960f These lines are equally spaced from one another in orientation by a relative orientation of 22.5° 1960g. The r and θ parameters for each of these lines are computed from the shortest-distance line segments from each of the lines to the origin, such as shortest-distance line segment 1960h connecting line 1960i to the origin 1960j. The r and θ values for each of the possible lines on which data point 1960b is located are then tabulated in table 1960k. The r and θ values for the lines on which data points 1960c and 1960d may reside are similarly tabulated in tables 1960l and 1960m. These tabulated values may be considered as votes by each data point for particular r/θ pairs. The r/θ parameter space can be considered to be a grid of rectilinear cells, each cell representing a small range of r and θ values. The cell receiving the most votes, indicated in FIG. 19I by asterisks next to the votes, such as asterisk 1960n, is selected as the r and θ value for the best line coincident with the positions of the data points. This line 1960o is shown plotted with respect to the data points in plot 1960p in the lower right-hand portion of FIG. 19I. As can be seen, the data points lie very close to this line. Thus, the Hough Transform can be described as a parameter-voting method by which data points vote for cells within a parameter space to which they may correspond, and cells with the greatest number of votes are selected as candidate sets of parameter values for a mathematical model of the relative position of the data points. The Hough-Transform technique is generally applicable to selecting mathematical models with an arbitrary number of parameters.

Figure 19J:
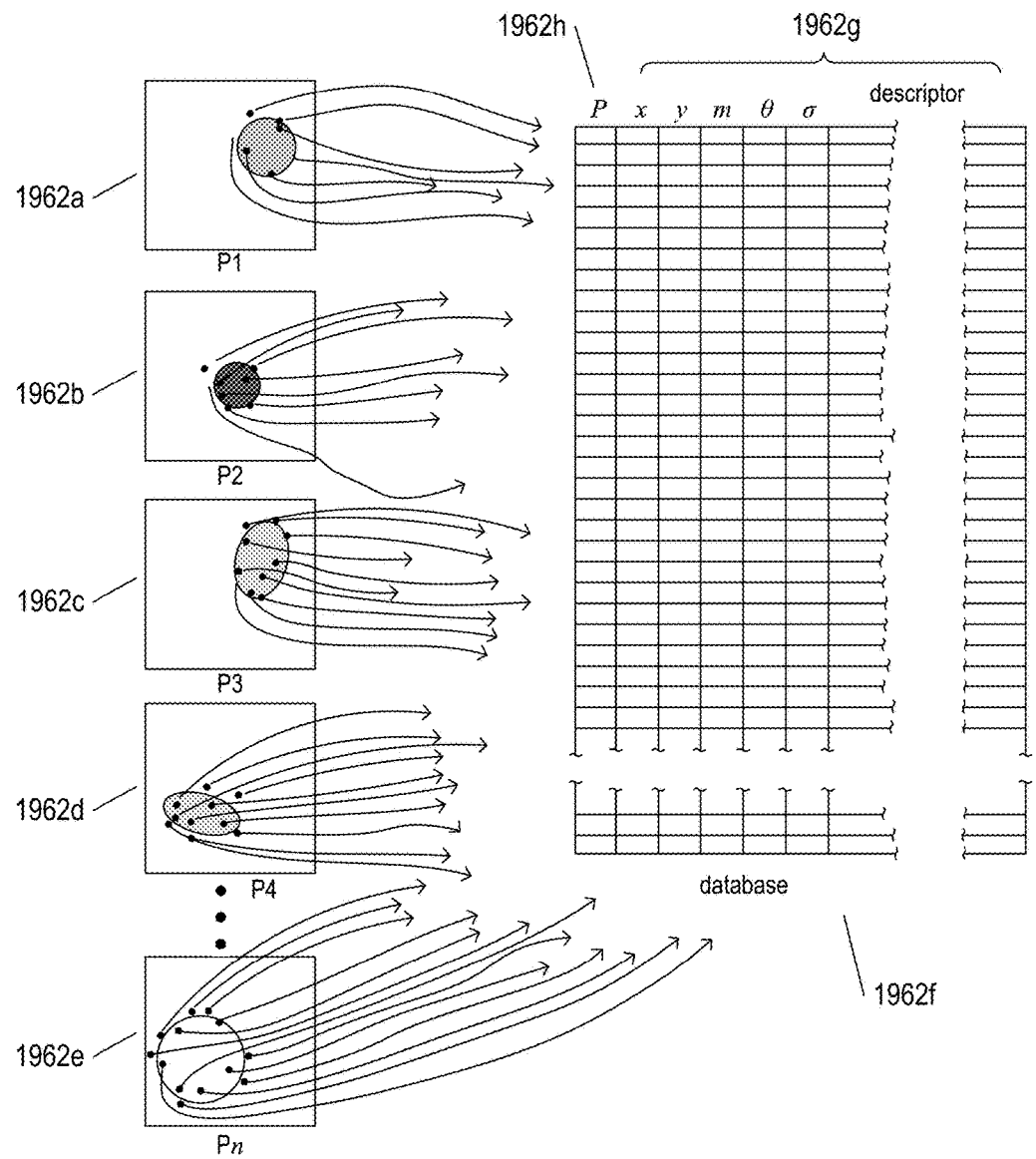
FIG. 19J illustrates use of SIFT points to recognize objects in images.
Figure 19K:
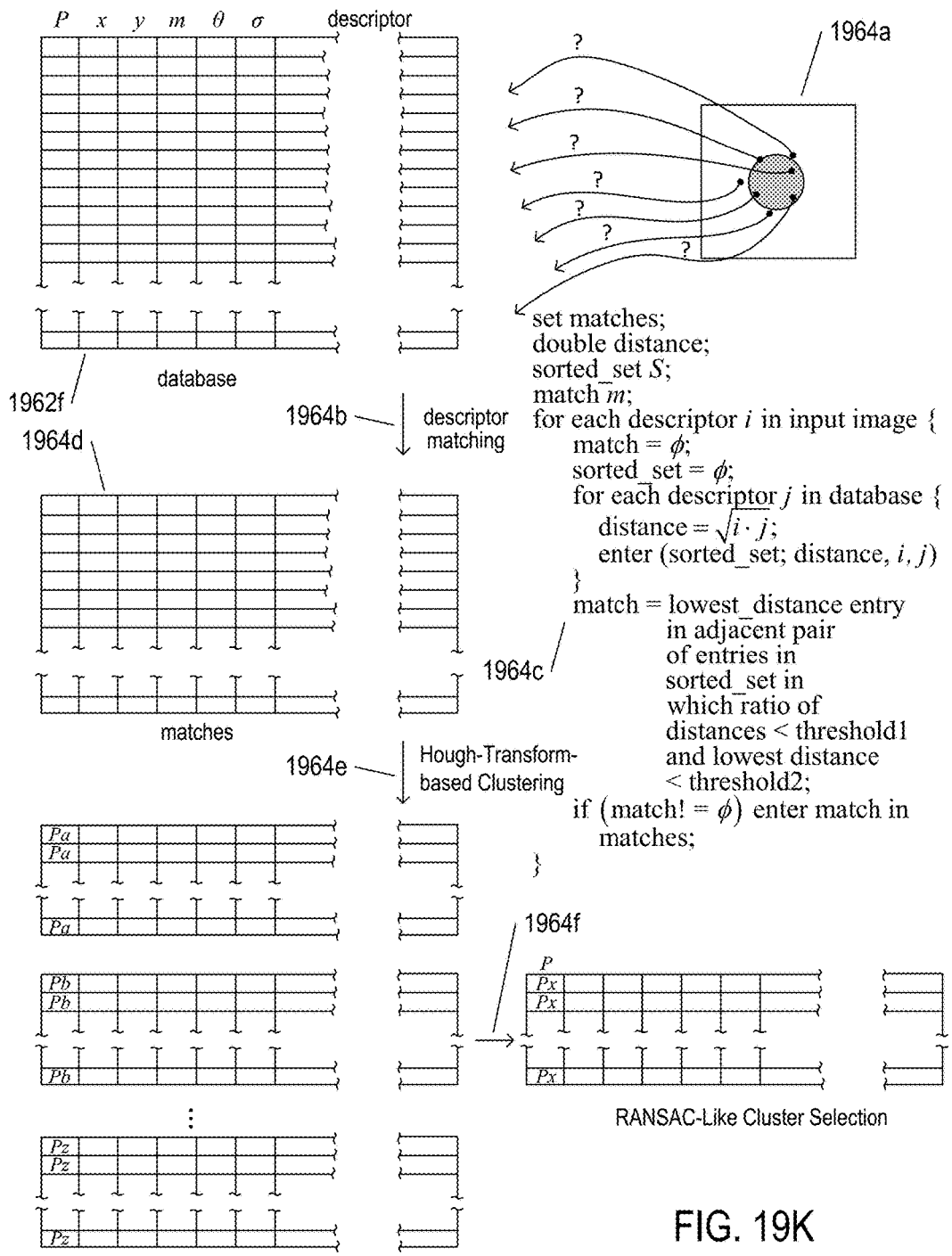
FIG. 19K illustrates use of SIFT points to recognize objects in images.

FIGS. 19J-K illustrate use of SIFT points to recognize objects in images. As shown in FIG. 19J, a number of different images that include a particular object, referred to as images "P1" to "Pn" 1962a-e, are acquired. In general, each of these different images 1962a-e are taken from different angles and positions with respect to the object in order to capture various different ways that the object may appear in a two-dimensional image. A set of SIFT features, or keypoints, are determined for each image and placed into a database of SIFT keypoints 1962f Note that each feature or keypoint is characterized by the above-discussed SIFT feature attributes 1962g as well as an attribute 1962h corresponding to the particular image, or pose, from which the feature was extracted. Note that, in addition, the features or keypoints are selected for lying within or close to the particular object that is to be characterized in subsequent, input images.

FIG. 19K illustrates how an object may be identified within an input image. In FIG. 19K, the input image, containing a subimage of the object 1964a is shown in the top right-hand corner of the figure. The database of SIFT features 1962f is again represented in FIG. 19K in the top left-hand corner. In a first step, SIFT features are extracted from input image 1964a and matched to SIFT features in the database, as represented in FIG. 19K by labeled arrow 1964b and pseudocode 1964c. This produces a set of matches 1964d in which successive pairs of adjacent rows represent an extracted SIFT feature from the input image and the corresponding SIFT feature from the database. The matching, as indicated in pseudocode 1964c, is based on a matching of the 128-element descriptors of the extracted SIFT features with the descriptors of the database-resident SIFT features. This is carried out using a nearest-neighbor method that finds the database SIFT feature with a descriptor closest, in high-dimensional distance, to the descriptor of a considered SIFT point extracted from the input image. However, in order to avoid spurious matching, a match occurs only when the ratio of distances for the best-matching descriptor and the next-best-matching descriptor is lower than a first threshold and the lowest distance is lower than a second threshold.

In a next step, represented by vertical arrow 1964e, Hough-Transform-based clustering is carried out in order to cluster the matches by pose. Each match of an input-image feature to a database feature can be considered to be a vote for a particular x,y translation, scale, and orientation angle. Clusters of a maxima in the four-dimensional Hough space correspond to the most probable object poses. Then, a RANSAC-like selection technique, represented by horizontal arrow 1964f, is employed to select the most likely pose for the object from the clusters produced by Hough-Transform-based clustering. The features in the selected cluster can then be used to identify the location of the object in the input image.

The Methods and Subsystems to which the Current Document is Directed

Figure 20A:
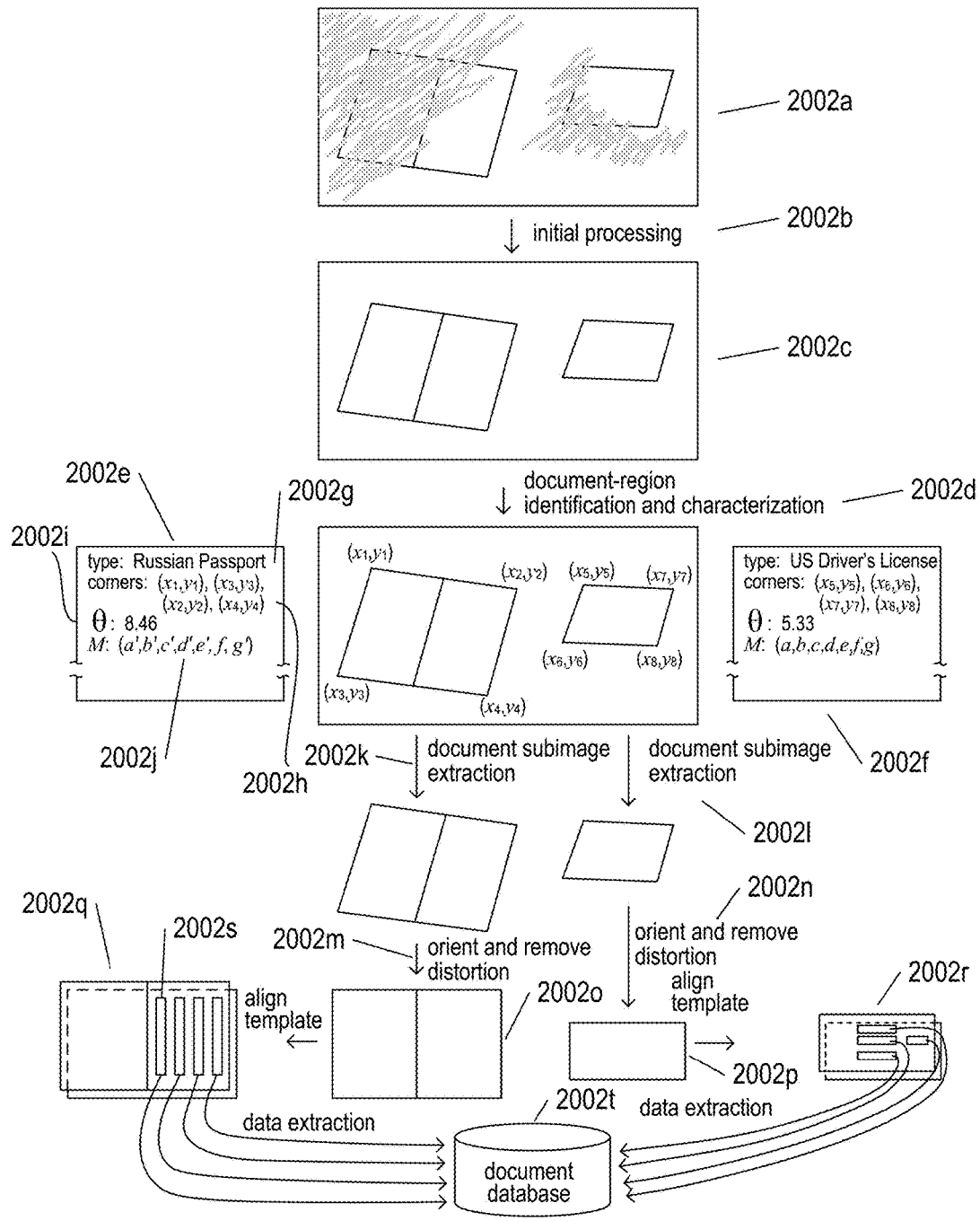
FIG. 20A provides an overview of the methods and systems to which the current document is directed as well as a detailed description of document-model creation according to the currently disclosed methods and systems.
Figure 20B:
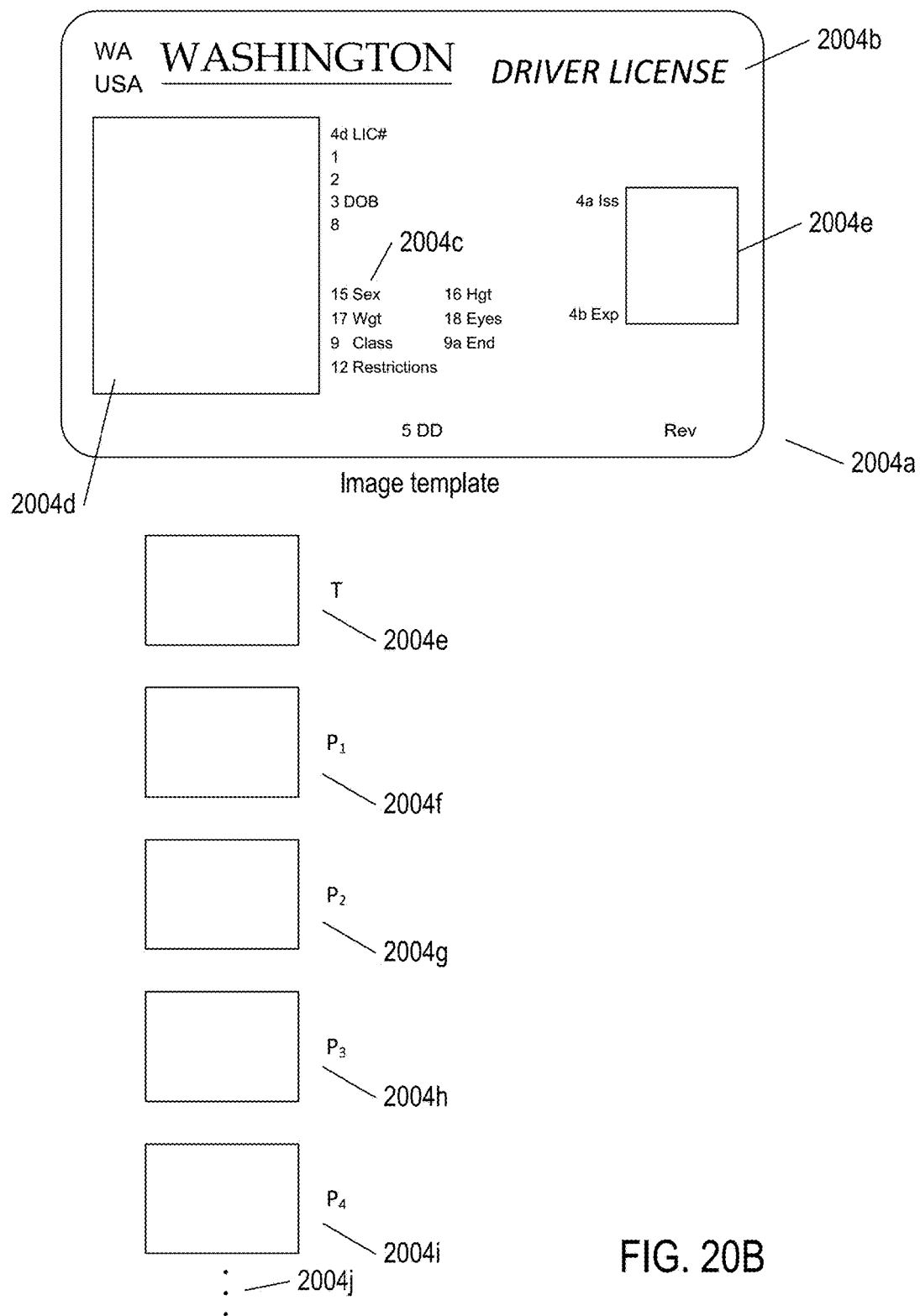
FIG. 20B provides an overview of the methods and systems to which the current document is directed as well as a detailed description of document-model creation according to the currently disclosed methods and systems.
Figure 20C:
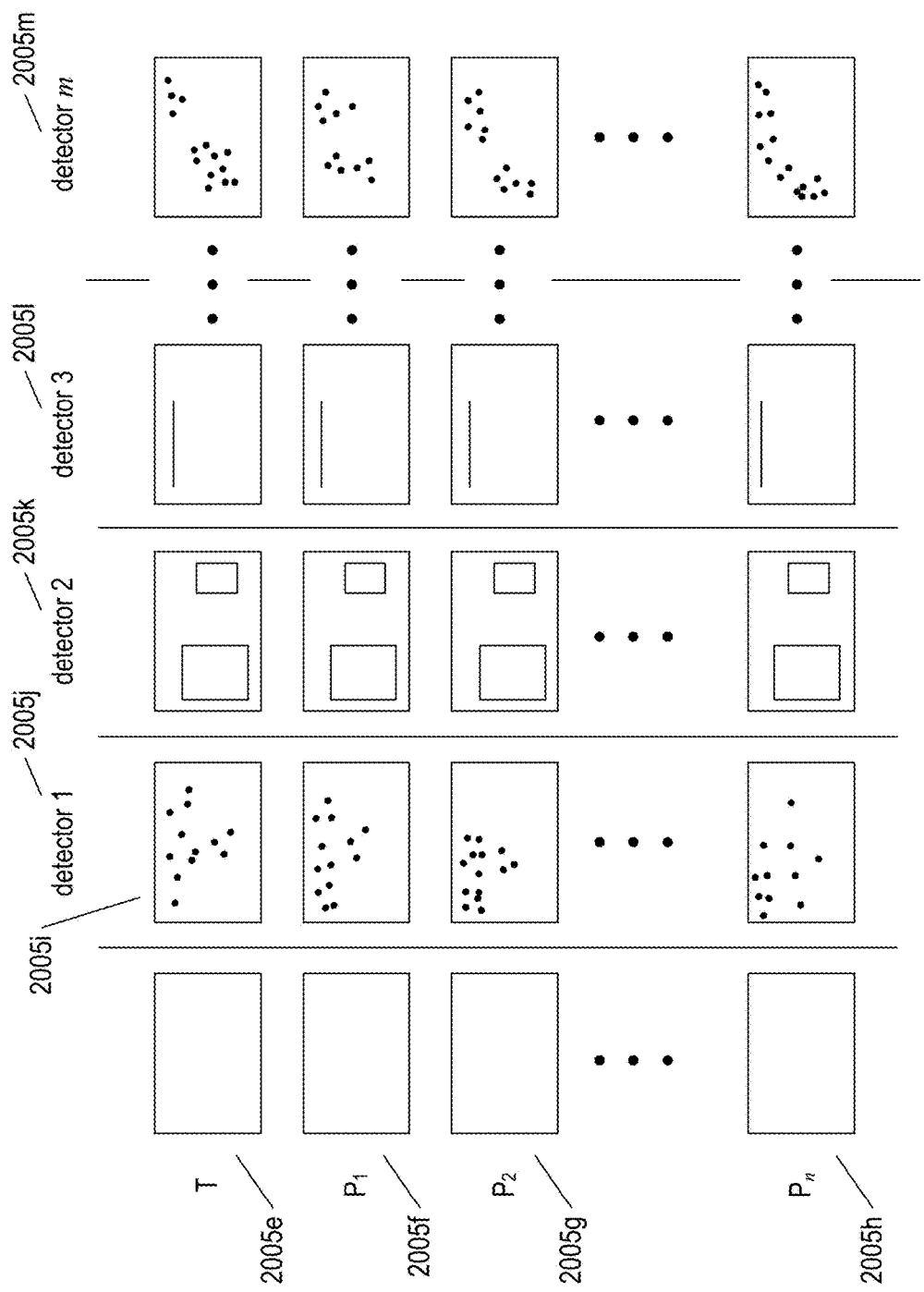
FIG. 20C provides an overview of the methods and systems to which the current document is directed as well as a detailed description of document-model creation according to the currently disclosed methods and systems.
Figure 20D:
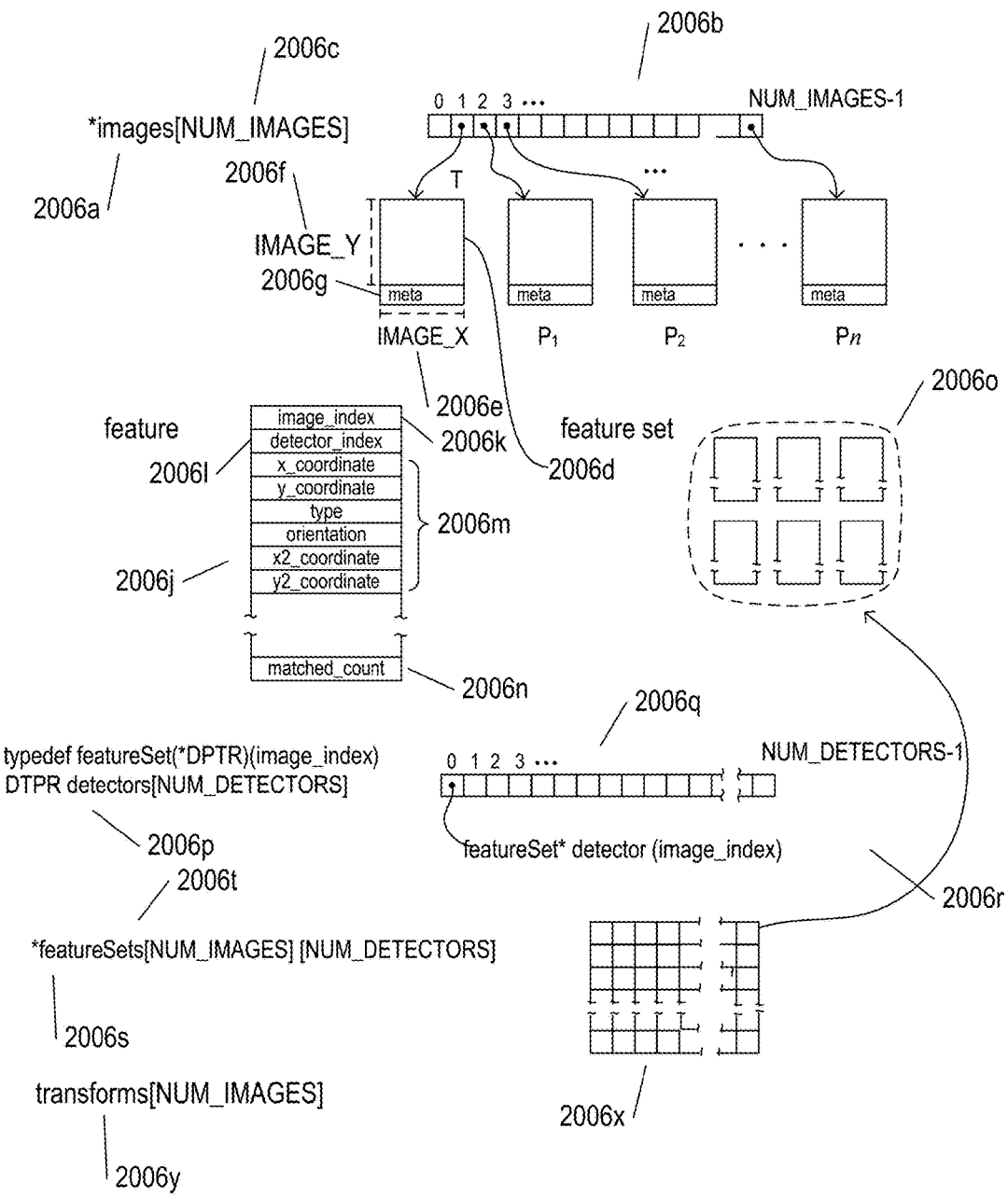
FIG. 20D provides an overview of the methods and systems to which the current document is directed as well as a detailed description of document-model creation according to the currently disclosed methods and systems.
Figure 20E:
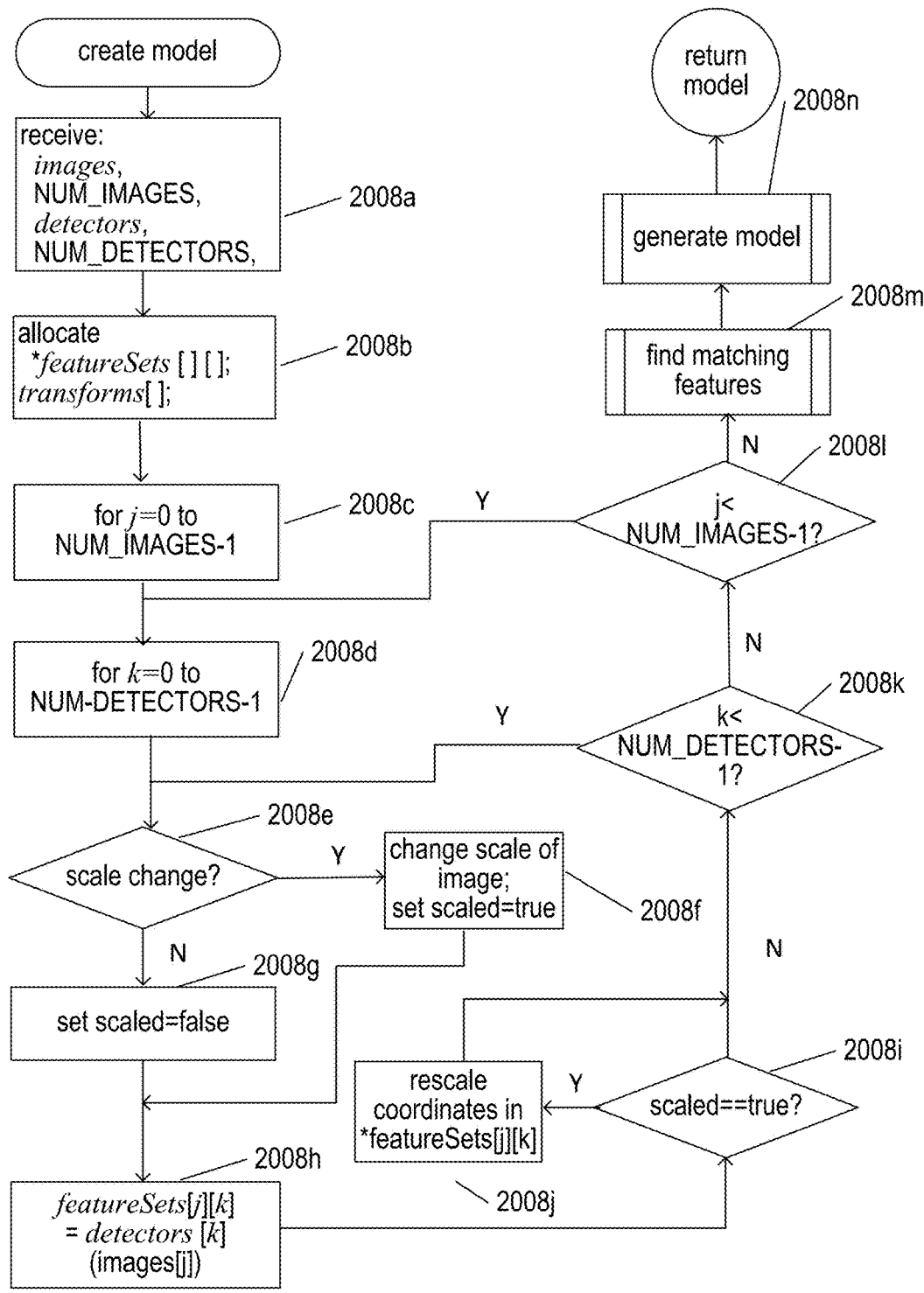
FIG. 20E provides an overview of the methods and systems to which the current document is directed as well as a detailed description of document-model creation according to the currently disclosed methods and systems.
Figure 20F:
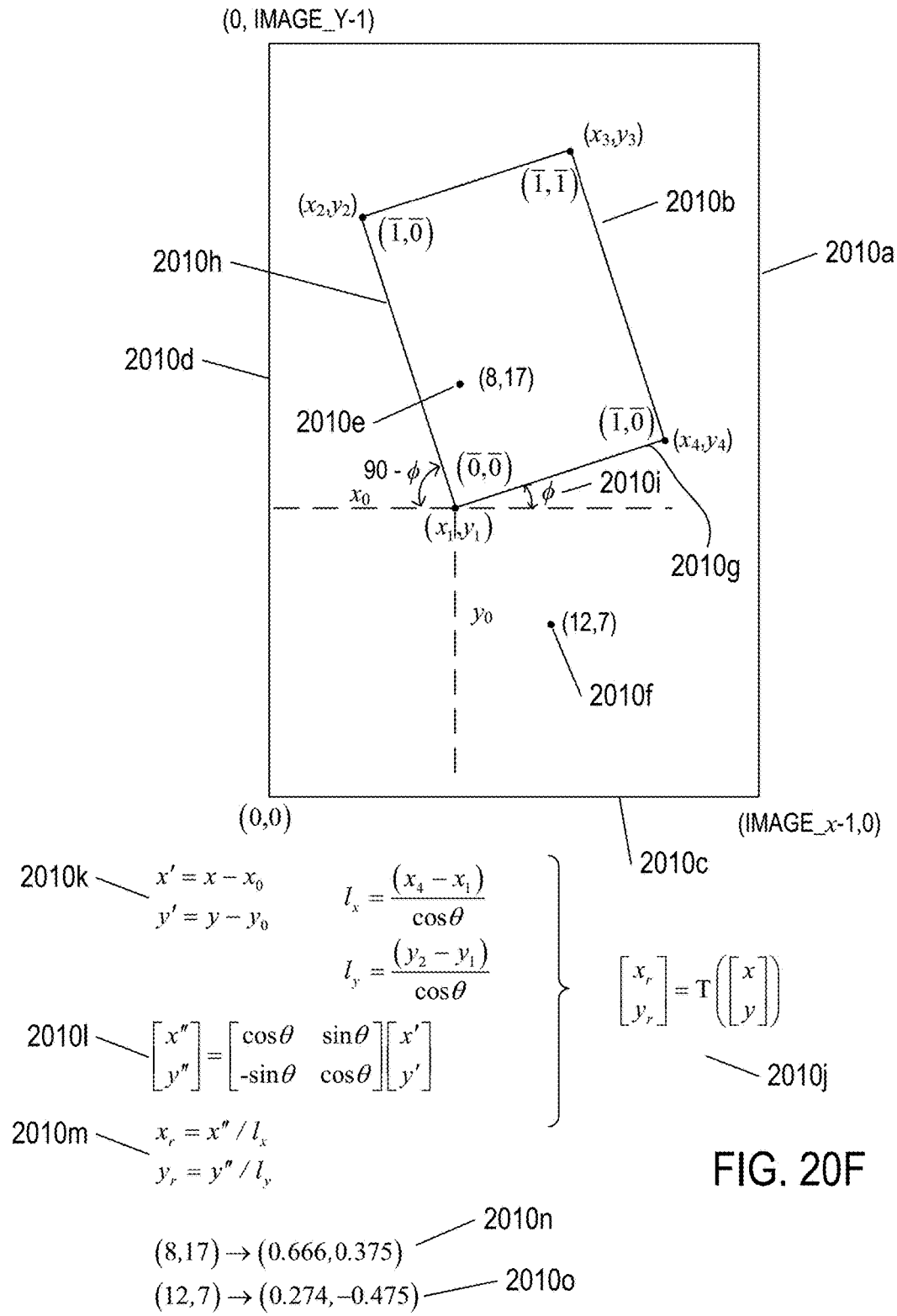
FIG. 20F provides an overview of the methods and systems to which the current document is directed as well as a detailed description of document-model creation according to the currently disclosed methods and systems.
Figure 20H:
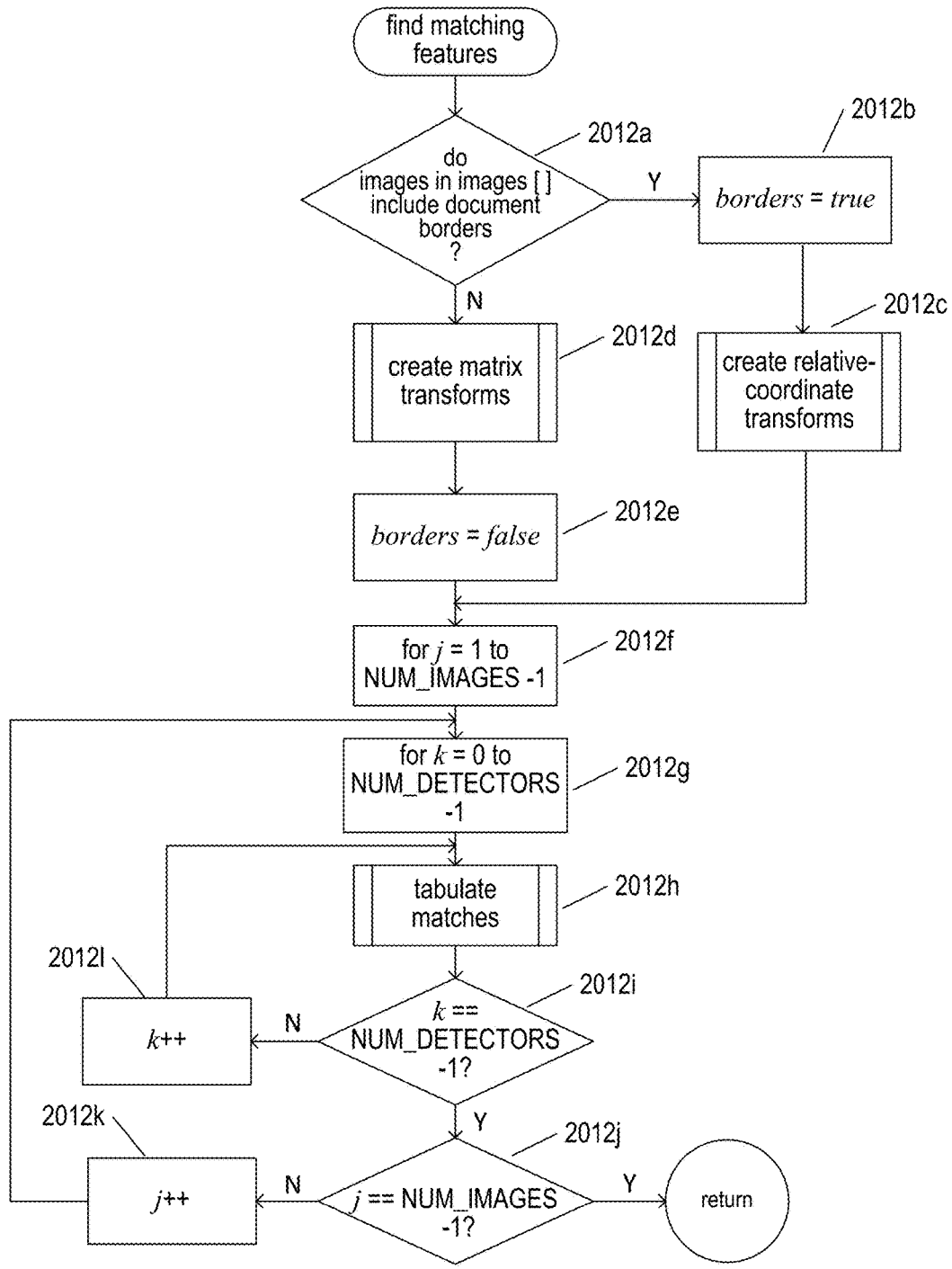
FIG. 20H provides an overview of the methods and systems to which the current document is directed as well as a detailed description of document-model creation according to the currently disclosed methods and systems.
Figure 20I:
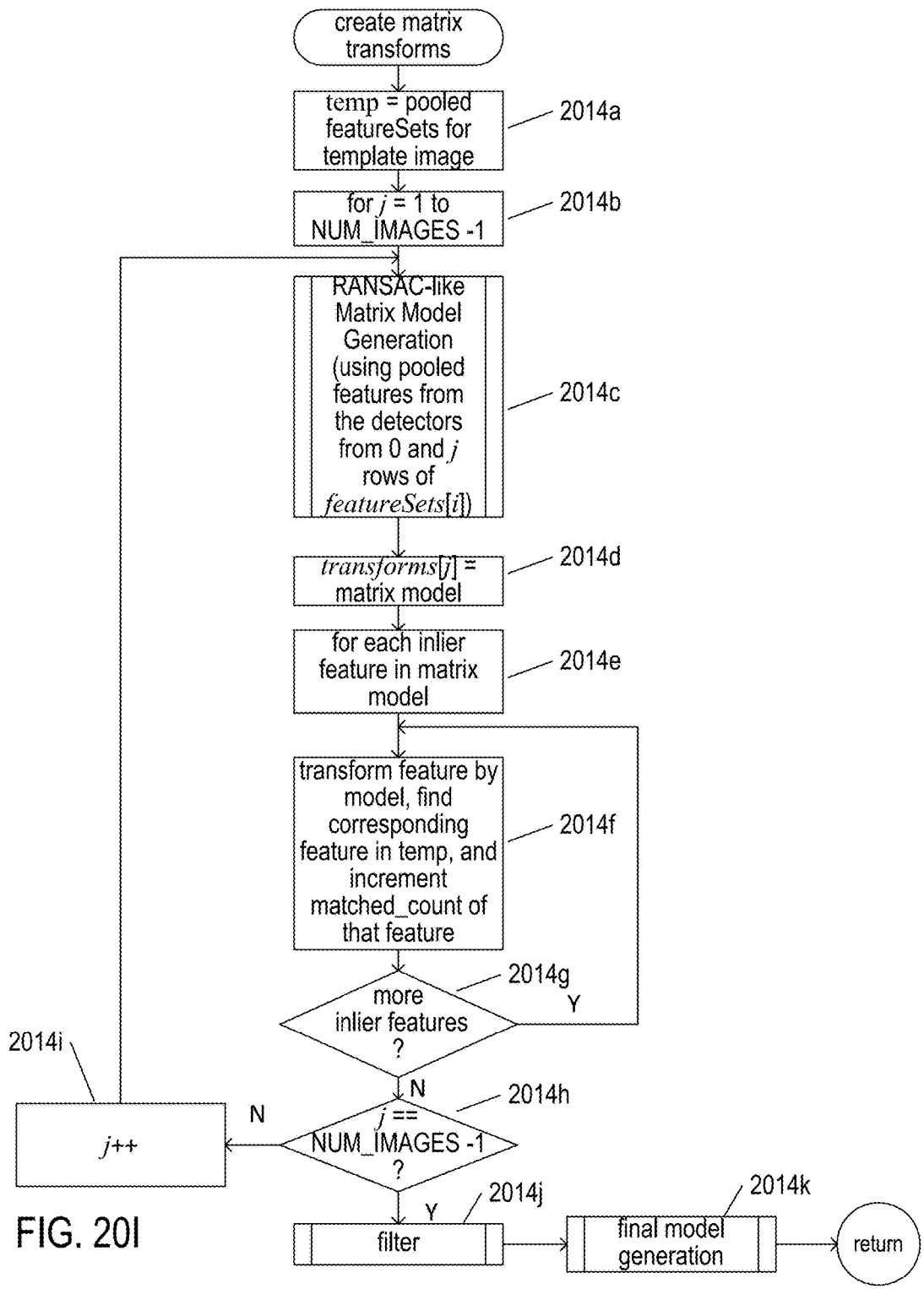
FIG. 20I provides an overview of the methods and systems to which the current document is directed as well as a detailed description of document-model creation according to the currently disclosed methods and systems.
Figure 20J:
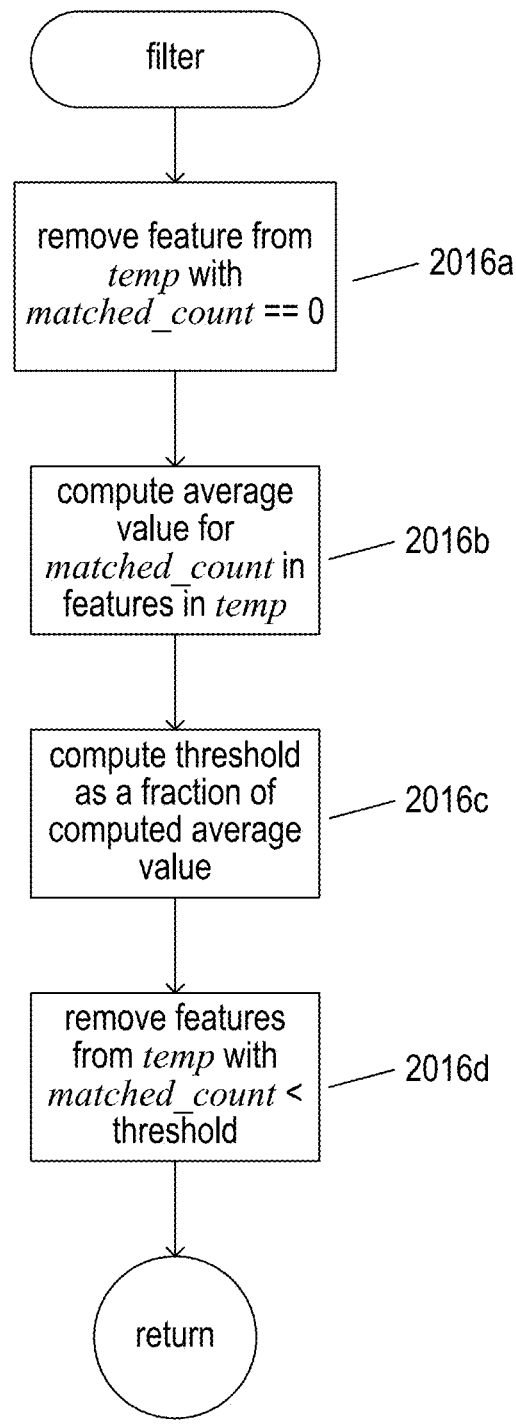
FIG. 20J provides an overview of the methods and systems to which the current document is directed as well as a detailed description of document-model creation according to the currently disclosed methods and systems.
Figure 20K:
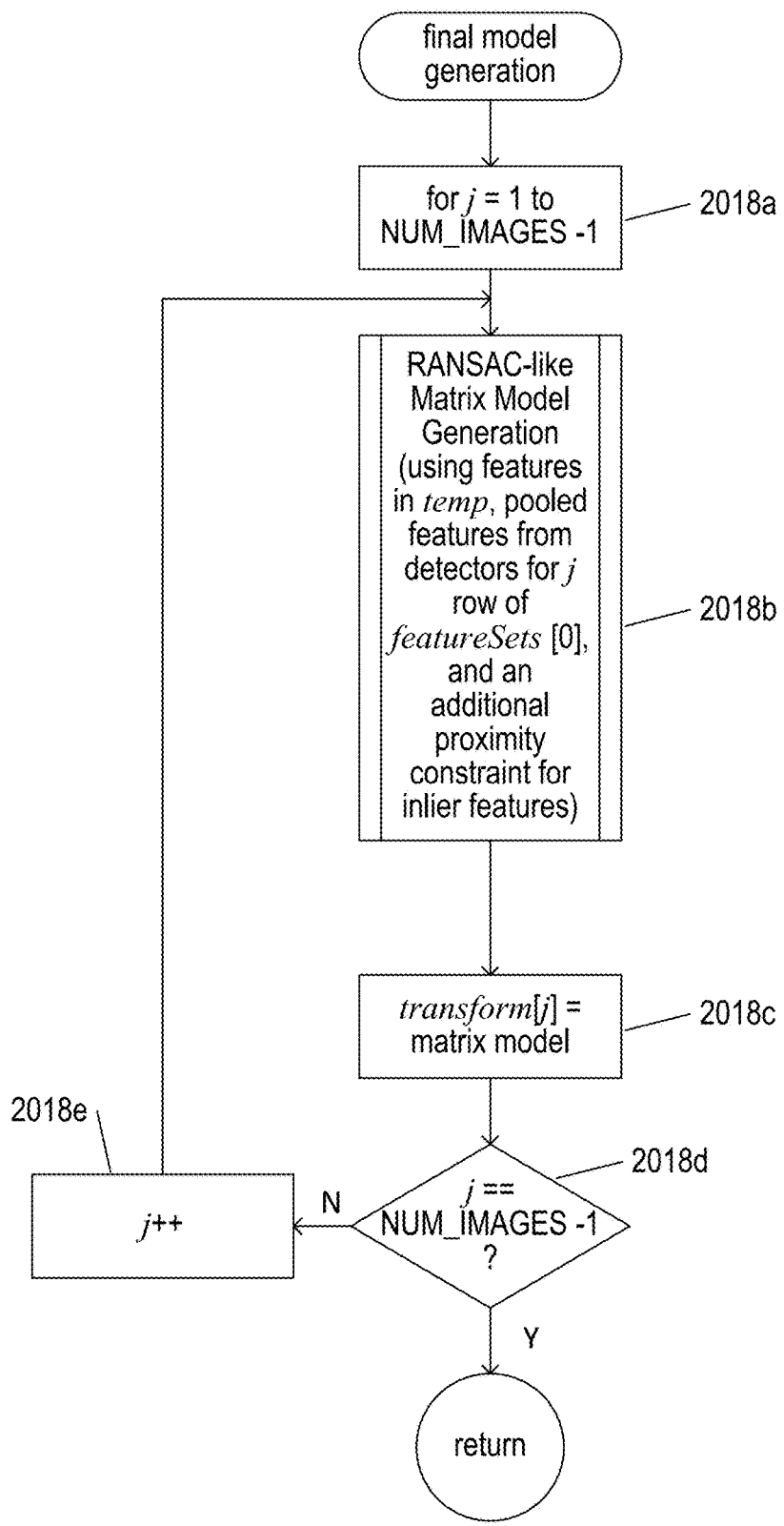
FIG. 20K provides an overview of the methods and systems to which the current document is directed as well as a detailed description of document-model creation according to the currently disclosed methods and systems.
Figure 20L:
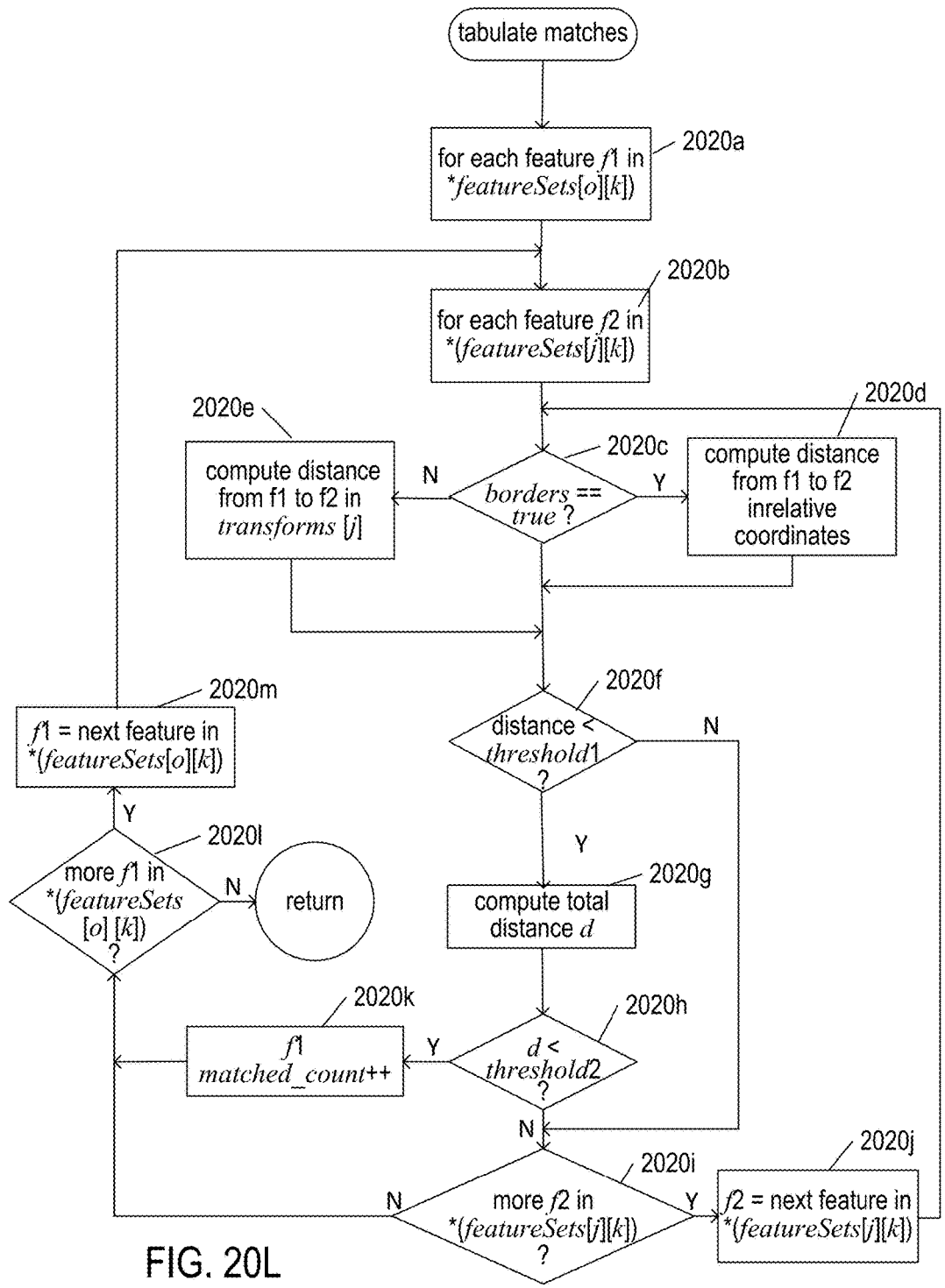
FIG. 20L provides an overview of the methods and systems to which the current document is directed as well as a detailed description of document-model creation according to the currently disclosed methods and systems.
Figure 20M:
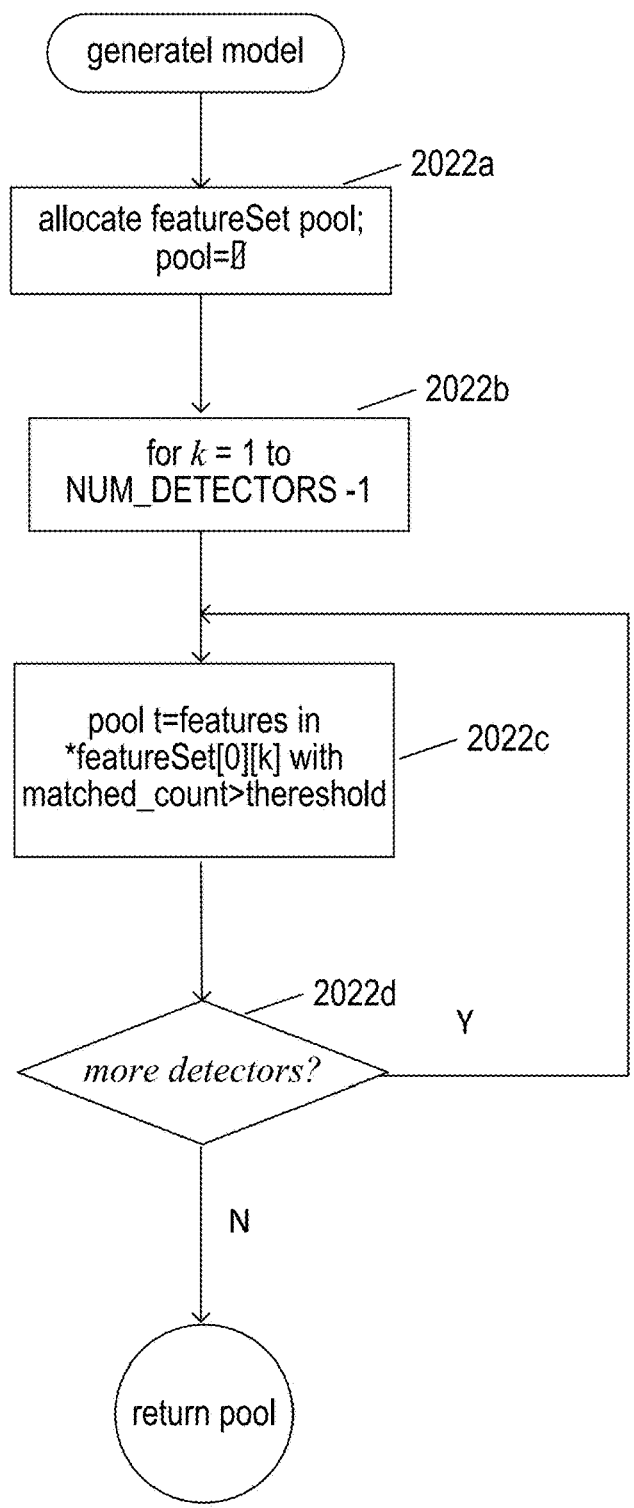
FIG. 20M provides an overview of the methods and systems to which the current document is directed as well as a detailed description of document-model creation according to the currently disclosed methods and systems.
Figure 20N:
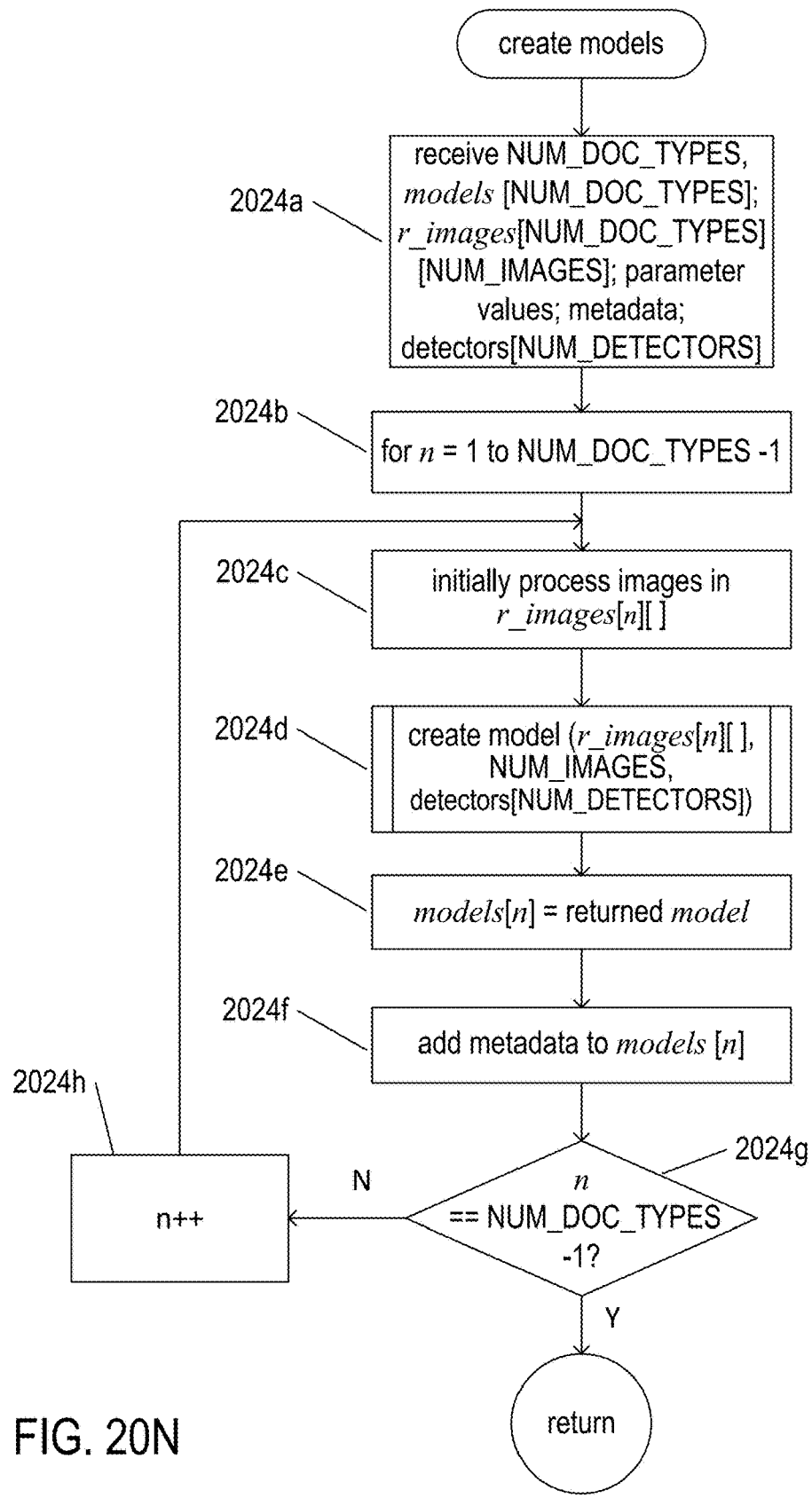
FIG. 20N provides an overview of the methods and systems to which the current document is directed as well as a detailed description of document-model creation according to the currently disclosed methods and systems.

FIGS. 20A-N provide an overview of the methods and systems to which the current document is directed as well as a detailed description of document-model creation according to the currently disclosed methods and systems. As discussed above with reference to FIGS. 9A-10J, the current document is directed to methods and systems for processing images of various types of well-defined documents, certificates, and other information-containing forms that can be characterized by templates. Because of various types of distortions introduced during the imaging process, however, extraction of data from such document images can be a difficult task.

FIG. 20A provides an overview of the currently disclosed methods and systems for identifying document subimages in digital images, determining document-subimage boundaries, identifying the type of document corresponding to the document subimages, and realigning, reorienting, and rescaling the document subimages, as necessary, in order to extract textually encoded data from the document subimages. An image 2002a input to the currently disclosed methods and systems is initially processed 2002b to produce a processed input image 2002c. Initial processing may involve rescaling the input image to normalize the scale of the input image with respect to a scale at which data collected from previously processed images can be best used to identify document subimages within the input image. Initial processing may include adjustment of contrast, generating grayscale or binary images needed by certain types of feature detectors, and other such initial processing steps. Next, one or more feature detectors are applied to the processed input image and a variety of recognition and modeling processes are carried out using detected features 2002$d$ in order to obtain characterizations 2002$e$ and 2002$f$ of each discrete document subimage within a processed input image. These characterizations generally include an indication of the type of document represented by the document subimage 2002$g$, the coordinates for the corners or other prominent points of the document subimage 2002$h$, an indication of the rotational orientation of the document subimage with respect to the processed input image 2002$i$, and a transform or mathematical model 2002$j$ that can be applied to pixels in the document subimage to reorient the subimage and correct for perspective and other distortions so that textually encoded information can be extracted from the document subimage. Using the document subimage characterizations 2002$e$ and 2002$f$, the document subimages are extracted from the process input image 2002$k$ and 2002$l$ and then reoriented and processed to remove distortion 2002$m$ and 2002$n$, resulting in isolation of processed document subimages 2002$o$ and 2002$p$ that appear as if captured from an image-capture device positioned to record images of the documents free of perspective distortion, other types of distortion, and with a scale corresponding to an expected scale. This allows a template for the document type to be aligned with the subimages mathematically to identify particular information windows, such as information window 2002$s$ within a document subimage that contain a particular type of textually encoded information. Extraction of the textually encoded information through these information windows is greatly facilitated and leads to compilation of the desired information encoded within a document subimage in a document database 2002$t$ or, alternatively, in a record-like display or encoding that is displayed through a display interface or input through an API to information-receiving applications.

FIG. 20B illustrates initial image information that is used to create a model for a particular type of document. A canonical document image template 2004$a$ is an image of a document of a particular type from which document-specific information and detail has been removed. For example, the image template 2004$a$ can be compared with the image of an actual driver's license shown in FIG. 9A to appreciate the types of information retained in the image template and the types of information removed. The image template 2004$a$ contains only that information that would appear identically in images of various documents of the document type. For example, all Washington-state driver's licenses contain the identical banner information 2004$b$ at the top of the driver's license, various numbered information fields, such as the numbered information field "15 Sex" 2004$c$, and rectilinear regions 2004$d$ and 2004$e$ that contain images of a human face. The template image 2004$a$ is an image having a standard scale and free of perspective and other distortions. In addition to the image template, many other images, or poses, of the common information of the document are also captured and stored. In FIG. 20B, the image template and various additional poses are represented by rectangles 2004$e$-$i$, with ellipses 2004$j$ representing additional poses of the document template. As discussed above with reference to FIG. 19J, each different additional image, or pose, is captured with different relative orientation of the imaging device and document.

FIG. 20C illustrates the initial data collected from the template image and additional poses that is used to create a model for the image template and, in essence, for the common information for a document of a particular type. In FIG. 20C, the template image 2005$e$ and additional poses 2005$f$, 2005$g$, and 2005$h$ are again shown as a column of rectangles. Additional columns in FIG. 20C each correspond to a different type of feature detector 2005$j$-2005$m$. Thus, FIG. 20C shows a matrix or table with rows corresponding to the template image or additional poses of the template image and columns corresponding to feature detectors. Each cell in the matrix, such as cell 2005$i$ represents the features extracted by the detector corresponding to the column in which the cell is located for the image represented by the row in which the cell is located. The raw data for model creation is thus all of the features extracted by all of the different detectors from all of the different document-template images. Certain of the detectors may extract features similar to the above-described SIFT keypoints or features while other detectors may detect images of faces, lines or other geometrical shapes, or other types of features.

FIG. 20D illustrates certain of the data structures that contain the raw information for model creation, discussed above with reference to FIGS. 20B-C, and other derived information. These data structures are used in subsequent control-flow diagrams that illustrate the model-creation process. The first data structure, an array "images" 2006$a$, is an array of references 2006$b$ to the template image and additional poses. The number of images is represented by the constant "NUM_IMAGES" 2006$c$. Each image includes the pixels of a digital image 2006$d$ in a matrix of pixels of dimension IMAGE_X 2006$e$ and IMAGE_Y 2006$f$ In addition, the image includes metadata 2006$g$ for the digital image, which may include indications of the color model, pixel encodings, document type, and other such information.

A feature data structure 2006$j$ includes various information fields, the values of which characterize a particular feature extracted from one of the images referenced from the array "images." These fields may include an image index field 2006$k$ that includes a numerical index of the image from which the feature was extracted, a detector_index field 2006$l$ that includes the index of the detector which extracted the feature, various characteristics of the feature 2006$m$, such as the x,y coordinates, feature type, orientation, and additional coordinates for various non-point feature types, and a field 2006$n$ that is a count or accumulator field used during model creation, as discussed below. A featureSet data structure 2006$o$ is a set or collection of feature data structures. The array "detectors" 2006$p$ is an array of references 2006$q$ to various different feature detectors 2006$r$, in FIG. 20D represented by a function call that receives a reference to an image index and that returns a reference to a featureSet data structure containing all the features extracted by the detector from the input image. The two-dimensional array "featureSets" 2006$s$ is a two-dimensional array 2006$x$ of references to featureSet data structures, corresponding to the matrix discussed above with reference to FIG. 20C. The two-dimensional array "featureSets" is indexed by image and detector. Finally, the array "transforms" 2006$y$ contains a mathematical model, or matrix transform, for each pose image.

FIG. 20E provides a first, highest-level control-flow diagram for the create-model technique used to create mathematical models of documents that are used in the document-region-identification-and-characterization step (2002d in FIG. 20A) to identify and characterize document subimages within an input image. In step 2008a, the create-model method receives the images and detectors array, discussed above with reference to FIG. 20D, as well as the associated constants NUM_IMAGES and NUM_DETECTORS. Note that, for convenience, the number of images and the number of detectors are encoded as constants in the described implementation, for convenience, but may alternatively be stored in variables that are passed as arguments. In step 2008b, the create-model method allocates space for the two-dimensional array featureSets and allocates space for the transforms array discussed above with reference to FIG. 20D. Then, in the nested for-loops of steps 2008c-2008l, the create-model process creates featureSet data structures containing extracted features to populate each cell of the two-dimensional array featureSets, discussed above with reference to FIG. 20D. Each cell in the two-dimensional array featureSets represents the features extracted from a particular document image j, either the template image or a pose image, by a particular feature detector k. In step 2008e, the routine "scale change" determines whether a scale adjustment is needed for the currently considered image in order to optimize extraction of features by detector k. When a scale adjustment is needed, the image is rescaled in step 2008f and the variable scaled is set to true. Otherwise, the variable scaled is set to false, in step 2008g. The currently considered detector k is called, in step 2008h, to generate a next featureSet data structure including features extracted by the currently considered detector k of currently considered image j. When the variable scaled has the value true, as determined in step 2008i, the extracted features are rescaled, in step 2008j. In step 2008m, a call is made to the routine "find matching features," which accumulates counts of the template-image features extracted by each detector for which corresponding extracted features are found in the sets of features extracted by the same detectors in additional pose images. Finally, a call is made to the routine "generate model," in step 2008n, to generate a model for the document imaged in the input images.

In the process of model creation, transforms are used to express a correspondence between features extracted from a pose image and corresponding features extracted from a template image. In the currently disclosed methods and systems, two different types of transforms are used. When the template image and pose images have been manually annotated to include indications of the borders of document subimages, a simple relative-coordinate transformation can be used to match coordinates of features extracted from pose images to features extracted from the template image. When border annotations are not present in the template image and pose images, then a more general matrix model transform discussed above with reference to FIGS. 11A-F, is computed.

FIG. 20F shows a relative-coordinate transform that transforms image coordinates to document-relative coordinates. The outer rectangle 2010a in FIG. 20F corresponds to a template image or pose image. The inner rectangle 2010b represents a document subimage within the image. The image x,y coordinates are based on a Cartesian coordinate system with the x coordinate coincident with the lower edge 2010c of the image and they coordinate coincident with the right-hand vertical edge of the image 2010d. Two points 2010e and 2010f within the image are shown together with their image coordinates. The transform illustrated in FIG. 20F is used to transform these image coordinates for the points into document-relative coordinates. The document-relative coordinates are coordinates with respect to a document x coordinate axis corresponding to the lower edge 2010g of the document subimage and y coordinate axis coincident with the left-hand vertical edge 2010h of the document subimage. Note that the document is rotated by an angle φ 2010i with respect to the image 2010a. In the document-relative coordinates, the length of the lower edge of the document subimage is assigned the value "1" and the length of the vertical edge of the document subimage is also assigned a length "1." Thus, document-relative coordinates are generally fractions of lengths of the document subimage edges. The transformation 2010j transforms image x,y coordinates to document-relative $x_r$, $y_r$ coordinates. This involves moving the image coordinate system origin to coincide with the left lower corner of the document subimage 2010k, rotating the translated coordinate axes by the angle θ 2010l in a clockwise direction, and then computing the document-relative coordinates 2010m. The document-relative coordinates for the two points 2010e and 2010f are shown in expressions 2010n and 2010o. FIG. 20G shows a different document-relative transform when the document subimage is trapezoidal, rather than rectangular.

FIG. 20H shows a control-flow diagram for the routine "find matching features" invoked in step 2008m in FIG. 20E. In step 2012a, the routine determines, from the metadata associated with the input images, whether the images include annotated borders. If so, then the variable borders is set to the value true, in step 2012b, and a routine is called to generate relative-coordinate transforms for the pose images, as discussed above with reference to FIGS. 20F-G. Otherwise, the routine "create matrix transforms" is called in step 2012d to create matrix models for the transforms of image coordinates to document subimage transforms and, in step 2012e, the variable borders is set to false. In the nested for-loops of steps 2012f-2012l, matches between features extracted from pose images and features extracted from the template image are tabulated for each cell in the two-dimensional array featureSets via a call to the routine "tabulate matches," in step 2012h.

FIGS. 20I-K illustrate the logic for the routine "create matrix transforms," called in step 2012d in FIG. 20H. FIG. 20I is a control-flow diagram for the routine "create matrix transforms." In step 2014a, the local variable temp is set to reference a featureSet data structure that is initialized to include to the features extracted by the detectors from the template image. Then, in the outer for-loop of steps 2014b-2014i, each pose image is considered. For the currently considered pose image, in step 2014c, a RANSAC-like matrix-model generation method is used to determine a transform matrix that best expresses the relationship between the locations of features in the pose image and the locations of corresponding features in the template image. The matrix model is placed in the "transforms" array in step 2014d at the index j for the currently considered pose image. Then, in the inner for-loop of steps 2014e-2014g, each inlier feature for the pose-image features is transformed by the matrix model to a corresponding feature of a template image and the matched_count field in the feature data structure for the template-image feature is incremented to indicate finding a match in the currently considered pose image for the feature of the template image. Following completion of the outer for-loop of steps 2014b-2014i, the template features are filtered, via a call to the routine "filter" in step 2014j, and a final transform or model for the correspondence between the pose images and the template image are generated by a call to "final model generation" in step 2014k.

FIG. 20J shows a control-flow diagram for the routine "filter," called in step 2014j of FIG. 20I. In step 2016a, the routine removes features from the feature sets referenced by the local variable temp with matched-count values equal to 0. In other words, those template-image features that were not matched in any pose image are removed. In step 2016b, the average value of the matched-count fields in the remaining features is computed. In step 2016c, a threshold value is computed as a fraction of the average value computed in step 2016b. Finally, in step 2016d, those features remaining in the feature sets referenced by the local variable temp with matched_count values less than the computed threshold value are removed. Thus, filtering removes all but the best, most frequently matched features of the input image.

FIG. 20K provides a control-flow diagram for the routine "final model generation" called in step 2014k in FIG. 20I. In the for-loop of steps 2018a-2018e, another RANSAC-like matrix model generation process is called, in step 2018b, for each pose image in order to compute the transform between pose-image coordinates and template-image coordinates. This second RANSAC-like matrix model generation employs a proximity constraint both for selection of the initial randomly selected feature pairs as well as selecting the additional inlier feature pairs during model refinement. Initial model features are required to be spatially separated from one another by at least a threshold distance and the added inlier feature pairs must also be spatially separated from the nearest inlier or model feature by at least a threshold distance. This generates a generally more compact and robust transform.

FIG. 20L provides a control-flow diagram for the routine "tabulate matches," called in step 2012h of FIG. 20H. In the outer for-loop of steps 2020a-2020m, each feature in the featureSet generated for the template image by the detector k is considered. In the inner for-loop of steps 2020b-2020j, each feature extracted from pose image j by detector k is considered. When the local variable borders is true, as determined in step 2020c, the distance from the currently considered features f1 and f2 is computed based using the relative-coordinates transformation for pose image j, in step 2020d. Otherwise, the distance from f1 to f2 is computed using the matrix transform for pose image j, in step 2020e. When the computed distance between the two features is less than a first threshold, as determined in step 2020f, a total distance between the features that includes any detector-specific characteristics in addition to the positional coordinates is computed in step 2020g. When the total distance is less than a threshold value, as determined in step 2020h, then the two features are considered to be matching, as a result of which the value of the field matched_count in the feature data structure for feature f1 is incremented, in step 2020k. Control then flows to step 2020l to exit the inner for-loop, since a matching feature in the pose image for feature f1 has been found. Otherwise, when there are more features f2 for the currently considered pose image to consider, as determined in step 2020i, then the variable f2 is set to reference a next feature in the featureSet for pose image j and detector k, in step 2020j, and control flows back to step 2020c for another iteration of the inner for-loop. Once all pose features have been considered or a match has been found for the current feature f1, and when there are more features in the featureSet for the template image generated by detector k, as determined in step 2020l, the variable f1 is set to reference a next feature in the featureSet for the template image and detector k, in step 2020m, and control returns to step 2020b. When the outer for-loop terminates, the occurrence of matches between template-image features and pose-image-j features generated by detector k have been tabulated in the template-image feature data structures within the template-image featureSet data structure.

FIG. 20M provides a control-flow diagram for the routine "generate model," called in step 2008n of FIG. 20E. This routine shares the global variables of the calling routine. In step 2022a, a featureSet data structure pool is allocated and initialized to the empty set. In the for-loop of steps 2022b-2022d, the features extracted by each detector k from the template image with matched_count fields having values greater than a threshold value are added to the featureSet data structure pool. Upon termination of the for-loop of steps 2022b-2022d, a reference to the featureSet data structure pool is returned. These features are used, by the routine "create models," discussed below, to generate a model for the document type of the input images passed to the routine "create model," which, in turn, called the routine "generate model." Features in the model feature set include full feature characterizations as well as indications of the detectors that generated them.

FIG. 20N shows a control-flow diagram for a routine "create models" that creates a model for each different document type that is to be identified and characterized from input images. In step 2024a, the routine receives a reference to a models array in which to place generated models for the different document types and a two-dimensional array, r_images, of template and pose images for each of the different document types. Also, various parameter values, including various threshold values, and metadata needed by the routine "create model" are received in step 2024a as well as the array detectors. In the for-loop of steps 2024b-h, a model is created for each document type. In step 2024c, the images for the currently considered document type are initially processed for scale normalization, contrast adjustment, and other such types of initial processing. In step 2024d, the routine "create model" is called to create a feature set for the currently considered document type. In step 2024e, the returned feature set is entered into the model for the currently considered document type within the models array. In step 2024f, additional metadata associated with a document type is added to the model in the models array for the document type.

Figure 21A:
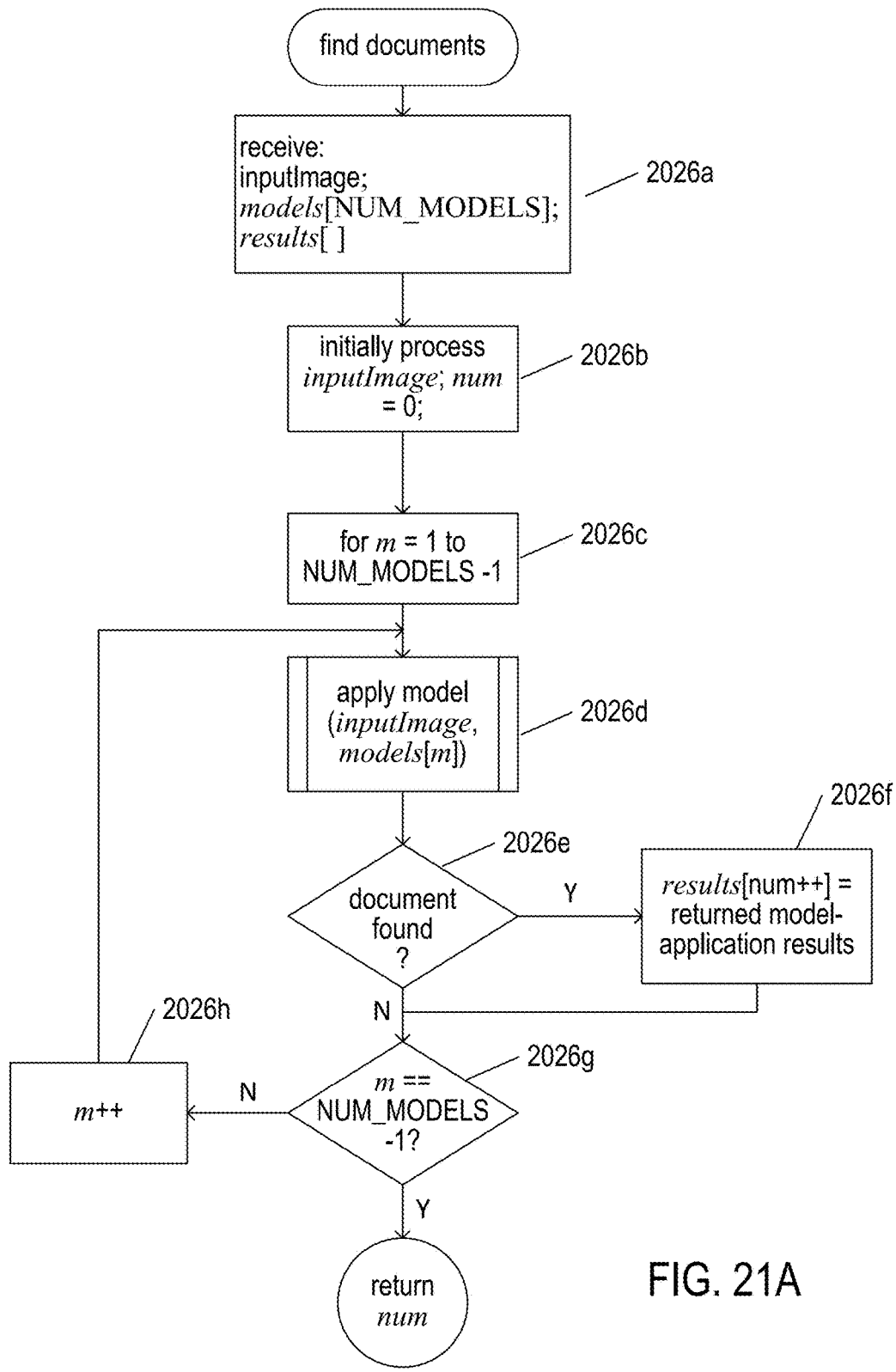
FIG. 21A provides control-diagrams for a routine "find documents" that identifies document subimages within an input image as previously discussed with reference to FIG. 20A.

FIGS. 21A-D provide control-diagrams for a routine "find documents" that identifies document subimages within an input image as previously discussed with reference to FIG. 20A. FIG. 21A provides a control-flow diagram for the routine "find documents." In step 2026a, the routine receives a reference to an input image, the set of models for the different document types in an array "models," and an array "results" in which characterizations of identified document subimages are placed as outputs from the routine "find documents." In step 2026b, the input image is initially processed. This may involve normalization by scaling, contrast adjustments, and other initial processing steps to place the input image in an appropriate state for feature extraction and document subimage recognition. The local variable num is set to 0, as well, in step 2026b. In the for-loop of steps 2026c-2026h, each model corresponding to a different type of document is applied to the input image, in step 2026d, in order to attempt to identify and characterize a subimage for a document of that type in the input image. When the routine "apply model," called in step 2026d, identifies a subimage for a document of the type corresponding to the applied model, as determined in 2026e, then the results returned by the routine "apply model" are entered into the "results" array in step 2026f. Otherwise, the for-loop either terminates, when there are no further models to apply, or a next iteration of the for-loop of steps 2026c-2026h is carried out following increment of the loop variable m in step 2026h. Thus, step 2002d in FIG. 20A, in which document subimages are identified and characterized, is carried out by repeated application of document-type models to the input image in the for-loop of steps 2026c-2026h.

Figure 21B:
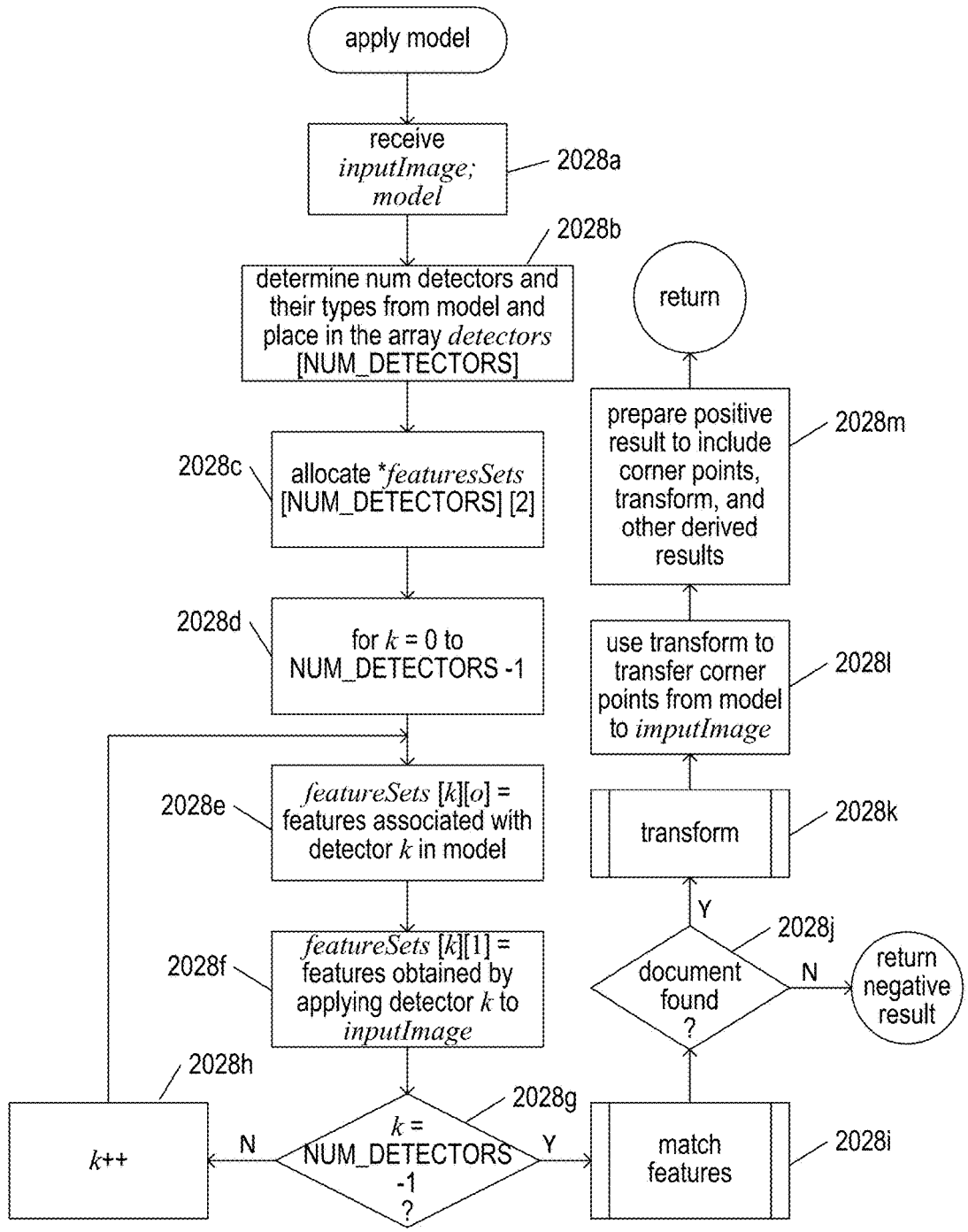
FIG. 21B provides control-diagrams for a routine "find documents" that identifies document subimages within an input image as previously discussed with reference to FIG. 20A.

FIG. 21B provides a control-flow diagram for the routine "apply model," called in step 2026d of FIG. 21A. In step 2028a, the routine "apply model" receives the input image and a document-type model to apply to the input image. In step 2028b, the routine "apply model" determines the number of detectors and their types from the model and places references to these detectors into the array "detectors." The detectors needed for the model are those detectors that detected features from the template image and additional pose images during model creation that are included in the final model for the document type. In step 2028c, the routine "apply model" allocates a two-dimensional array of featureSets, two featureSets per detector. The first of the two feature sets includes model features and the second of the two featureSets include features extracted from the input image by the detector associated with the two feature sets. The features may be extracted from the input image at this point or may have been previously extracted during application of another model. In other words, a detector need only be applied to a particular image once, with the extracted features used repeatedly for application of models to the image that include model features extracted by that detector. In the for-loop of steps 2028d-2028h, pairs of feature sets, each pair consisting of features selected from the model and features extracted from the input image, are placed into the two-dimensional "featureSets" array for each detector k. In step 2028i, a routine "match features" is called to match features in each pair of featureSets corresponding to a detector. When the routine "match features" finds a sufficient number of matches between model features and features extracted from the input image, and when other considerations are satisfied, then the routine "match features" returns a value indicating whether or not a document image corresponding to the document type associated with the model being applied to the input image has been found. When no document subimage was found, as determined in step 2028j, a negative result is returned by the routine "apply model." Otherwise, in step 2028k, a routine "transform" is called to compute a spatial transform representing the correspondence between features extracted from the input image and corresponding model features. In step 2028l, the computed transform is used to transfer corner points, or other special points from the document model to corresponding points in the input image. The input-image coordinates for these special points, the transform, and other derived results are then packed together into a result, in step 2028m, that is returned by the routine "apply model." This result includes the information that serves to characterize identify document-associated subimages in the input image, shown as characterization information 2002f and 2002j in FIG. 20A.

Figure 21C:
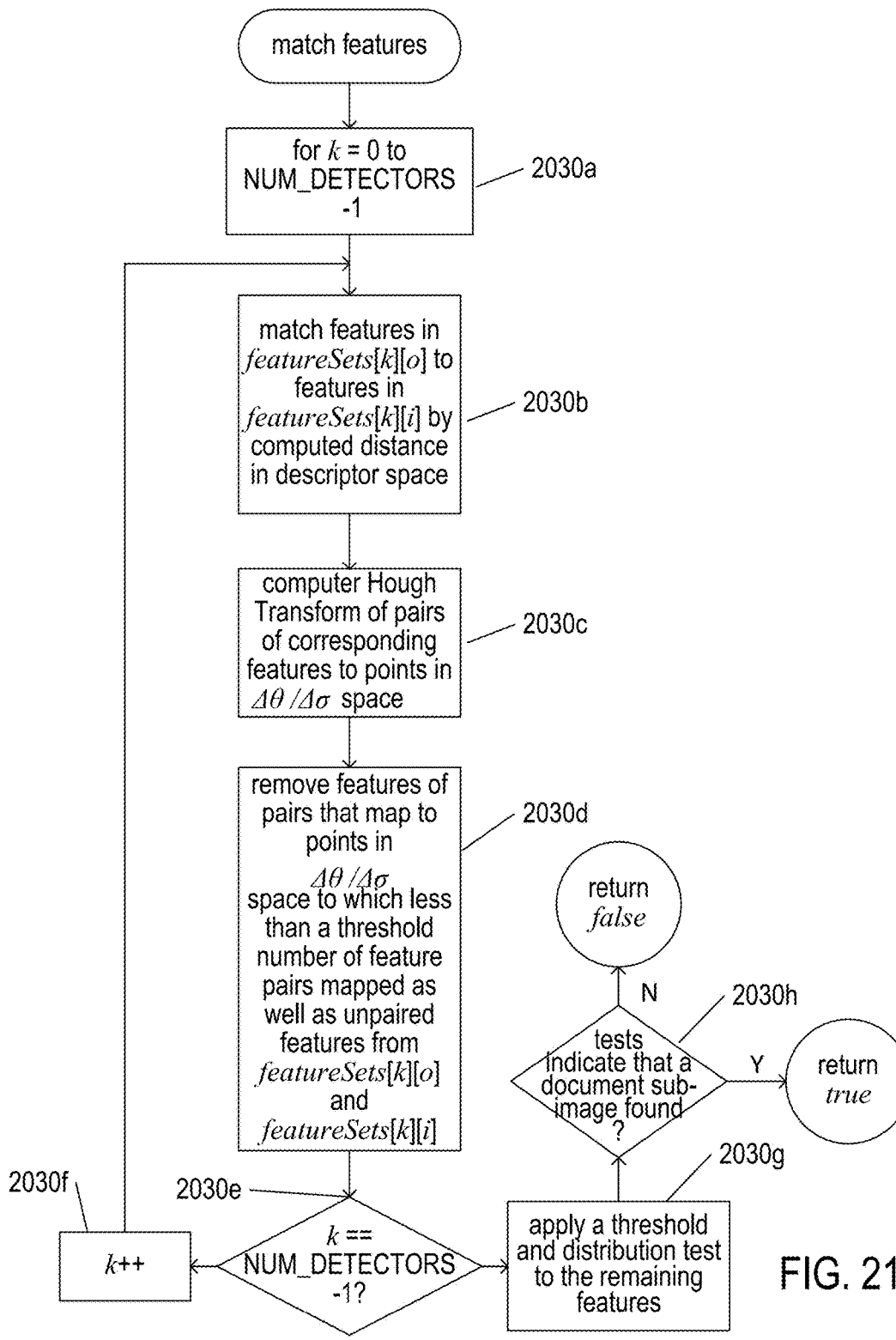
FIG. 21C provides control-diagrams for a routine "find documents" that identifies document subimages within an input image as previously discussed with reference to FIG. 20A.

FIG. 21C provides a control-flow diagram for the routine "match features," called in step 2028i of FIG. 21B. In the for-loop of steps 2030a-2030f, each pair of feature sets corresponding to a particular detector and containing features selected from the model and features extracted from the input image is considered. In step 2030b, feature matching is carried out using a distance metric computed from the characteristics associated with the features. These characteristics may include descriptors, orientations, magnitudes, and other characteristics associated with features obtained using the particular detector k. In step 2030c, the pairs of corresponding features obtained in step 2030b are processed, using a Hough transform, to distribute the pairs of features among cells of a $\Delta\theta/\Delta\sigma$ Hough-Transform space. It would be expected that the distribution of the pairs of corresponding features would not be uniform, but that pairs of corresponding features would tend to accumulate non-uniformly in one or a small number of grid points that correspond to a general orientation and scale transform from the input image to the model. Therefore, in step 2030d, features of pairs that map to points in $\Delta\theta/\Delta\sigma$ space to which less than a threshold number of feature pairs were mapped by the Hough Transform are removed, as are unpaired features. This preserves only high-quality matched feature pairs that appear to be consistent with a general orientation and scale transformation from the input image to the model. Once the high-quality feature pairs are obtained, at the termination of the for-loop of steps 2030a-2030f, threshold and distribution tests are applied to the remaining, high-quality features, in step 2030g, to determine whether or not the matched features indicate identification of a subimage corresponding to the document type associated with the model that is being applied to the input image. The threshold test may require that the ratio of remaining features to the number of model features is greater than a threshold fractional value. The distribution test may require that some threshold number of features were generated by a threshold fraction of the total number of detectors. For example, if only features generated by a single detector end up matching, and when multiple detectors were used to generate the model, it is possible that the particular detector by which the remaining features were obtained may be somehow producing an anomalous result with respect to the particular input image. Evaluation of the remaining features may include additional types of considerations, in certain implementations, or, in other implementations, may involve only a threshold test. The routine "match features" returns a Boolean value indicating whether or not the remaining features indicate identification of a document subimage corresponding to the document type associated with the model that is being applied.

Figure 21D:
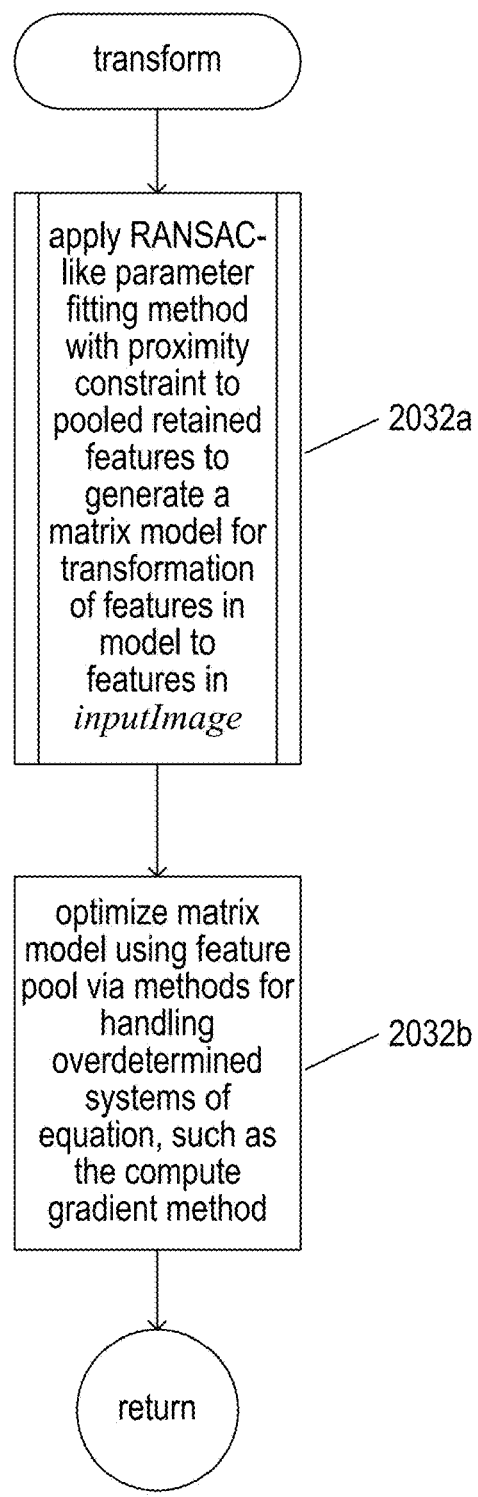
FIG. 21D provides control-diagrams for a routine "find documents" that identifies document subimages within an input image as previously discussed with reference to FIG. 20A.

FIG. 21D provides a control-flow diagram for the routine "transform," called in step 2028k of FIG. 21B. Once it has been determined that there are sufficient matching features between the model and the input image to indicate identification of a document subimage in the input image, the retained matching features are processed using a RANSAC-like matrix model for the transformation of feature locations in the model to corresponding locations in the input image. This RANSAC-like matrix model determination includes the above-discussed proximity constraint so that the randomly selected initial model pairs are separated by more than a threshold distance from one another and that inliers are subsequently chosen when they are also spaced apart from the already chosen inliers by more than a threshold distance. In general, the inlier feature pairs obtained by the RANSAC-like method represent a significantly overdetermined system with respect to the matrix model for the correspondence between model features and the corresponding input-image features. Therefore, in step 2032b, an optimization method, such as the conjugate gradient method, or other well-known methods for handling overdetermined systems is applied to the matrix model and inlier features produced by the RANSAC-like method applied in step 2032a in order to produce an optimized and accurate matrix transformation representing the correspondence between the locations of model features and their corresponding input-image locations.

Although the present invention has been described in terms of particular embodiments, it is not intended that the invention be limited to these embodiments. Modifications within the spirit of the invention will be apparent to those skilled in the art. For example, any of many different design and implementation parameters may be varied to produce alternative implementations of the currently disclosed methods and systems. These parameters may include hardware layers, operating systems, programming languages, modular organization, control structures, data structures, and other such parameters. In many cases, various optimizations can be obtained. As one example, in FIG. 20L, matches are obtained by exhaustive attempting pairings between features extracted from the template image and features extracted from a pose image. There are, however, sophisticated nearest-neighbor methods for identifying matching points in high-dimensional spaces, including the LSH method that uses families of hash functions. Any of many different types of feature detectors may be employed, each producing different types of characterizations of the features. Those feature detectors that detect geometrical features may need to include multiple pairs of location coordinates or other information to specify the position of the detected feature within an image. The nearest-neighbor-based matching of the features may include all or only a subset of the various types of extracted-feature attributes.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A document-image-processing system comprising:
    a memory; and
    a processor operatively coupled to the memory, the processor to:
        generate one or more detector-associated sets of features from an image;
        apply one or more document-type models to the image, wherein each of the document-type models includes a set of model features to generate a set of final feature pairs, each final feature pair comprising a first feature of the model features and a second matching feature of the one or more detector-associated sets of features; and
        in response to determining, based on the final feature pairs, that a document subimage of a document type corresponding to one of the document-type models is present in the image, generate and store locations of one or more points in the document subimage and a document-subimage orientation related to the document subimage.

2. The document-image-processing system of claim 1 further comprising:
    for each document subimage determined to be present in the image,
    using the locations of one or more points in the document subimage and the document-subimage orientation to extract information from the document subimage.

3. The document-image-processing system of claim 1, wherein generating the one or more detector-associated sets of features from the image comprises applying one or more document-type models to the image by:
    for each detector that detected a model feature included in the model,
    matching features generated from the image by the detector to model features detected by the detector to produce an initial set of matching feature pairs,
    distributing the matching feature pairs into a transform space, and
    adding, to the final set of feature pairs, feature pairs that are grouped together in the transform space.

4. The document-image-processing system of claim 3 wherein matching features generated from the image by the detector to model features detected by the detector further comprises:
    selecting, for each model feature, a closest feature generated by the detector, wherein a distance between the model feature and features generated by the detector is determined by a distance metric in a space of feature attribute values, each dimension of the space corresponding to a feature attribute; and
    selecting the closest feature as a matching feature when the distance between the model feature and the closest feature is less than a threshold value.

5. The document-image-processing system of claim 3 wherein distributing the matching feature pairs into a transform space further comprises:
    computing a difference in two or more feature attributes between the model feature and detector-generated feature of each matching feature pair; and
    distributing each matching feature pair into the transform space with dimensions each corresponding to the difference between two attribute values of a feature attribute.

6. The document-image-processing system of claim 1, further comprising wherein applying one or more tests to the set of final feature pairs to determine whether or not a document subimage of the document type corresponding to the model is present in the image further comprises:
    applying one or more of
    a test that determines a ratio of a number of the model features in feature pairs of the final set of feature pairs to the number of model features in the model and compares the ratio to a threshold value; and
    a test that determines a ratio of a number of detectors that generated one or more features included in the final set of feature pairs to a number of detectors that generated one or more model features and compares the ratio to a threshold value.

7. The document-image-processing system of claim 1, further comprising applying a transform that transforms model-feature locations to image locations to generate and store the locations of one or more points in the document subimage and the document-subimage orientation, wherein the transform that transforms model-feature locations to image locations is generated by:
    applying a parameter-fitting method to generate a matrix model that, when applied to a coordinate vector for a point in a template image for the document used to generate the model, produces a corresponding coordinate vector for a point in the image.

8. The document-image-processing system of claim 7 wherein the parameter-fitting method is a RANSAC-like parameter-fitting method that uses a proximity constraint when selecting initial model points and when adding points to the model.

9. The document-image-processing system of claim 7, further comprising applying a transform that transforms model-feature locations to image locations to generate and store the locations of one or more points in the document subimage and to generate and store the document-subimage orientation by:
 selecting corner points of the document in the template image for the document; using the matrix model to transform coordinate pairs that describe the location of the corner points of the document in the template image to corresponding image coordinate pairs; and
 using two image coordinate pairs for document corners to compute a line segment and using the line segment to compute an orientation of the line segment with respect to an image edge.

10. The document-image-processing system of claim 1, wherein generating the one or more detector-associated sets of features from the image comprises applying one or more feature detectors to the image, wherein the one or more feature detectors each identifies particular locations, geometric features, or other features in the image, such as SIFT features generated by a SIFT feature detector, and wherein the features generated by feature detectors are characterized by attribute values.

11. The document-image-processing system of claim 10 wherein attribute values that characterize features include one or more of:
 a magnitude, a scale, an orientation,
 a coordinate pair identifying a location, and a descriptor with multiple elements.

12. A method for processing document-images, the method comprising:
 generating one or more detector-associated set of features from an image;
  applying one or more document-type models to the image, wherein each the document-type models comprises a set of model features to generate a set of final feature pairs, each final feature pair comprising a first feature of the model features and a second matching feature of the one or more detector-associated sets of features; and
  in response to determining that a document subimage of a document type corresponding to at least one of the document-type models is present in the image, generating and store locations of one or more points in the document subimage and a document-subimage orientation related to the document subimage.

* * * * *